(12) United States Patent
Song et al.

(10) Patent No.: US 12,031,078 B2
(45) Date of Patent: *Jul. 9, 2024

(54) SWITCHING LAYER FOR USE IN AN OPTICAL SWITCHING ELEMENT

(71) Applicant: Merck Patent GmbH, Darmstadt (DE)

(72) Inventors: Dong-Mee Song, Hwaseong (KR); Jung-Min Lee, Seoul (KR); Yong-Hyun Choi, Pyeongtaek (KR); Yong-Kuk Yun, Hwaseong (KR)

(73) Assignee: MERCK PATENT GMBH, Darmstadt (DE)

( * ) Notice: Subject to any disclaimer, the term of this patent is extended or adjusted under 35 U.S.C. 154(b) by 519 days.

This patent is subject to a terminal disclaimer.

(21) Appl. No.: 16/318,449

(22) PCT Filed: Jul. 17, 2017

(86) PCT No.: PCT/EP2017/067960
§ 371 (c)(1),
(2) Date: Jan. 17, 2019

(87) PCT Pub. No.: WO2018/015323
PCT Pub. Date: Jan. 25, 2018

(65) Prior Publication Data
US 2019/0284474 A1    Sep. 19, 2019

(30) Foreign Application Priority Data
Jul. 20, 2016    (EP) ..................................... 16180345

(51) Int. Cl.
*G02F 1/1333*    (2006.01)
*C09K 19/04*    (2006.01)
*C09K 19/30*    (2006.01)
*C09K 19/34*    (2006.01)
*E06B 9/24*    (2006.01)
*G02F 1/1334*    (2006.01)
*G02F 1/1337*    (2006.01)
*C09K 19/12*    (2006.01)
*C09K 19/18*    (2006.01)

(52) U.S. Cl.
CPC .......... *C09K 19/04* (2013.01); *C09K 19/3066* (2013.01); *C09K 19/3402* (2013.01); *C09K 19/3405* (2013.01); *C09K 19/3491* (2013.01); *E06B 9/24* (2013.01); *G02F 1/1334* (2013.01); *G02F 1/133703* (2013.01); *C09K 2019/0448* (2013.01); *C09K 2019/122* (2013.01); *C09K 2019/123* (2013.01); *C09K 2019/181* (2013.01); *C09K 2019/183* (2013.01); *C09K 2019/3004* (2013.01); *C09K 2019/301* (2013.01); *C09K 2019/3016* (2013.01); *C09K 2019/3021* (2013.01); *C09K 2019/3027* (2013.01); *C09K 2019/3063* (2013.01); *C09K 2019/3408* (2013.01); *C09K 2019/3422* (2013.01); *E06B 2009/2464* (2013.01); *G02F 1/13345* (2021.01); *G02F 1/13347* (2021.01); *G02F 1/133742* (2021.01); *G02F 2202/043* (2013.01)

(58) Field of Classification Search
CPC .......................... C09K 19/04; C09K 19/3066; C09K 19/3402; C09K 19/3405; C09K 19/3491; C09K 2019/0448; C09K 2019/122; C09K 2019/123; C09K 2019/181; C09K 2019/183; C09K 2019/3004; C09K 2019/301; C09K 2019/3016; C09K 2019/3021; C09K 2019/3027; C09K 2019/3063; C09K 2019/3408; C09K 2019/3422; G02F 1/1333; G02F 1/1334; G02F 1/133703; G02F 2001/13345; G02F 2001/13347; G02F 2001/133742; G02F 2202/043; E06B 9/24; E06B 2009/2464
USPC ..................................... 252/299.61
See application file for complete search history.

(56) References Cited

U.S. PATENT DOCUMENTS

| | | | |
|---|---|---|---|
| 9,726,933 | B2 | 8/2017 | Archetti et al. |
| 9,758,726 | B2 | 9/2017 | Lim et al. |
| 2014/0138581 | A1 | 5/2014 | Archetti |
| 2014/0293174 | A1 | 10/2014 | Junge et al. |
| 2015/0252265 | A1 | 9/2015 | Archetti et al. |
| 2016/0009995 | A1 | 1/2016 | Kuriyama et al. |
| 2016/0009998 | A1 | 1/2016 | Saito et al. |
| 2016/0033807 | A1 | 2/2016 | Junge et al. |
| 2016/0060530 | A1 | 3/2016 | Archetti et al. |

(Continued)

FOREIGN PATENT DOCUMENTS

| | | |
|---|---|---|
| CN | 103890643 A | 6/2014 |
| CN | 105001879 A | 10/2015 |

(Continued)

OTHER PUBLICATIONS

International Search Report PCT/EP2017/067960 dated Jan. 19, 2018 (pp. 1-6).

(Continued)

*Primary Examiner* — Geraldina Visconti
(74) *Attorney, Agent, or Firm* — MILLEN, WHITE, ZELANO & BRANIGAN, P.C.; Ryan R. Pool

(57) ABSTRACT

The present invention relates to a switching layer based on a liquid-crystalline mixture for use in an optical switching element. The invention also encompasses a switching element comprising the switching layer and a window element containing the switching element. The liquid crystalline mixture comprises a low-molecular liquid crystal component, a polymer component and a self-alignment additive for vertical alignment.

11 Claims, 1 Drawing Sheet

(56) References Cited

U.S. PATENT DOCUMENTS

| | | |
|---|---|---|
| 2016/0115389 A1 | 4/2016 | Lim et al. |
| 2017/0349829 A1 | 12/2017 | Kuriyama et al. |
| 2018/0022997 A1 | 1/2018 | Graziano |
| 2018/0057743 A1 | 3/2018 | Archetti et al. |
| 2018/0157088 A1 | 6/2018 | Junge et al. |
| 2018/0208848 A1 | 7/2018 | Archetti |
| 2019/0185754 A1* | 6/2019 | Archetti ............... C09K 19/12 |
| 2019/0284474 A1* | 9/2019 | Song ............... G02F 1/133703 |

FOREIGN PATENT DOCUMENTS

| | | | |
|---|---|---|---|
| CN | 105143404 | A | 12/2015 |
| EP | 2619284 | A1 | 7/2013 |
| EP | 2883934 | A1 | 6/2015 |
| JP | 2014196474 | A | 10/2014 |
| KR | 20150007998 | A | 1/2015 |
| KR | 101557766 | B1 | 10/2015 |
| WO | 2012038026 | A1 | 3/2012 |
| WO | 2013004372 | A1 | 1/2013 |
| WO | 2014094959 | A1 | 6/2014 |
| WO | 2016015803 | A1 | 2/2016 |
| WO | 2016173693 | A1 | 11/2016 |

OTHER PUBLICATIONS

R.M.A. Hikmet, J. Appl. Phys., vol. 68, No. 9, 1990, pp. 4406-4412.

Farzana Ahmad et al: "Surfactant-doped reverse-mode polymer-dispersed liquid crystal display with enhanced properties", Liquid Crystals, vol. 43, No. 2, Sep. 30, 2015 (Sep. 30, 2015), pp. 162-167, XP055350050, ISSN: 0267-8292.

Cupelli; Journal of Polymer Science, Part B: Polymer Physics, 2011, 49, pp. 257-262.

Lin; Journal of Polymer Science, Part B: Polymer Physics, 2015; 53, pp. 1123-1130.

Fan; Applied Physics Letters, 84, 8, 2004, pp. 1233-1235.

Hikmet; Adv. Materials, 1992, 4, No. 10, pp. 979-683.

Lee; Liquid Crystals, 2015,42,4, pp. 473-480.

C. Xu et al., Selections to polymers and in liquid crystals in the preparation of PDLC, Liquid Crystals and Displays, 2006, 21, 5, 414-417.

English translation of Office Action in corresponding Chinese Application No. 201780044594.8 dated Apr. 1, 2022 (10 pages) and CN office action (pp. 1-8).

A. Farzana et al., "Surfactant-doped reverse-mode polymer-dispersed liquid crystal display with enhanced properties" Liquid Crystals, 2015, 162-167 https://doi.org/10.1080/02678292.2015.1090026.

English translation of Notice of Preliminary Rejection in corresponding Korean Patent app. 2019-7004886 dated Nov. 22, 2021 (pp. 1-12).

* cited by examiner

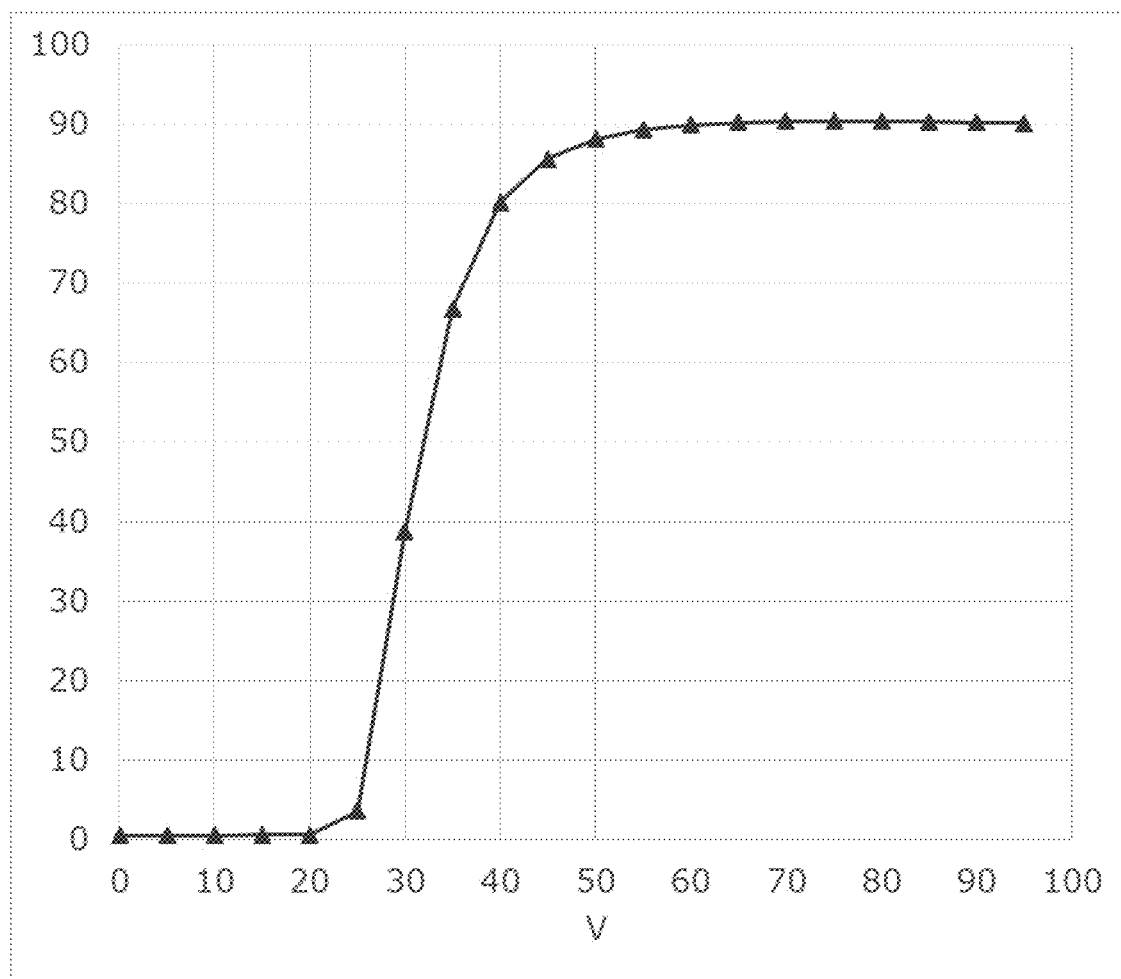

SWITCHING LAYER FOR USE IN AN OPTICAL SWITCHING ELEMENT

The present invention relates to a switching layer based on a liquid-crystalline mixture for use in an optical switching element. The invention also encompasses a switching element comprising the switching layer and a window element containing the switching element. The liquid crystalline mixture comprises a low-molecular liquid crystal component, a polymer component and a self-alignment additive for vertical alignment.

Window elements having darkenable switching layers which allow various degrees of absorption of daylight are known to the person skilled in the art. These window elements are frequently based on switching layers comprising liquid-crystalline (LC) media which are addressed by applied electrodes (US 2016033807 A). A window element which contains a switching element having one of the switching layers described above can be switched between the "bright" and "dark" states, so that shading of a room which contains the window element as light-transmitting component of the window(s) in its outside wall is achieved in the "dark" switching state, where the extent of shading can be regulated by a voltage applied to the switching element.

However, sunlight entering a room through the window element even in the "dark" switching state is regarded as unpleasant by many people, since they still feel dazzled even by the "dark" sunlight. Although, in order to avoid being dazzled, they can switch the switching element into ever "darker" switching states, until finally a "dark" switching state which is no longer regarded as dazzling is achieved, it must furthermore be taken into account that people are sensitive to dazzling by sunlight to various extents. If ultimately a "dark" switching state which is sufficient for everyone is then achieved, the room shaded in such a way is often so dark that working is made at least more difficult, if not absolutely impossible. Consequently, one is forced to restore the brightness necessary for working by means of artificial lighting, which, however, is undesired from an energetic point of view.

The present invention therefore has the object of providing a window element containing a switching element, which makes it possible to regulate the dazzling by sunlight in a room independently from the brightness necessary in the room thereby avoiding the necessity of artificial lighting.

Polymer dispersed liquid crystal (PDLC) films have considerable potentials for flexible display, transparent display and smart window since they can be switched electrically. The normally hazy PDLC mode, which is switched from hazy to transparent is popular due to its easy manufacturing.

However, a window having a normally hazy appearance without voltage can be a disadvantage. The inventors have revealed, that for a window application, a normally transparent mode PDLC could be more preferable. One solution presented here is a normally transparent polymer network LC device.

Anisotropic gels based on liquid crystals containing a network of photo-polymerised liquid-crystalline (LC) molecules were used for reversible switching a LC display cell from no scattering to scattering mode by application of an electric field (R. M. A. Hikmet, J. Appl. Phys. 68(9), 1990, 4406-4412).

Accordingly, another object of the invention is to provide a switching layer for use in a switching element which enables switching from a transparent state into an opaque, i.e. non-transparent state of the switching element. The opaque state here is a state in which the light passing through the switching element is scattered. The opaque switching state shall cause one or more effects selected from reduction of dazzling, as mentioned above, and the establishment of privacy.

Applicants have filed the EP patent application no. 15001239.1 (later published as WO 2016/173693) for the construction of normally transparent switchable scattering layers based on LC mixtures. The switching layers described use a polyimide alignment layer in order to achieve uniform alignment of the director of the LC phase.

A further goal of the current invention is easy manufacturing of a large area optical device like window panes and other transparent building elements. The deposition of thin functional layers on large glass substrates is usually combined with considerable technical effort.

By this disclosure a new design and preparation for a vertically oriented, normally-transparent switching layer is presented, which is based on a mixture of a non-polymerisable low-molecular-weight liquid crystal, a polymer (e.g. a polymer network made from a polymerisable component) or its polymerisable precursor monomer and a vertical alignment additive.

The invention provides a switching layer S for use in a switching element, where the
- switching layer S has a transparent switching state and a scattering switching state and
- comprises a liquid-crystalline medium between an upper switching layer plane USLP and a lower switching layer plane LSLP, characterised in that the liquid-crystalline medium comprises at least
- a low-molecular-weight liquid-crystalline component,
- a polymerisable or polymerised component and
- a self-alignment additive for vertical alignment.

The processed liquid-crystalline medium of switching layer S is forwards-scattering in at least one state of the switching layer, preferably in the voltage driven state.

A further subject of the current invention is the mixture of
- a non-polymerisable low-molecular-weight liquid crystal component,
- a polymer (e.g. a polymer network made from a polymerisable component) or its polymerisable precursor monomer(s) (also named polymerisable compounds here) and
- a vertical alignment additive.

The switching layer works similar to a polymer-dispersed LC device (PDLC device) on the principle of scattering in the "dark" state, and non-scattering in the bright state. The switching layer is preferably configured in such a way that, in one of the switching states, parallel light rays which hit the upper switching layer plane USLP in incident ray directions D(=) are deflected from D(=) on passing through the switching layer S, so that, after leaving the lower switching layer plane LSLP, the originally parallel light rays are scattered in forwards scattering directions D(<) resulting in forwards scattering, which is measured as diffusive transmission $T_d$, where $T_d > 0.2$, and where $T_d$ is defined in accordance with formula (1)

$$T_d = (I_{\geq 2.5}^\circ / I_t) \tag{1},$$

in which
$I_{\geq 2.5}^\circ$ denotes the intensity of the large-angle scattering with scattering angles $\geq 2.5°$ and
$I_t$ denotes the intensity of the total transmission.
The value $T_d$ is indicated here averaged over the spectral region from 380 nm to 780 nm. The intensities indicated are determined as indicated in the working examples, and the value $T_d$ is determined as indicated in the working examples.

The diffusive haze H (also referred to as haze) is defined herein in accordance with formula (2)

$$H = T_d \cdot 100 [\%] \quad (2),$$

where $T_d$ is defined in accordance with formula (1) as above.

The switching layer S according to the invention, built into a switching element, allows, optionally in addition to regulation by means of bright/dark states, the ability to regulate the dazzling by sunlight without the need to effect the requisite room brightness by means of artificial room lighting. This becomes possible through diffusive transmission by the switching layer S according to the invention, preferably of greater than 0.2 in one of the switching states, causing an at least significant reduction in dazzling by the light rays entering the room from outside through the switching layer and at the same time causing adequate brightness to prevail in the room, so that working without artificial lighting becomes possible during the day. This is regarded as very pleasant by many people and in addition reduces the energy demand of a building having window elements which contain switching elements having the switching layer S according to the invention.

In principle, energy-saving, transparent or flexible display devices can also be accomplished with the switching layers according to the invention. The production of the elements is advantageously associated with little effort, since, inter alia, "alignment layers" do not have to be applied to the substrates.

For the purposes of the present invention, the term "switching states" is principally taken to mean binary states in which the switching layer S according to the invention may exist, i.e.

in a switching state in which the switching layer S according to the invention has a diffusive transmission $T_d > 0.2$ and appears homogeneously opaque to the human eye, and in another switching state in which the switching layer S according to the invention has a diffusive transmission $T_d \leq 0.2$ and appears transparent and clear to the human eye.

However, it is also possible for the switching layer according to the invention to have further switching states, in particular intermediate states.

In addition, the switching layer S according to the invention, if it is combined with further switching layers in a switching element, allows switching between a completely private state and a state with visual contact with the outside. In particular, the visual contact with the outside is a property which is not offered by awnings and blinds.

For the purposes of the present invention, the term "light rays" is taken to mean, in particular, electromagnetic rays in the UV-A, VIS and NIR region. In particular, it is taken to mean light rays having a wavelength which is not absorbed or only absorbed to a negligible extent by the materials (for example glass) usually used in windows. According to the definitions usually used, the UV-A region is taken to mean a wavelength of 320 nm to 380 nm, the VIS region is taken to mean a wavelength of 380 nm to 780 nm and the NIR region is taken to mean a wavelength of 780 nm to 2000 nm.

For the purposes of the present invention, the term "liquid-crystalline medium" is taken to mean a material which has liquid-crystalline properties under certain conditions. The liquid-crystalline medium in accordance with the invention typically comprises at least one compound whose molecules have an elongate form, i.e. are significantly longer in one spatial direction (longitudinal axis) than in the other two spatial directions. The liquid-crystalline medium preferably has a nematic phase.

For the purposes of the present invention, the term "low-molecular weight liquid-crystal" is taken here to mean a non-polymer, molecular liquid crystal composed of one or more defined compounds, each without polymerizable groups.

For the purposes of the present invention, the term "reactive mesogen" is taken here to mean a polymerizable component comprising one or more compounds with one or more polymerizable (reactive) groups attached to a mesogenic group, optional by a spacer group. The term mesogenic group is taken here to mean a broad definition, i.e. an element comprising one, two, three, four or more rings, preferably arranged in a linear fashion, e.g. one typical for molecular liquid crystals. It preferably contains at least one aryl, heteroaryl or cyclohexyl group.

BRIEF DESCRIPTION OF THE FIGURE(S)

FIG. 1: The switching operation of a device according to the invention is analysed by obtaining a graph depicting haze versus voltage. FIG. 1 depicts the switching curve of a device (device example 5) containing the dielectric negative mixture M5 (10% polymers, 3% additive 1-1, see experimental details).

The liquid-crystalline medium is usually introduced between parallel substrates of e.g. glass or plastics (polymer). In this configuration the alignment additive will effect vertical alignment of the longitudinal axis of the LC molecules with respect to the substrate plane.

In a preferred embodiment the dielectric anisotropy of the LC is negative, typically with a dielectric anisotropy of $\Delta\varepsilon < 1.5$. This design allows a switching operation from transparent to scattering by an electric field between the substrates. To that end electrodes are provided on opposite substrate sides facing the LC medium, to which a suitable switching voltage is supplied. Herein, a rectangular AC voltage is used for switching.

The liquid-crystalline low-molecular-weight component used for the switching layer can vary in a broad range, wherein media having the preferred characteristics as disclosed herein are preferred. Preference is given to media having a negative dielectrical anisotropy, because it works well with electrodes on opposite substrate sides. A variety of suitable and preferred substances of this kind is included in Table A. Generally compounds selected from the following formulae CY, PY, T, FI and/or B are preferred. Most of them will contribute to a negative $\Delta\varepsilon$.

Therefore, a preferred embodiment of the low-molecular-weight component of the LC medium is a low-molecular-weight component of the LC medium which comprises one or more compounds selected from the formulae CY, PY, T, FI and B:

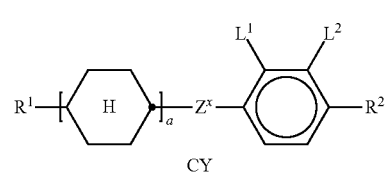

CY

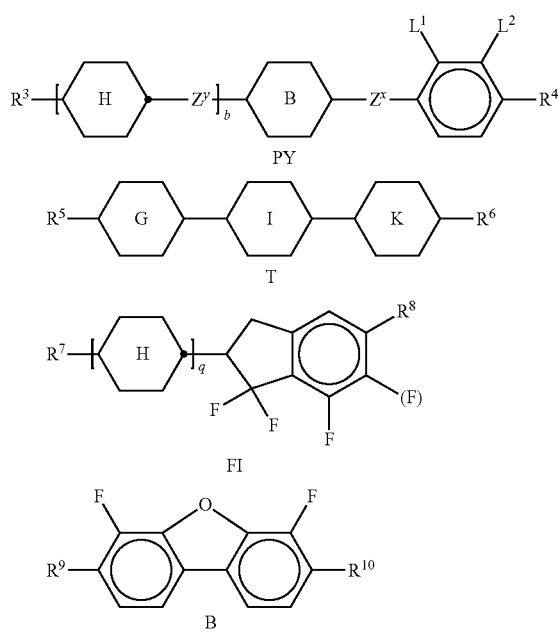

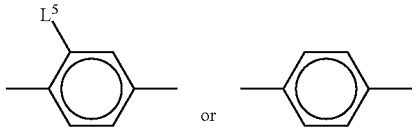

wherein
a denotes 0, 1 or 2,
b denotes 0 or 1,
q denotes 1 or 2,

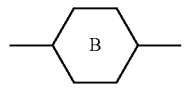

denotes

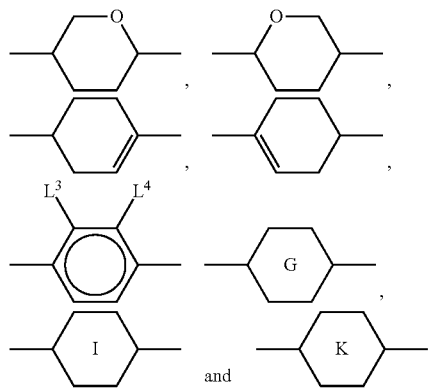

and each, independently of one another, denote

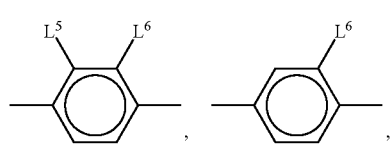

in which $L^5$ denotes F or Cl, preferably F, and $L^6$ denotes F, Cl, $OCF_3$, $CF_3$, $CH_3$, $CH_2F$ or $CHF_2$, preferably F, wherein formula T comprises at least one, preferably two groups $L^5$ or $L^6$, $R^1$, $R^2$, $R^3$, $R^4$, $R^5$, $R^6$, $R^7$, $R^8$, $R^9$ and $R^{10}$
each, independently of one another, denote alkyl having 1 to 12 C atoms, where, in addition, one or two non-adjacent $CH_2$ groups may be replaced by —O—, —CH=CH—, —CO—, —OCO— or —COO— in such a way that O atoms are not linked directly to one another, preferably alkyl or alkoxy having 1 to 6 C atoms, $Z^x$ and $Z^y$ each, independently of one another, denote —$CH_2CH_2$—, —CH=CH—, —C≡C—, —$CF_2O$—, —$OCF_2$—, —$CH_2O$—, —$OCH_2$—, —CO—O—, —O—CO—, —$C_2F_4$—, —CF=CF—, —CH=CH—$CH_2O$— or a single bond, preferably a single bond, $L^1$, $L^2$ each, independently of one another, denote F, Cl, $OCF_3$, $CF_3$, $CH_3$, $CH_2F$, $CHF_2$, and $L^3$, $L^4$ each, independently of one another, denote H, F, Cl, $OCF_3$, $CF_3$, $CH_3$, $CH_2F$, $CHF_2$.

The substituent (F) stands for F or H.

Preferably, both $L^1$ and $L^2$ denote F or one of $L^1$ and $L^2$ denotes F and the other denotes Cl.

The compounds of the formula CY are preferably selected from the group consisting of the following sub-formulae:

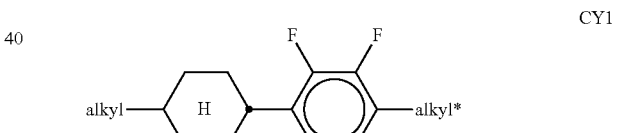

CY1

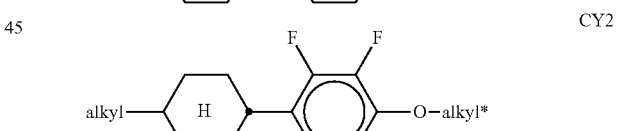

CY2

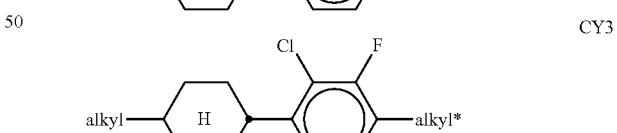

CY3

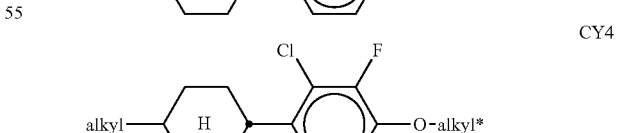

CY4

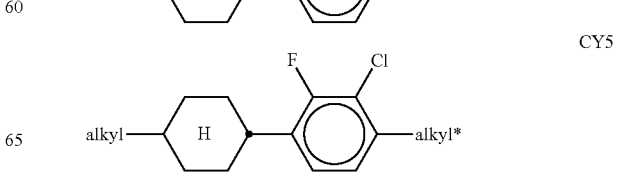

CY5

-continued
CY6
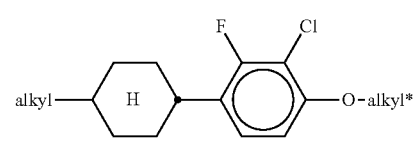
CY7
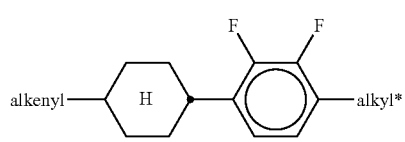
CY8
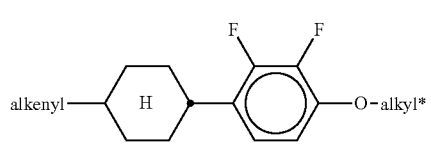
CY9
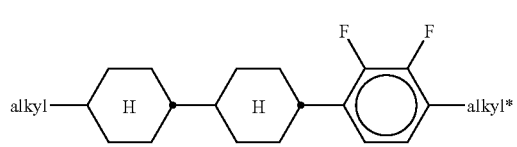
CY10
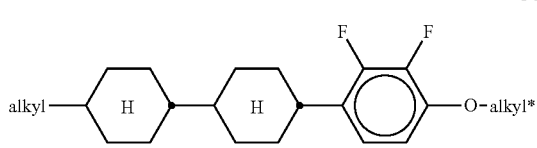
CY11
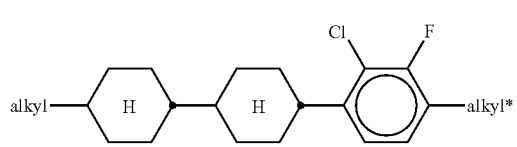
CY12
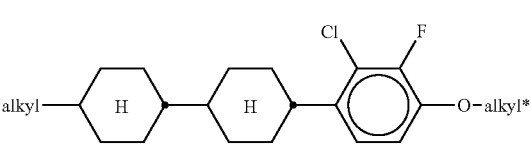
CY13
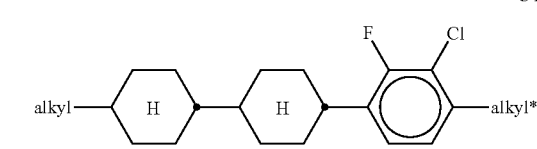
CY14
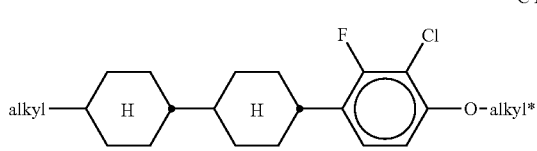
CY15
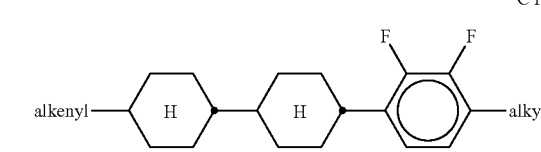
-continued
CY16
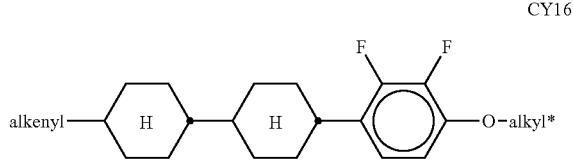
CY17
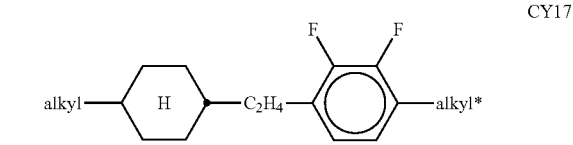
CY18
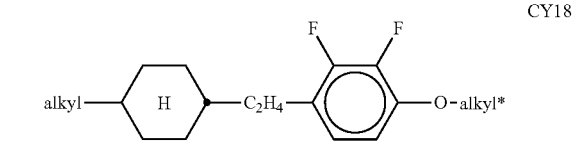
CY19
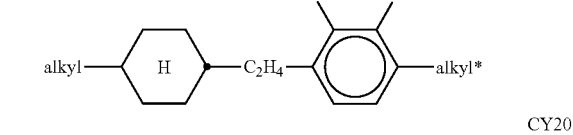
CY20
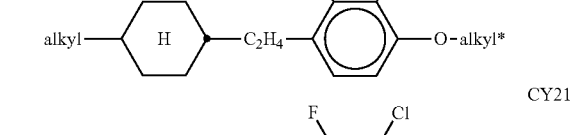
CY21
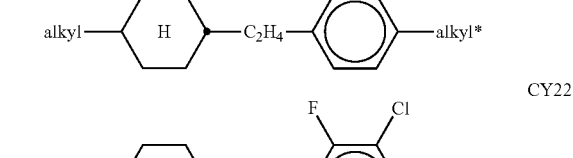
CY22
CY23
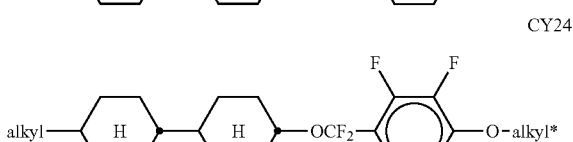
CY24
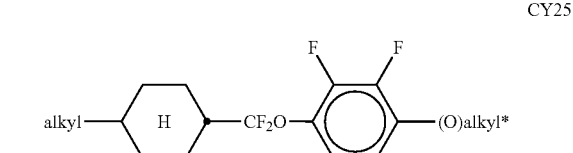
CY25
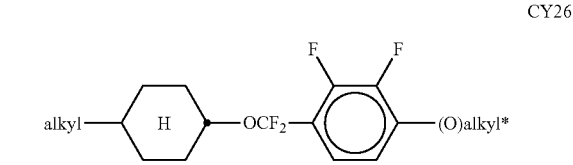
CY26

-continued

CY27 alkyl—⟨H⟩ₐ—CH=CHCH₂O—⟨F,F⟩—(O)alkyl*

CY28 alkyl—⟨H⟩ₐ—CF₂O—⟨F,Cl⟩—(O)alkyl*

CY29 alkyl—⟨H⟩ₐ—CF₂O—⟨Cl,F⟩—(O)alkyl*

CY30 alkyl—⟨H⟩—CH₂O—⟨F,F⟩—(O)alkyl*

CY31 alkenyl—⟨H⟩—CH₂O—⟨F,F⟩—(O)alkyl*

CY32 alkyl—⟨H⟩—⟨H⟩—CH₂O—⟨F,F⟩—(O)alkyl*

CY33 alkenyl—⟨H⟩—⟨H⟩—CH₂O—⟨F,F⟩—(O)alkyl* alkyl—O—⟨L¹,L²⟩—(O)alkyl* in which a denotes 1 or 2, alkyl and alkyl* each, independently of one another, denote a straight-chain alkyl radical having 1-6 C atoms, and alkenyl denotes a straight-chain alkenyl radical having 2-6 C atoms, and (O) denotes an oxygen atom or a single bond. Alkenyl preferably denotes CH₂=CH—, CH₂=CHCH₂CH₂—, CH₃—CH=CH—, CH₃—CH₂—CH=CH—, CH₃—(CH₂)₂—CH=CH—, CH₃—(CH₂)₃—CH=CH— or CH₃—CH=CH—(CH₂)₂—.

The compounds of the formula PY are preferably selected from the group consisting of the following sub-formulae:

alkyl—⟨⟩—⟨F,F⟩—alkyl* alkyl—⟨⟩—⟨F,F⟩—O-alkyl* alkyl—⟨⟩—⟨Cl,F⟩—alkyl* alkyl—⟨⟩—⟨Cl,F⟩—O-alkyl* alkyl—⟨⟩—⟨F,Cl⟩—alkyl* alkyl—⟨⟩—⟨F,Cl⟩—O-alkyl* alkenyl—⟨⟩—⟨F,F⟩—alkyl* alkenyl—⟨⟩—⟨F,F⟩—O-alkyl*

PY9 alkyl—⟨H⟩—⟨⟩—⟨F,F⟩—alkyl*

PY10 alkyl—⟨H⟩—⟨⟩—⟨F,F⟩—O-alkyl*

PY11 alkyl—⟨H⟩—⟨⟩—⟨Cl,F⟩—alkyl*

PY12 alkyl—⟨H⟩—⟨⟩—⟨Cl,F⟩—O-alkyl*

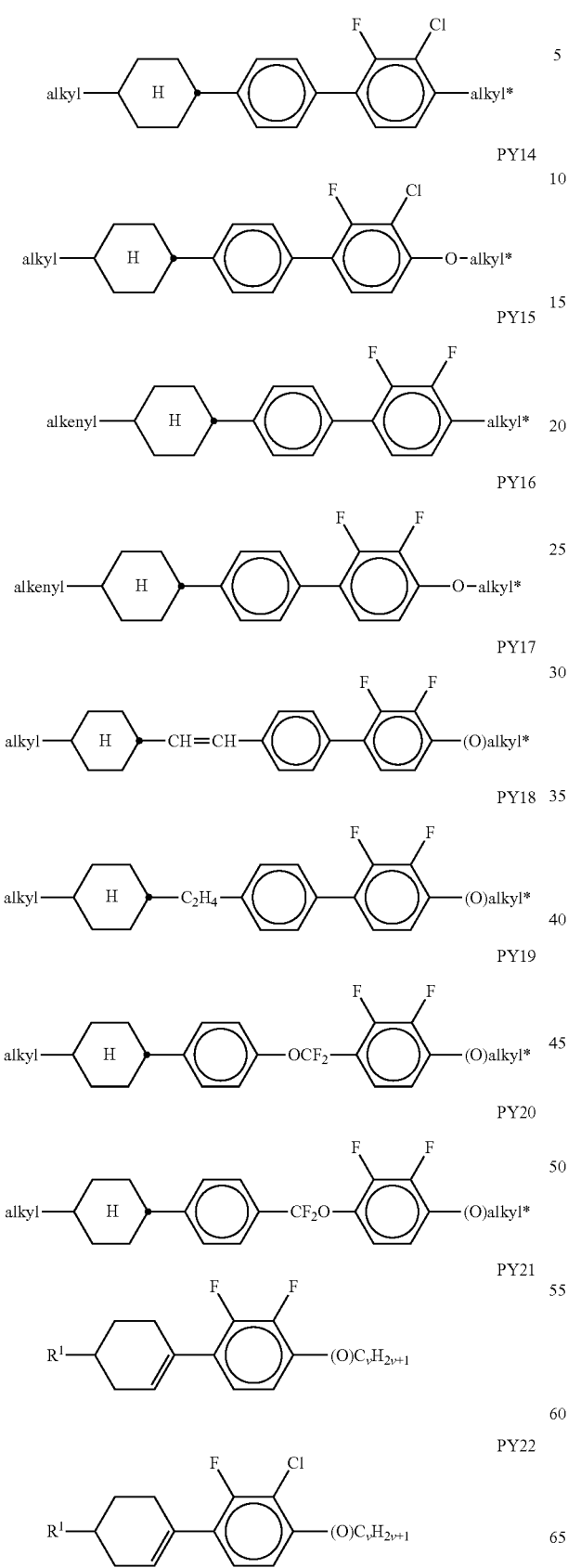

-continued

PY34
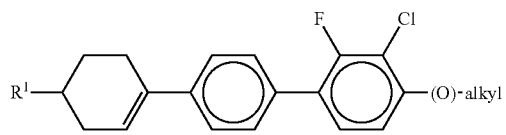

PY35
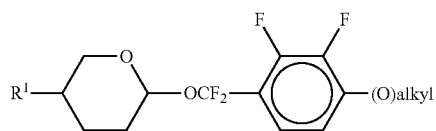

PY36
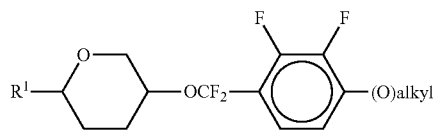

PY37
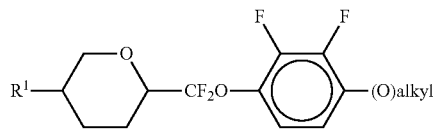

PY38
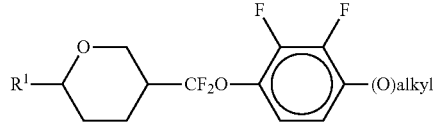

PY39
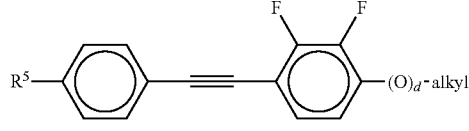

PY40
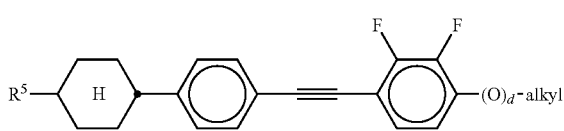

PY41
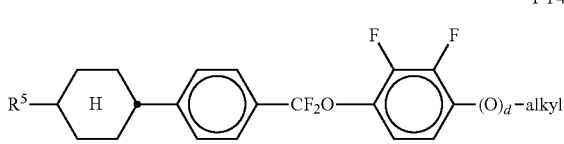

PY42
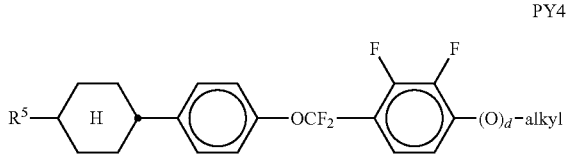

PY43
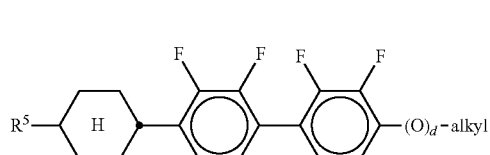

PY44
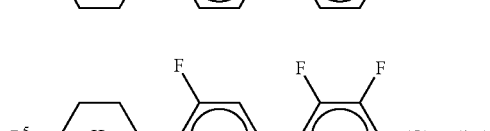

-continued

PY45
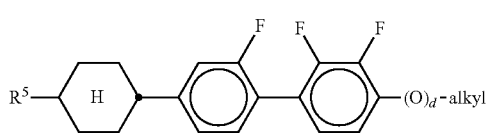

PY46
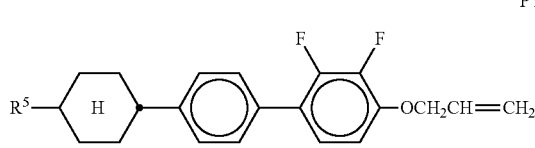

PY47
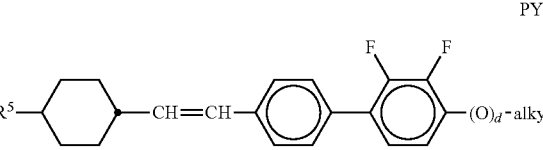

PY48
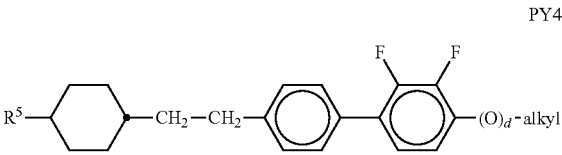

in which alkyl and alkyl* each, independently of one another, denote a straight-chain alkyl radical having 1-6 C atoms, and alkenyl denotes a straight-chain alkenyl radical having 2-6 C atoms, and (O) denotes an oxygen atom or a single bond. Alkenyl preferably denotes $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

The compounds of the formula T are preferably selected from the group consisting of the following sub-formulae:

T1
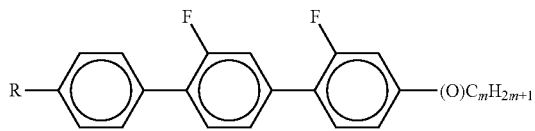

T2
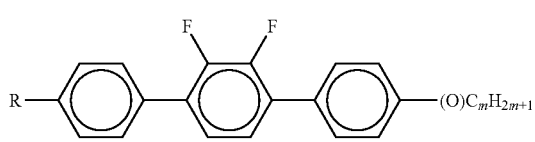

T3
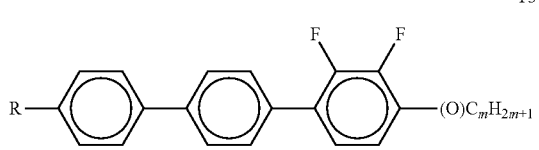

T4
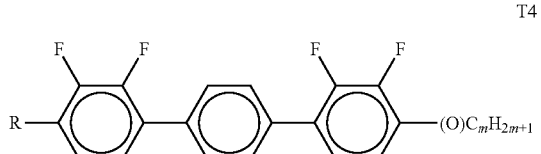

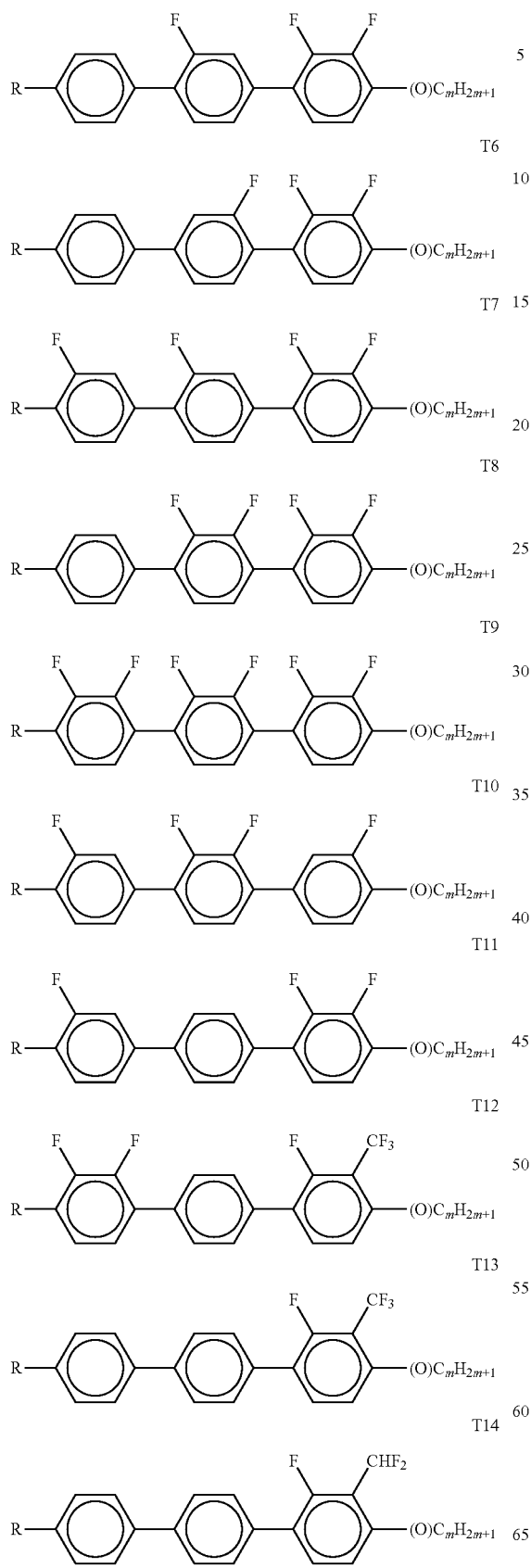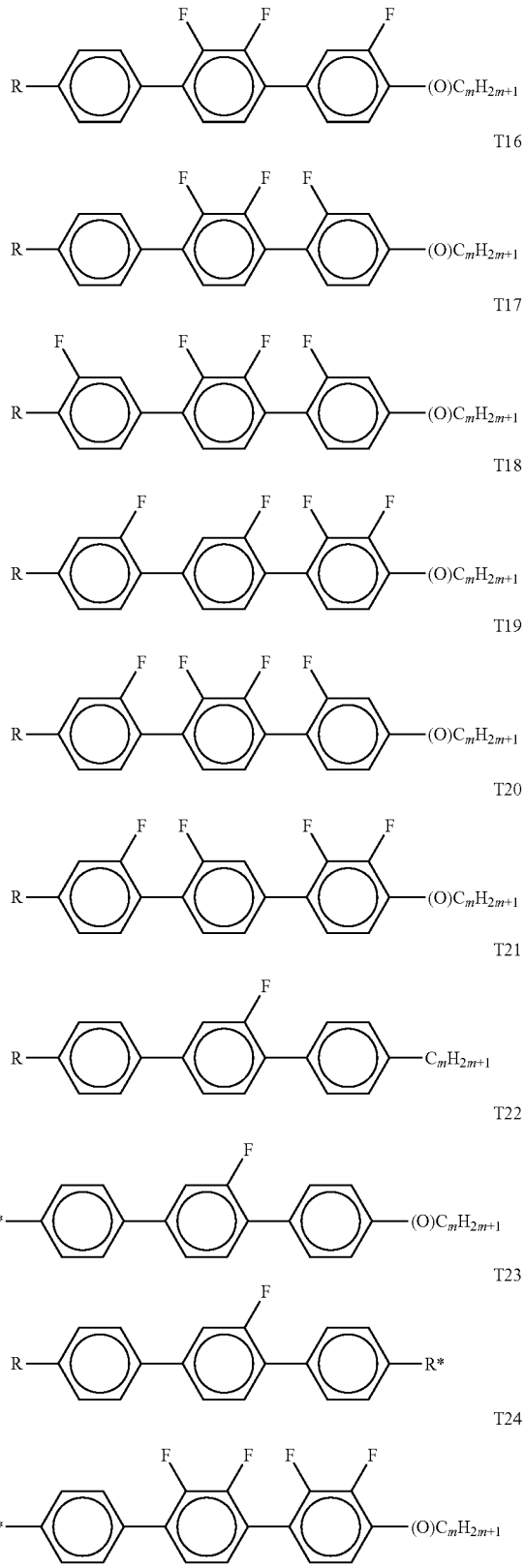
in which R denotes a straight-chain alkyl or alkoxy radical having 1-7 C atoms, R* denotes a straight-chain alkenyl radical having 2-7 C atoms, (O) denotes an oxygen atom or a single bond, and m denotes an integer from 1 to 6. R* preferably denotes CH$_2$=CH—, CH$_2$=CHCH$_2$CH$_2$—, CH$_3$—CH=CH—, CH$_3$—CH$_2$—CH=CH—, CH$_3$—(CH$_2$)$_2$—CH=CH—, CH$_3$—(CH$_2$)$_3$—CH=CH— or CH$_3$—CH=CH—(CH$_2$)$_2$—. R preferably denotes methyl, ethyl, propyl, butyl, pentyl, hexyl, methoxy, ethoxy, propoxy, butoxy or pentoxy. Particularly preferred are compounds of formula T2, wherein (O) is a single bond.

Particularly preferred compounds of the formula FI are selected from the group consisting of the following subformulae:

FI1
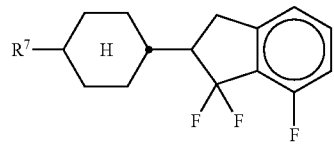

FI2
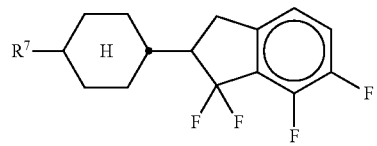

FI3
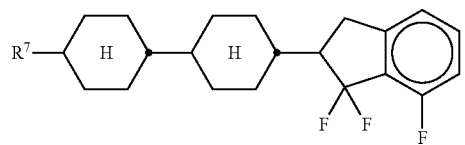

FI4
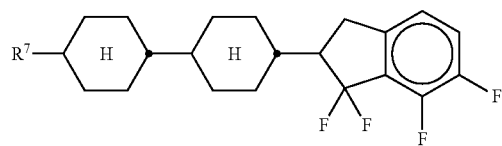

FI5
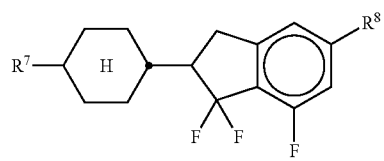

FI6
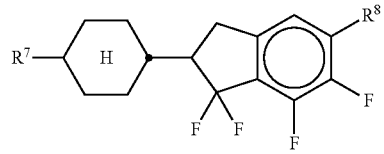

FI7
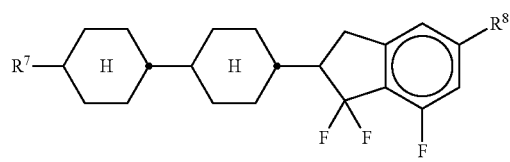

FI8
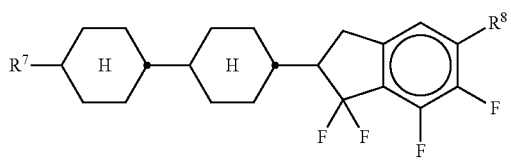

in which R$^7$ preferably denotes straight-chain alkyl, and R$^8$ denotes CH$_3$, C$_2$H$_5$ or n-C$_3$H$_7$. Particular preference is given to the compounds of the formulae FI1, FI2 and FI3.

Particularly preferred compounds of the formula B are of the formula B-1:

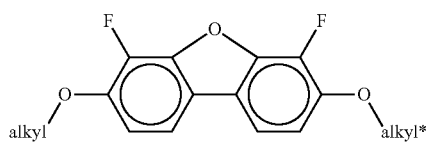

wherein alkyl and alkyl* independently denote a straight-chain alkyl radical having 1 to 7, preferably 2 to 5 C atoms. Media according to the invention preferably contain one or more compounds of formula B or B-1.

The LC medium further comprises one or more self-alignment additives for vertical alignment. Some self-alignment additives for vertical alignment as used herein are known from prior publications. For example the publications WO 2012/038026, EP 2619284 A, WO 2013/004372, WO 2014/094959, WO 2016/015803 and EP 2883934 A disclose suitable additives and their syntheses. As described in these publications, an alignment additive preferably comprises an organic compound with at least one ring structure, preferably with 2, 3 or 4 ring structures, and one or more polar anchor groups. The polar anchor group preferably comprises a noncyclic structure (e.g. alkyl, alkoxy, linear or branched, optionally substituted) having one, two or more polar groups selected from —OH, primary or secondary amine, C(O)OH and —CHO, most preferably —OH group (s). More preferred embodiments of an anchor group are provided by anchor group R$^a$ as defined below.

The self-alignment additives for vertical alignment in summary preferably have a structure of the formula I:

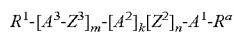

in which
k denotes 0 or 1,
m denotes 0, 1, 2, 3, 4, 5 or 6, preferably 0, 1, 2 or 3,
n denotes 0 or 1,
R$^a$ denotes an anchor group of the formula

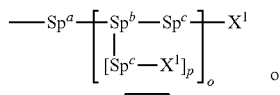

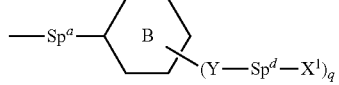

p denotes 1 or 2,
q denotes 2 or 3,

B denotes a substituted or unsubstituted ring system or condensed ring system, preferably a ring system selected from benzene, pyridine, cyclohexane, dioxane or tetrahydropyran, Y independently of one another, denotes —O—, —S—, —C(O)—, —C(O)O—, —OC(O)—, —NR$^{11}$— or a single bond, o denotes 0 or 1, X$^1$, independently of one another, denotes H, alkyl, fluoroalkyl, OH, NH$_2$, NHR$^{11}$, NR$^{11}{}_2$, OR$^{11}$, C(O)OH, —CHO, where at least one group X$^1$ denotes a radical selected from —OH, —NH$_2$, NHR$^{11}$, C(O)OH and —CHO, R$^{11}$ denotes alkyl having 1 to 12 C atoms, Sp$^a$, Sp$^c$, Sp$^d$ each, independently of one another, denote a spacer group or a single bond, Sp$^b$ denotes a tri- or tetravalent group, preferably CH, N or C, A$^1$, A$^2$, A$^3$ each, independently of one another, denote an aromatic, heteroaromatic, alicyclic or heterocyclic group, which may also contain fused rings, and which may also be mono- or polysubstituted by a group L, Z$^2$ denotes —O—, —S—, —CO—, —CO—O—, —OCO—, —O—CO—O—, —OCH$_2$—, —CH$_2$O—, —SCH$_2$—, —CH$_2$S—, —CF$_2$O—, —OCF$_2$—, —CF$_2$S—, —SCF$_2$—, —(CH$_2$)$_{n1}$—, —CF$_2$CH$_2$—, —CH$_2$CF$_2$—, —(CF$_2$)$_{n1}$—, —CH═CH—, —CF═CF—, —C≡C—, —CH═CH—COO—, —OCO—CH═CH—, —(CR$^0$R$^{00}$)$_{n1}$—, Z$^3$ in each case, independently of one another, denotes a single bond, —O—, —S—, —CO—, —CO—O—, —OCO—, —O—CO—O—, —OCH$_2$—, —CH$_2$O—, —SCH$_2$—, —CH$_2$S—, —CF$_2$O—, —OCF$_2$—, —CF$_2$S—, —SCF$_2$—, —(CH$_2$)$_{n1}$—, —CF$_2$CH$_2$—, —CH$_2$CF$_2$—, —(CF$_2$)$_{n1}$—, —CH═CH—, —CF═CF—, —C≡C—, —CH═CH—COO—, —OCO—CH═CH—, —(CR$^0$R$^{00}$)$_{n1}$—, n1 denotes 1, 2, 3 or 4, L in each case, independently of one another, denotes H, F, Cl, Br, I, —CN, —NO$_2$, —NCO, —NCS, —OCN, —SCN, —C(═O)N(R$^0$)$_2$, —C(═O)R$^0$, optionally substituted silyl, optionally substituted aryl or cycloalkyl having 3 to 20 C atoms, or straight-chain or branched alkyl, alkoxy, alkylcarbonyl, alkoxycarbonyl, alkylcarbonyloxy or alkoxycarbonyloxy having 1 to 25 C atoms, in which, in addition, one or more H atoms may be replaced by F or Cl, or -Sp-P Sp denotes a spacer group or a single bond, P is a polymerizable group, R$^0$ in each case, independently of one another, denotes alkyl having 1 to 12 C atoms, R$^{00}$ in each case, independently of one another, denotes H or alkyl having 1 to 12 C atoms, and R$^1$ independently of one another, denotes H, halogen, straight-chain, branched or cyclic alkyl having 1 to 25 C atoms, in which, in addition, one or more non-adjacent CH$_2$ groups may be replaced by —O—, —S—, —CO—, —CO—O—, —O—CO—, —O—CO—O—, —CH═CH— or —C≡C— in such a way that 0 and/or S atoms are not linked directly to one another and in which, in addition, one or more H atoms may be replaced by F or Cl.

The ring groups A$^1$, A$^2$, A$^3$ each independently preferably denote 1,4-phenylene, naphthalene-1,4-diyl or naphthalene-2,6-diyl, where, in addition, one or more CH groups in these groups may be replaced by N, cyclohexane-1,4-diyl, in which, in addition, one or more non-adjacent CH$_2$ groups may be replaced by 0 and/or S, 3,3'-bicyclobutylidene, 1,4-cyclo-hexenylene, bicyclo[1.1.1]pentane-1,3-diyl, bicyclo[2.2.2]octane-1,4-diyl, spiro[3.3]heptane-2,6-diyl, piperidine-1,4-diyl, decahydronaphthalene-2,6-diyl, 1,2,3,4-tetrahydronaphthalene-2,6-diyl, indane-2,5-diyl or octahydro-4,7-methanoindane-2,5-diyl, perhydrocyclopenta[a]phenanthrene-3,17-diyl (in particular gonane-3,17-diyl), where all these groups may be unsubstituted or mono- or polysubstituted by a group L. More preferred groups among these are 1,4-phenylene, naphthalene-1,4-diyl or naphthalene-2,6-diyl, and cyclohexane-1,4-diyl, in which, in addition, one or more non-adjacent CH$_2$ groups may be replaced by O.

The compounds of the formula I (self-alignment additives) preferably encompass compounds of the formulae IA, IB, IC, ID, IE, IF, IG or IH:

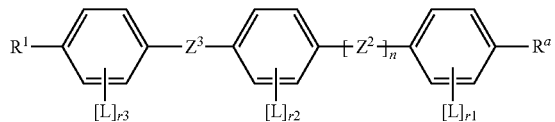

IA

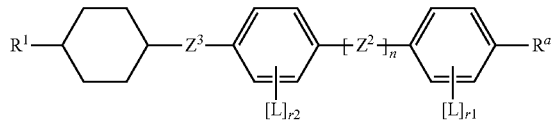

IB

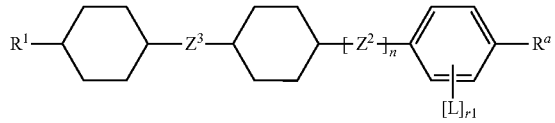

IC

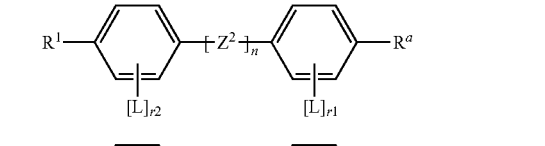

ID

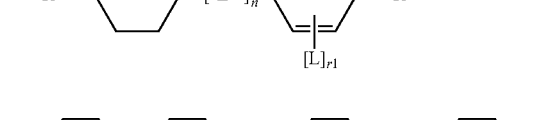

IE

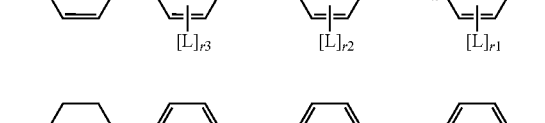

IF

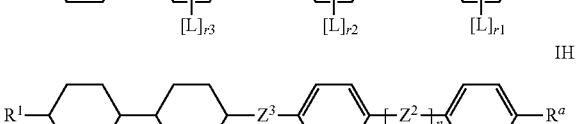

IG

IH in which R$^1$, R$^a$, Z$^2$, Z$^3$, L and n independently are as defined for the above formulae I, and r1, r2, r3 independently denote 0, 1, 2, 3 or 4, preferably 0, 1 or 2.

$Z^2$ and $Z^3$ are independently preferably single bonds.

An anchor group of the formula

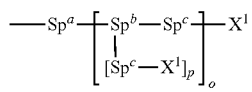

as defined above and below, preferably stands for an anchor group selected from the following formulae:

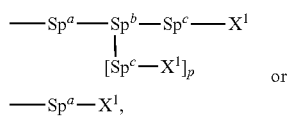

in which in each case independently the groups are as defined above and below, particularly preferably for a group of the formulae

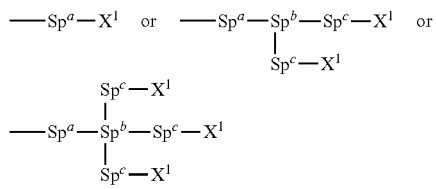

in which in each case independently the groups are as defined above and below.

Particularly preferred anchor groups of the formula $R^a$ are selected from the following part-formulae, where the group $R^a$ is bonded to the group $A^1$ of the formula I or I' via the dashed bond:

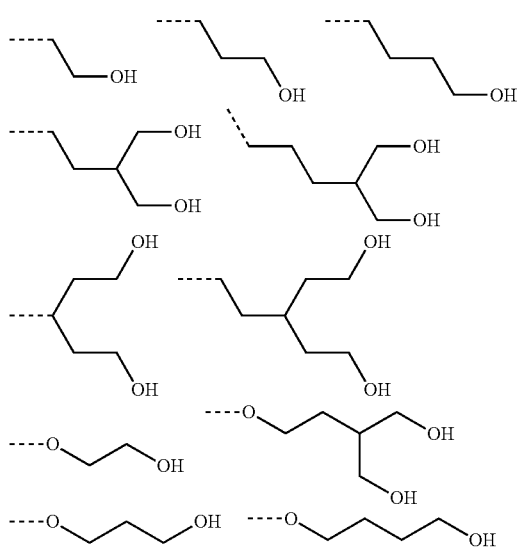
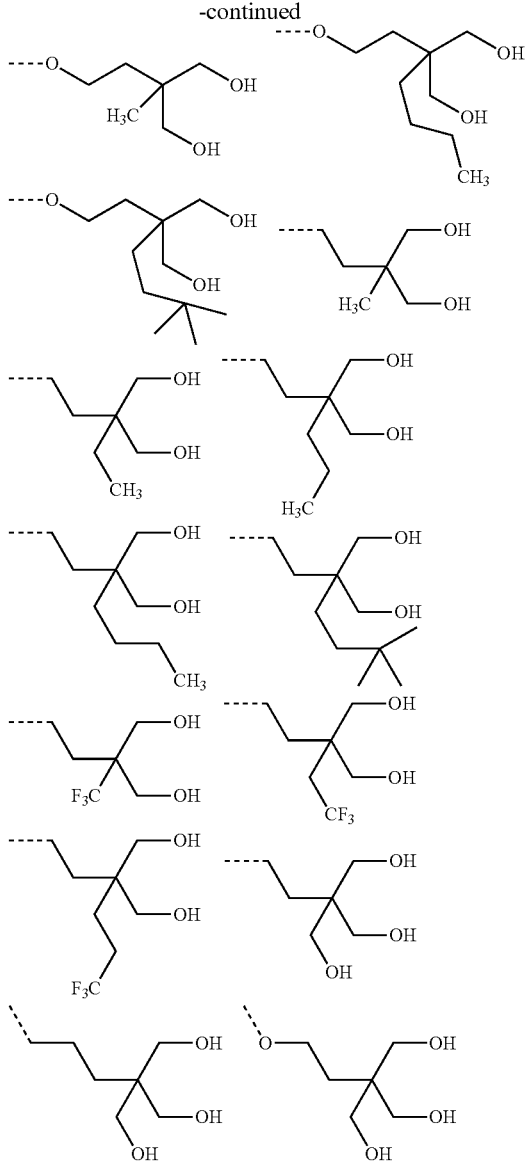

The term "spacer group" or "spacer", generally denoted by "Sp" (or $Sp^{a/c/d/1/2}$) herein, is known to the person skilled in the art and is described in the literature, for example in Pure Appl. Chem. 73(5), 888 (2001) and C. Tschierske, G. Pelzl, S. Diele, Angew. Chem. (2004), 116, 6340-6368. In the present disclosure, the term "spacer group" or "spacer" denotes a connecting group, for example an alkylene group, which connects a mesogenic group to a polymerisable group. Whereas the mesogenic group generally contains rings, the spacer group is generally without ring systems, i.e. is in chain form, where the chain may also be branched. The term chain is applied, for example, to an alkylene group. Substitutions on and in the chain, for example by —O— or —COO—, are generally included. In functional terms, the spacer (the spacer group) is a bridge between linked functional structural parts which facilitates a certain spatial flexibility to one another. The switching layer S according to the invention is composed of the liquid-crystalline medium which comprises a polymer component, where the polymer component preferably consists of a polymeric network which is obtained by polymerisation of reactive mesogens and optionally other monomers or oligomers (prepolymers). The reactive mesogen and monomers are preferably selected from compounds of the following formula M:

$$P^1\text{-}Sp^1\text{-}A^2\text{-}(Z^1\text{-}A^1)_n\text{-}Sp^2\text{-}P^2 \qquad \text{M}$$

in which the individual radicals have the following meanings:

$P^1$, $P^2$ each, independently of one another, denote a polymerisable group, $Sp^1$, $Sp^2$ on each occurrence, identically or differently, denote a spacer group or a single bond, where one or more of the groups $P^1$—$Sp^1$-, -$Sp^2$-$P^2$ may denote a radical $R^{aa}$, with the proviso that at least one of the groups $P^1$-$Sp^1$-, -$Sp^2$-$P^2$ does not denote $R^{aa}$, $A^1$, $A^2$ each, independently of one another, denote a radical selected from the following groups:

a) the group consisting of trans-1,4-cyclohexylene, 1,4-cyclo-hexenylene and 4,4'-bicyclohexylene, in which, in addition, one or more non-adjacent CH$_2$ groups may be replaced by —O— and/or —S— and in which, in addition, one or more H atoms may be replaced by a group L, or a radical of the formula

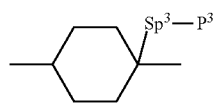

b) the group consisting of 1,4-phenylene and 1,3-phenylene, in which, in addition, one or two CH groups may be replaced by N and in which, in addition, one or more H atoms may be replaced by a group L or -Sp$^3$-P, c) the group consisting of tetrahydropyran-2,5-diyl, 1,3-dioxane-2,5-diyl, tetrahydrofuran-2,5-diyl, cyclobutane-1,3-diyl, piperidine-1,4-diyl, thiophene-2,5-diyl and selenophene-2,5-diyl, each of which may also be mono- or polysubstituted by L, d) the group consisting of saturated, partially unsaturated or fully unsaturated, and optionally substituted, polycyclic radicals having 5 to 20 cyclic C atoms, one or more of which may, in addition, be replaced by heteroatoms, preferably selected from the group consisting of bicyclo[1.1.1]pentane-1,3-diyl, bicyclo[2.2.2]octane-1,4-diyl, spiro[3.3]heptane-2,6-diyl,

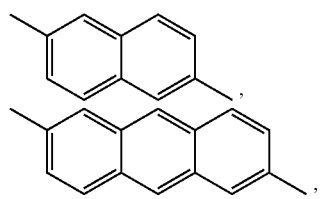

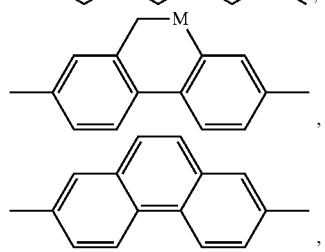

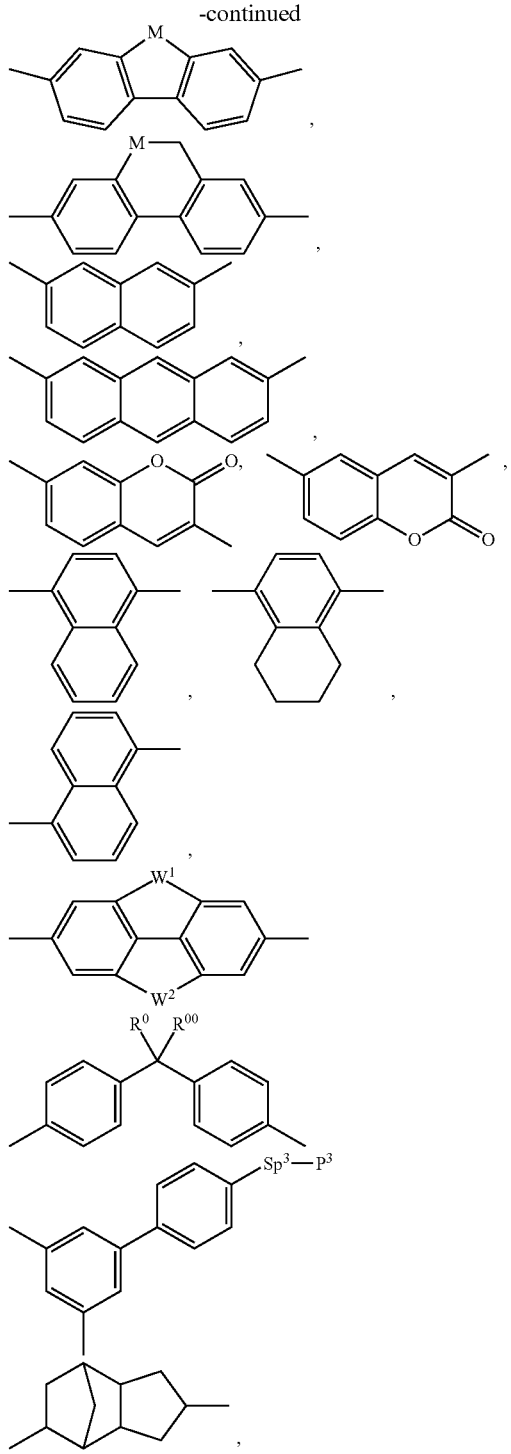

where, in addition, one or more H atoms in these radicals may be replaced by a group L or -Sp$^3$-P, and/or one or more double bonds may be replaced by single bonds, and/or one or more CH groups may be replaced by N, $P^3$ denotes a polymerisable group, $Sp^3$ denotes a spacer group, where one or more of the groups -Sp$^3$-P$^3$ may denote a radical $R^{aa}$, n denotes 0, 1, 2 or 3, preferably 1 or 2, $Z^1$ in each case, independently of one another, denotes —CO—O—, —O—CO—, —CH$_2$O—, —OCH$_2$—, —CF$_2$O—, —OCF$_2$—, or —(CH$_2$)$_n$—, where n is 2, 3 or 4, —O—, —CO—, —C(R$^c$R$^d$)—, —CH$_2$CF$_2$—, —CF$_2$CF$_2$— or a single bond, L on each occurrence, identically or differently, denotes F, Cl, CN, SCN, SF$_5$ or straight-chain or branched, in each case optionally mono- or polyfluorinated alkyl, alkoxy, alkenyl, alkynyl, alkylcarbonyl, alkoxycarbonyl, alkylcarbonyloxy or alkoxycarbonyloxy having 1 to 12 C atoms, $R^0$, $R^{00}$ each, independently of one another, denote H, F or straight-chain or branched alkyl having 1 to 12 C atoms, in which, in addition, one or more H atoms may be replaced by F, M denotes —O—, —S—, —CH$_2$—, —CHY$^1$— or —CY$^1$Y$^2$—, and $Y^1$ and $Y^2$ each, independently of one another, have one of the meanings indicated above for $R^0$ or denote Cl or CN, and preferably H, F, Cl, CN, OCF$_3$ or CF$_3$, $W^1$, $W^2$ each, independently of one another, denote —CH$_2$CH$_2$—, —CH═CH—, —CH$_2$—O—, —O—CH$_2$—, —C(R$^c$R$^d$)— or —O—, $R^c$ and $R^d$ each, independently of one another, denote H or alkyl having 1 to 6 C atoms, preferably H, methyl or ethyl.

$R^{aa}$ denotes H, F, Cl, CN or straight-chain or branched alkyl having 1 to 25 C atoms, in which, in addition, one or more non-adjacent CH$_2$ groups may each be replaced, independently of one another, by C(R$^0$)═C(R$^{00}$)—, —C≡C—, —O—, —S—, —S—, —CO—, —CO—O—, —O—CO—, —O—CO—O— in such a way that O and/or S atoms are not linked directly to one another, and in which, in addition, one or more H atoms may be replaced by F, Cl, CN or P$^1$-Sp$^1$-, particularly preferably straight-chain or branched, optionally mono- or polyfluorinated alkyl, alkoxy, alkenyl, alkynyl, alkylcarbonyl, alkoxycarbonyl or alkylcarbonyloxy having 1 to 12 C atoms (where the alkenyl and alkynyl radicals contain at least two C atoms and the branched radicals contain at least three C atoms), where the groups —OH, —NH$_2$, —SH, —NHR, —C(O)OH and —CHO are not present in $R^{aa}$.

The polymerisable group P, $P^1$, $P^2$ or $P^3$ in the formulae above and below is a group which is suitable for a polymerisation reaction, such as, for example, free-radical or ionic chain polymerisation, polyaddition or polycondensation, or for a polymer-analogous reaction, for example addition or condensation onto a main polymer chain. Particular preference is given to groups for chain polymerisation, in particular those containing a C═C double bond or —C≡C— triple bond, and groups which are suitable for polymerisation with ring opening, such as, for example, oxetane or epoxide groups.

Preferred groups P/P$^1$/P$^2$/P$^3$ are selected from the group consisting of CH$_2$═CW$^2$—(O)$_{k3}$—,

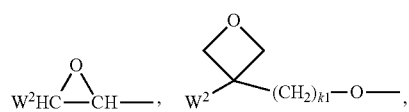

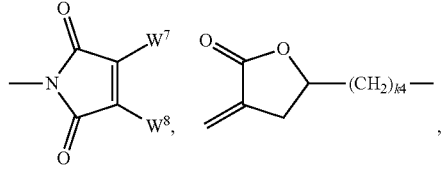

CW$^1$═CH—CO—(O)$_{k3}$—, CH$_3$—CH═CH—O—, (CH$_2$═CH)$_2$CH—OCO—, (CH$_2$═CH—CH$_2$)$_2$CH—OCO—, (CH$_2$═CH)$_2$CH—O—, (CH$_2$═CH—CH$_2$)$_2$N—, (CH$_2$═CH—CH$_2$)$_2$N—CO—, CH$_2$═CH—(COO)$_{k1}$-Phe-(O)$_{k2}$—, CH$_2$═CH—(CO)$_{k1}$-Phe-(O)$_{k2}$—, Phe-CH═CH—, HOOC— and W$^4$W$^5$W$^6$Si—, in which $W^1$ denotes H, F, Cl, CN, CF$_3$, phenyl or alkyl having 1 to 5 C atoms, in particular H, F, Cl or CH$_3$, $W^2$ and $W^3$ each, independently of one another, denote H or alkyl having 1 to 5 C atoms, in particular H, methyl, ethyl or n-propyl, $W^4$, $W^5$ and $W^6$ each, independently of one another, denote Cl, oxaalkyl or oxacarbonylalkyl having 1 to 5 C atoms, $W^7$ and $W^8$ each, independently of one another, denote H, Cl or alkyl having 1 to 5 C atoms, Phe denotes 1,4-phenylene, which is optionally substituted by one or more radicals L as defined above which are other than P-Sp-, $k_1$, $k_2$ and $k_3$ each, independently of one another, denote 0 or 1, $k_3$ preferably denotes 1, and $k_4$ denotes an integer from 1 to 10.

Particularly preferred groups P/P$^1$/P$^2$/P$^3$ are selected from the group consisting of CH$_2$═CW$^1$—CO—O—, CH$_2$═CW$^1$—CO—,

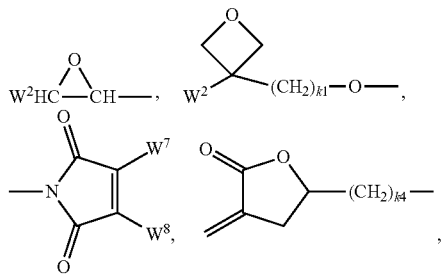

CH$_2$═CW$^2$—O—, CW$^1$═CH—CO—(O)$_{k3}$—, (CH$_2$═CH)$_2$CH—OCO—, (CH$_2$═CH—CH$_2$)$_2$CH—OCO—, (CH$_2$═CH)$_2$CH—O—, (CH$_2$═CH—CH$_2$)$_2$N—, (CH$_2$═CH—CH$_2$)$_2$N—CO—, CH$_2$═CW$^1$—CO—NH—, CH$_2$═CH—(COO)$_{k1}$-Phe-(O)$_{k2}$, CH$_2$═CH—(CO)k$_1$-Phe-(O)$_{k2}$—, Phe-CH═CH— and W$^4$W$^5$W$^6$Si—, in which $W^1$ denotes H, F, Cl, CN, CF$_3$, phenyl or alkyl having 1 to 5 C atoms, in particular H, F, Cl or CH$_3$, $W^2$ and $W^3$ each, independently of one another, denote H or alkyl having 1 to 5 C atoms, in particular H, methyl, ethyl or n-propyl, $W^4$, $W^5$ and $W^6$ each, independently of one another, denote Cl, oxaalkyl or oxacarbonylalkyl having 1 to 5 C atoms, $W^7$ and $W^8$ each, independently of one another, denote H, Cl or alkyl having 1 to 5 C atoms, Phe denotes 1,4-phenylene, $k_1$, $k_2$ and $k_3$ each, independently of one another, denote 0 or 1, $k_3$ preferably denotes 1, and $k_4$ denotes an integer from 1 to 10.

Very particularly preferred groups P/P$^1$/P$^2$/P$^3$ are selected from the group consisting of CH$_2$═CW$^1$—CO—O—, in particular CH$_2$═CH—CO—O—, CH$_2$═C(CH$_3$)—CO—O— and CH$_2$═CF—CO—O—, furthermore CH$_2$═CH—O—, (CH$_2$═CH)$_2$CH—O—CO—, (CH$_2$═CH)$_2$CH—O—,

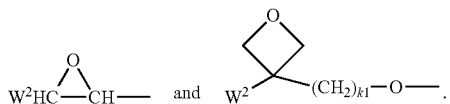

Very particularly preferred groups P/P¹/P²/P³ are therefore selected from the group consisting of acrylate, methacrylate, fluoroacrylate, furthermore vinyloxy, chloroacrylate, oxetane and epoxide groups, and of these in turn preferably an acrylate or methacrylate group.

Preferred spacer groups Sp, $Sp^1$, $Sp^2$ or $Sp^3$ are a single bond or selected from the formula Sp"-X", so that the radical $P^{1/2}$-$Sp^{1/2}$- conforms to the formula $P^{1/2}$-Sp"-X"—, where Sp" denotes alkylene having 1 to 20, preferably 1 to 12, C atoms, which is optionally mono- or polysubstituted by F, Cl, Br, I or CN and in which, in addition, one or more non-adjacent $CH_2$ groups may each be replaced, independently of one another, by —O—, —S—, —Si($R^0R^{00}$)—, —CO—, —CO—O—, —O—CO—, —O—CO—O—, —S—CO—, —CO—S—, —N($R^{00}$)—CO—O—, —O—CO—N($R^{00}$)—, —N($R^{00}$)—CO—N($R^{00}$)—, —CH=CH— or —C≡C— in such a way that O and/or S atoms are not linked directly to one another, X" denotes —O—, —S—, —CO—, —CO—O—, —O—CO—, —O—CO—O—, —CO—N($R^0$)—, —N($R^{00}$)—CO—, —N($R^{00}$)—CO—N($R^{00}$)—, —OCH$_2$—, —CH$_2$O—, —SCH$_2$—, —CH$_2$S—, —CF$_2$O—, —OCF$_2$—, —CF$_2$S—, —SCF$_2$—, —CF$_2$CH$_2$—, —CH$_2$CF$_2$—, —CF$_2$CF$_2$—, —CH=N—, —N=CH—, —N=N—, —CH=CR$^0$—, —CY$^2$=CY$^3$—, —C≡C—, —CH=CH—CO—O—, —O—CO—CH=CH— or a single bond, $R^{00}$ in each case independently denotes alkyl having 1 to 12 C atoms, $R^{000}$ in each case independently denotes H or alkyl having 1 to 12 C atoms, and $Y^2$ and $Y^3$ each, independently of one another, denote H, F, Cl or CN.

X" is preferably —O—, —S—, —CO—, —COO—, —OCO—, —O—COO— or a single bond.

Typical spacer groups Sp" are, for example, a single bond, —(CH$_2$)$_{p1}$—, —(CH$_2$CH$_2$O)$_{q1}$—CH$_2$CH$_2$—, —CH$_2$CH$_2$—S—CH$_2$CH$_2$—, or —(SiR$^0$R$^{000}$—O)$_{p1}$—, in which p1 is an integer from 1 to 12, q1 is an integer from 1 to 3, and $R^{00}$ and $R^{000}$ have the meanings indicated above.

Particularly preferred groups -Sp"-X"— are —(CH$_2$)$_{p1}$—, —(CH$_2$)$_{p1}$—O—, —(CH$_2$)$_{p1}$—O—CO—, —(CH$_2$)$_{p1}$—O—CO—O—, in which p1 and q1 have the meanings indicated above.

Particularly preferred groups Sp" are, for example, in each case straight-chain ethylene, propylene, butylene, pentylene, hexylene, heptylene, octyl-ene, nonylene, decylene, undecylene, dodecylene, octadecylene, ethylene-oxyethylene, methyleneoxybutylene, ethylenethioethylene, ethylene-N-methyliminoethylene, 1-methylalkylene, ethenylene, propenylene and butenylene.

The substances of the formula M do not contain an anchor group, i.e. do not contain a group —OH, —NH$_2$, —SH, —NHR$^{11}$, —C(O)OH or —CHO.

Suitable and preferred (co)monomers for use in displays according to the invention are selected, for example, from the following formulae:

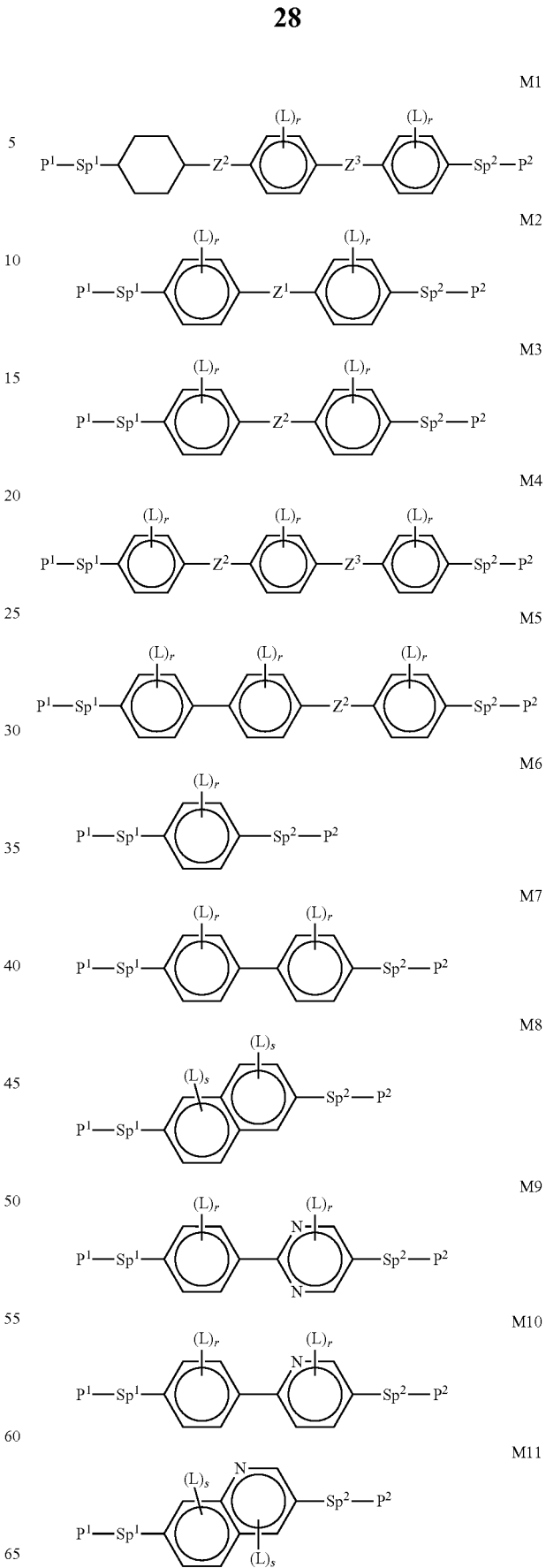

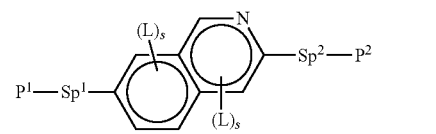 M12
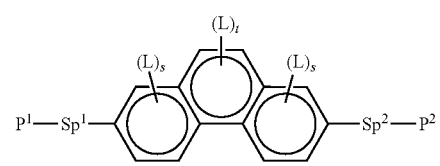 M13
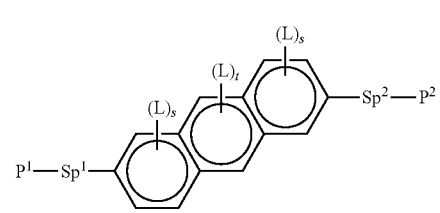 M14
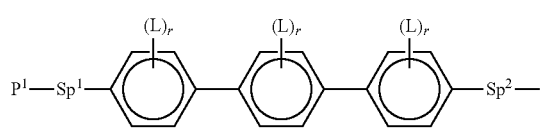 M15
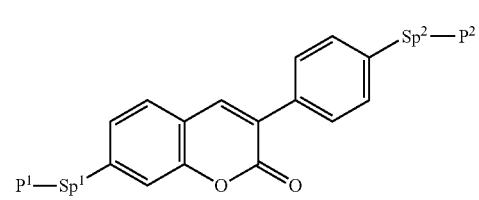 M16
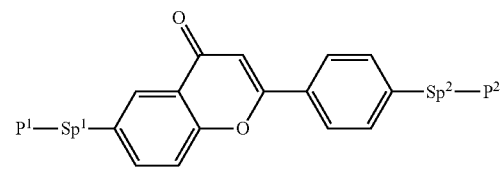 M17
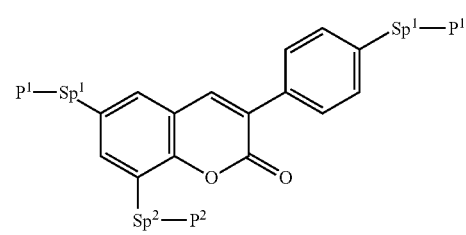 M18
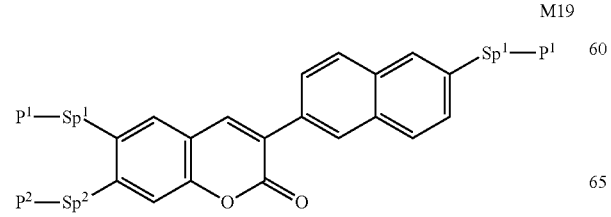 M19
 M20
 M21
 M22
 M23
 M24
 M25
 M26

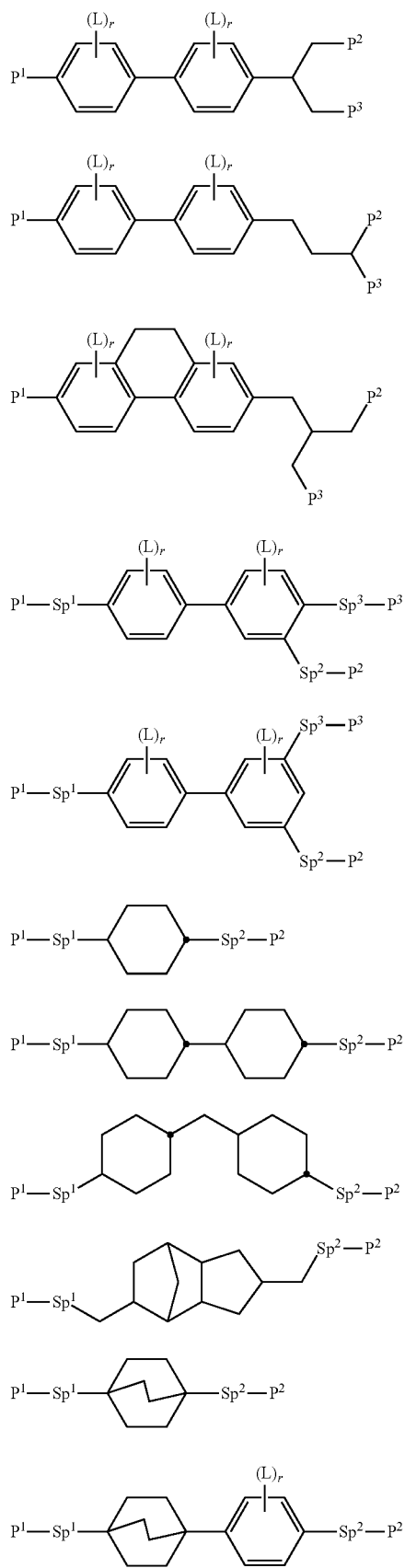
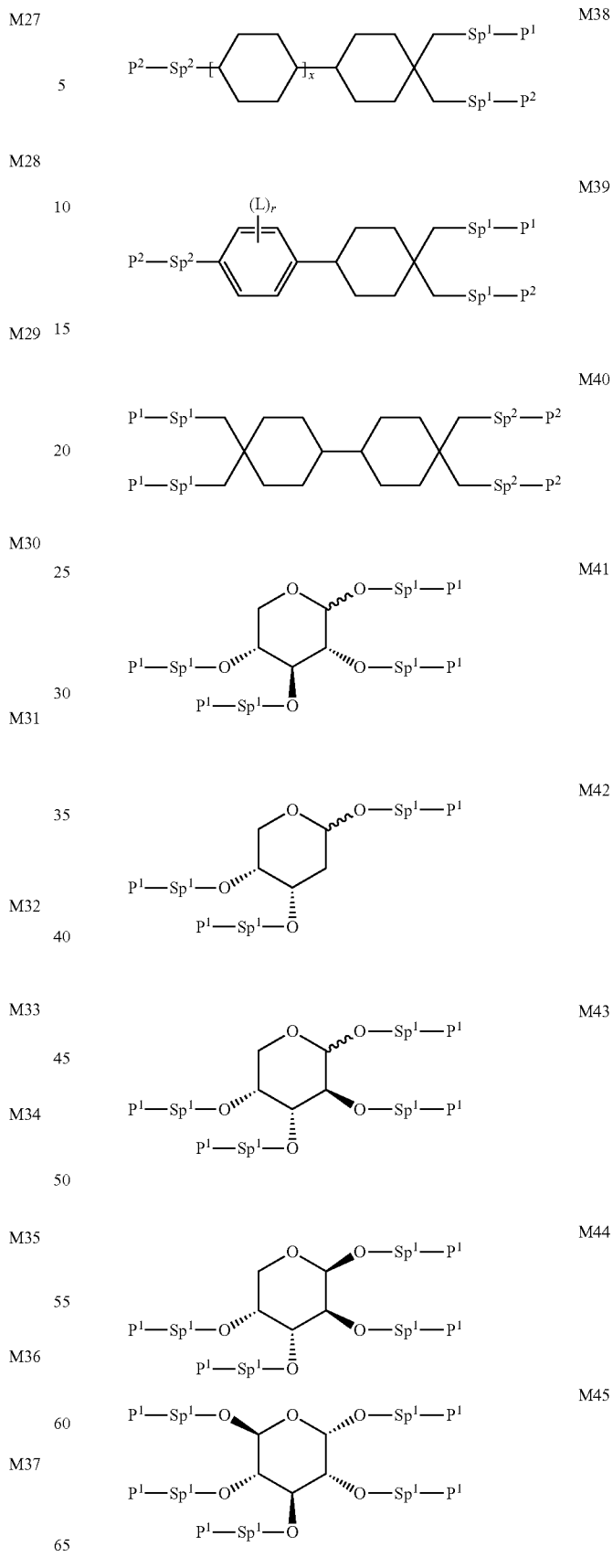

in which the individual radicals have the following meanings:

P$^1$, P$^2$ and P$^3$ each, independently of one another, denote a polymerisable group, preferably having one of the meanings indicated above and below for P, preferably an acrylate, methacrylate, fluoroacrylate, oxetane, vinyloxy or epoxide group, Sp$^1$, Sp$^2$ and Sp$^3$ each, independently of one another, denote a single bond or a spacer group, preferably having one of the meanings indicated above and below for M, and particularly preferably —(CH$_2$)$_{p1}$—, —(CH$_2$)$_{p1}$—O—, —(CH$_2$)$_{p1}$—CO—O— or —(CH$_2$)$_{p1}$—O—CO—O—, in which p1 is an integer from 1 to 12, and where the bonding to the adjacent ring in the last-mentioned groups takes place via the 0 atom, where, in addition, one or more of the radicals P$^1$-Sp$^1$-, P$^2$—Sp$^2$- and P$^3$—Sp$^3$- may denote a radical R$^{aa}$, with the proviso that at least one of the radicals P$^1$-Sp$^1$-, P$^2$—Sp$^2$- and P$^3$—Sp$^3$- present does not denote R$^{aa}$, R$^{aa}$ denotes H, F, Cl, CN or straight-chain or branched alkyl having 1 to 25 C atoms, in which, in addition, one or more non-adjacent CH$_2$ groups may each be replaced, independently of one another, by C(R$^0$)=C(R$^0$)—, —C≡C—, —O—, —S—, —CO—, —CO—O—, —O—CO—, —O—CO—O— in such a way that O and/or S atoms are not linked directly to one another, and in which, in addition, one or more H atoms may be replaced by F, Cl, CN or P$^1$-Sp$^1$-, preferably straight-chain or branched, optionally mono- or polyfluorinated alkyl, alkoxy, alkenyl, alkynyl, alkylcarbonyl, alkoxycarbonyl or alkylcarbonyloxy having 1 to 12 C atoms (where the alkenyl and alkynyl radicals have at least two C atoms and the branched radicals have at least three C atoms), where —OH, —NH$_2$, —SH, —NHR, —C(O)OH and —CHO are not present in the group R$^{aa}$, R$^0$, R$^{00}$ each, independently of one another and on each occurrence identically or differently, denote H or alkyl having 1 to 12 C atoms, R$^y$ and R$^z$ each, independently of one another, denote H, F, CH$_3$ or CF$_3$, X$^1$, X$^2$ and X$^3$ each, independently of one another, denote —CO—O—, O—CO— or a single bond, Z$^1$ denotes —O—, —CO—, —C(R$^y$R$^z$)— or —CF$_2$CF$_2$—, Z$^2$ and Z$^3$ each, independently of one another, denote —CO—O—, —O—CO—, —CH$_2$O—, —OCH$_2$—, —CF$_2$O—, —OCF$_2$— or —(CH$_2$)$_n$—, where n is 2, 3 or 4, L on each occurrence, identically or differently, denotes F, Cl, CN, SCN, SF$_5$ or straight-chain or branched, optionally mono- or polyfluorinated alkyl, alkoxy, alkenyl, alkynyl, alkylcarbonyl, alkoxycarbonyl, alkylcarbonyloxy or alkoxycarbonyloxy having 1 to 12 C atoms, preferably F, L' and L" each, independently of one another, denote H, F or Cl, r denotes 0, 1, 2, 3 or 4, s denotes 0, 1, 2 or 3, t denotes 0, 1 or 2, x denotes 0 or 1.

In the compounds of the formulae M1 to M42, the ring group

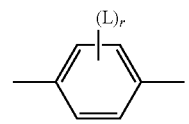

preferably denotes

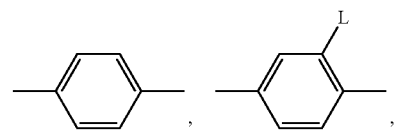

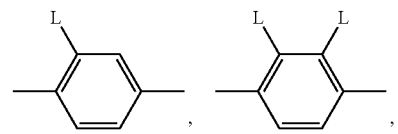

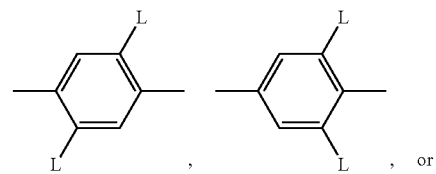

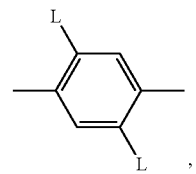

in which L, on each occurrence identically or differently, has one of the above meanings and preferably denotes F, Cl, CN, NO$_2$, CH$_3$, C$_2$H$_5$, C(CH$_3$)$_3$, CH(CH$_3$)$_2$, CH$_2$CH(CH$_3$)C$_2$H$_5$, OCH$_3$, OC$_2$H$_5$, COCH$_3$, COC$_2$H$_5$, COOCH$_3$, COOC$_2$H$_5$, CF$_3$, OCF$_3$, OCHF$_2$, OC$_2$F$_5$ or P-Sp-, particularly preferably F, Cl, CN, CH$_3$, C$_2$H$_5$, OCH$_3$, COCH$_3$, OCF$_3$ or P-Sp-, very particularly preferably F, Cl, CH$_3$, OCH$_3$, COCH$_3$ or OCF$_3$, in particular F or CH$_3$.

Preferred structures of reactive mesogen are of the formulae M1, M2, M3, M4 and M5.

The reactive mesogen is most preferably selected from one or more of the following structural formulae RM-1 to RM-5:

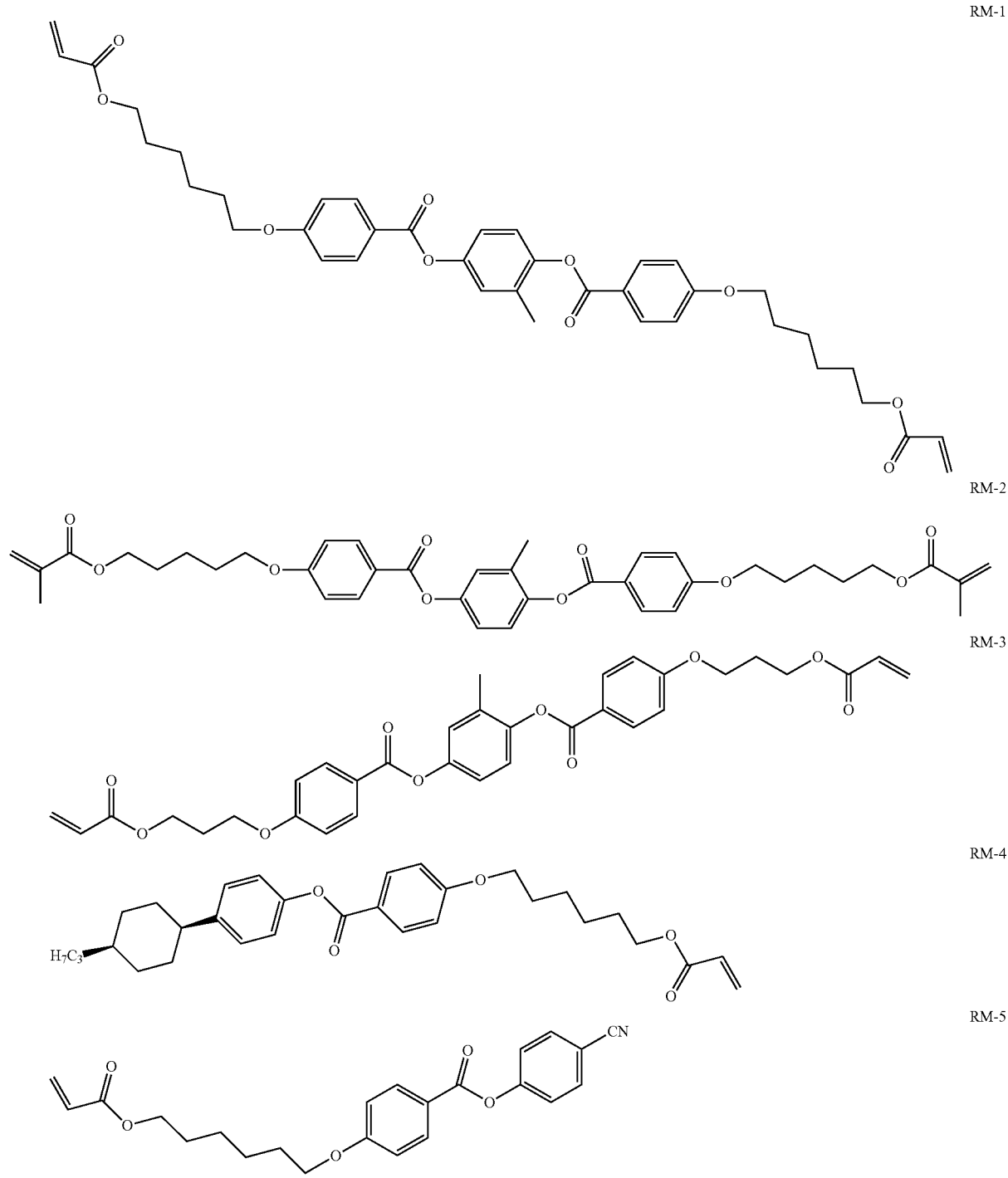

The nematically arranged molecules and the polymeric network are preferably homogeneously distributed in one another. This means that, at least visually or on a macroscopic scale, no droplet formation of the nematically arranged molecules is observed. Without being bound by theory, it is believed that the polymer network forms domains on a microscopic scale, which could be attributed to the generation of haze.

The nematically arranged molecules are preferably employed in the form of a mixture of liquid-crystalline nematic molecules, where the mixture has a refractive index anisotropy $\Delta n$ and a dielectric anisotropy $\Delta \varepsilon$. The mixture of liquid-crystalline nematic molecules preferably has a refractive index anisotropy $\Delta n$ in the range from 0.03 to 0.40, particularly preferably in the range from 0.06 to 0.30, and/or a dielectric anisotropy $\Delta \varepsilon$ in the range from −50 to +100, particularly preferably in the range from −15 to +70. Preference is given to liquid-crystalline mixtures having a strong negative dielectric anisotropy $\Delta \varepsilon$, which particularly preferably has a value between −9 and −2, more preferably between −7.5 to −2.5. Alternatively, preference is given to liquid-crystalline mixtures having a positive dielectric anisotropy Δε, which particularly preferably has a value between 3 and 50, very particularly preferably a value between 5 and 20. For such switching devices an electric field with a horizontal portion (parallel to the substrate) should be used for switching.

In a preferred embodiment of the switching layer S according to the invention the polymerizable or polymer component is comprised in a proportion by weight, based on the mixture as a whole (including low-molecular-weight liquid-crystalline component, polymerizable component and additives), in the range<50% by weight, more preferably in the range<30% by weight and very particularly preferably in the range<25% by weight. The lower end of the proportion by weight of the polymerizable or polymer component is 6% or more, preferably >8%, more preferably 10% by weight or more, and most preferably 12% or more. The low-molecular-weight liquid-crystalline component preferably has a proportion by weight in the range from 50% by weight or more, more preferably 80% or more, and preferably 95% by weight or less on the upper end. Altogether, the polymeric component (polymer network) preferably has a proportion by weight in the range from 50% by weight to 6% by weight, in each case based on the weight of the precursor mixture as a whole.

As already mentioned, the polymeric network is obtained by polymerisation of a reactive mesogen. Use is preferably made of a photoinitiator. Many suitable (photo)initiators are known in the art for each class of monomers.

The initiators used here are preferably of the benzophenon derivative type, particularly preferably a photoinitiator of the following structural formula:

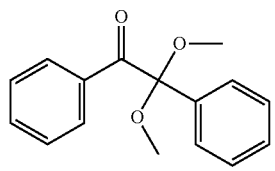 [SMILES: COC(OC)(C(=O)c1ccccc1)c1ccccc1]

which is currently available from BASF under the name Irgacure® 651. It is suitable for (meth)acrylate mixtures. Many other commercially available photoinitiators are known. The suitable photoinitiator for a given monomer other than (meth)acrylate can be selected by the skilled person. The mixture for polymerisation and for subsequent use in the switching layer S according to the invention preferably comprises, based on its weight, 0.01% to 4% by weight of photoinitiator.

The reactive mesogen may consist of one compound or a plurality of compounds, for example of monofunctional and multifunctional reactive mesogens. The multifunctional reactive mesogen components generally ensure crosslinking.

In a further preferred embodiment, a photoinitiator is omitted. The component of the reactive mesogen used comprises reactive mesogens which are able to initiate polymerisation themselves by means of light>340 nm.

In general, the liquid-crystalline medium preferably has a clearing point of >90° C., more preferably >100° C. or >105° C. and very particularly preferably >110° C.

Furthermore, the liquid-crystalline medium of the switching layer S according to the invention generally preferably has a specific resistance of >1.0·10$^9$ ohm·cm, particularly preferably >1.0·10$^{11}$ ohm·cm.

The switching layer S according to the invention may preferably comprise at least one dichroic dye in a dye concentration in the range from 0.01% by weight to 25% by weight, particularly preferably in the range from 0.1% by weight to 15% by weight, based on the weight of the liquid-crystalline medium.

However, embodiments in which the switching layer S comprises no dyes are also preferred. This has the advantage of a simpler structure of the switching element or higher transmission in the bright state, or both.

Furthermore, the optical appearance of the switching element in this case is white, i.e. uncoloured, which is desirable for certain applications, and the lifetime of the switching element in the presence of extensive heat and light irradiation may be longer.

For the purposes of the present application, the term "dichroic dye" is taken to mean a light-absorbent compound whose absorption properties are dependent on the orientation of the molecules relative to the direction of polarisation of the light. Typically, a dichroic dye in accordance with the present application has an elongate shape, i.e. the dye molecules are significantly longer in one spatial direction (longitudinal axis) than in the other two spatial directions.

The switching layer according to the invention optionally preferably comprises three dichroic dyes, where the absorption spectra of the dichroic dyes preferably complement one another in such a way that the impression of a black or grey colour arises for the human eye.

The dye compounds are preferably selected from azo compounds, anthraquinones, methine compounds, azomethine compounds, merocyanine compounds, naphthoquinones, tetrazines, rylenes, benzothiadiazoles, pyrromethenes, diketopyrrolopyrroles, thienothiadiazoles and malononitriles. Of these, particular preference is given to azo compounds, anthraquinones, rylenes, in particular as disclosed in WO 2014/090373, benzothiadiazoles, in particular as disclosed in WO 2014/187529, diketopyrrolopyrroles, in particular as disclosed in the as yet unpublished application EP 13005918.1, thienothiadiazoles, in particular as disclosed in the as yet unpublished application EP 14002950.5, and malononitriles, in particular as disclosed in the as yet unpublished application EP 14004145.0.

The following dyes, whose structures are depicted below, are particularly preferably employed:

D1

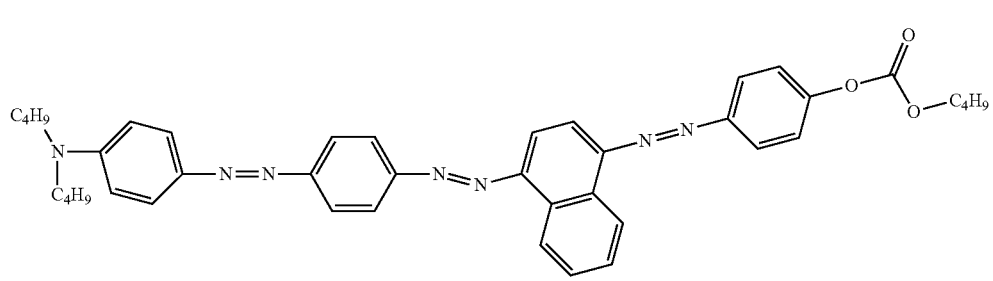

-continued

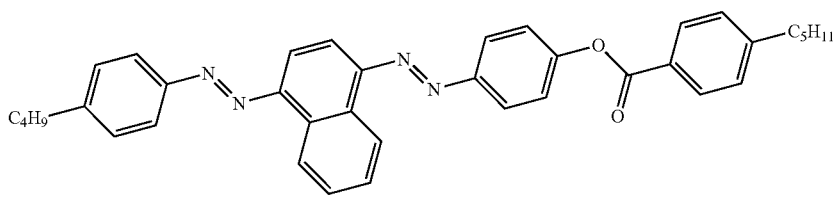

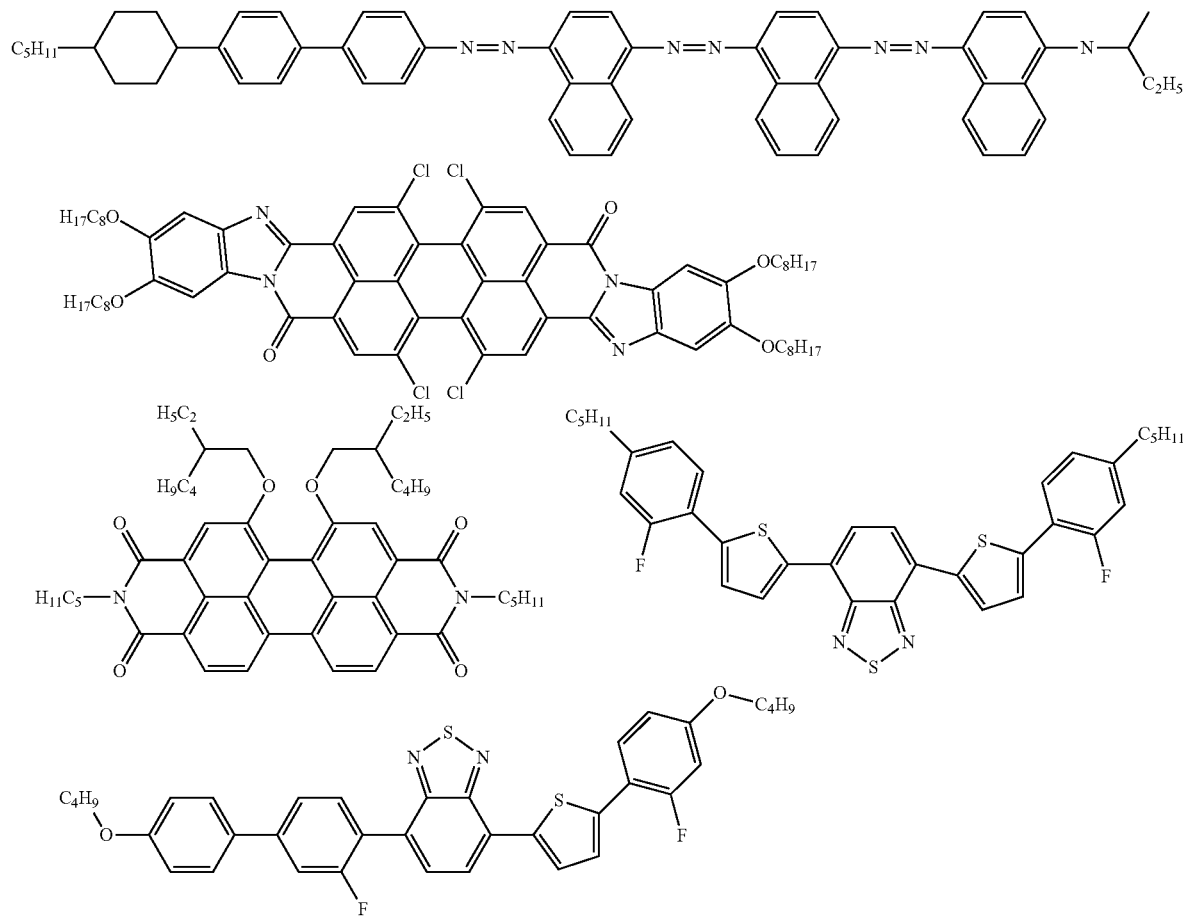

The switching layer S according to the invention preferably has a thickness in the range from 1 μm to 300 μm, particularly preferably in the range from 3 μm to 100 μm, very particularly preferably in the range 20-100 μm. This applies in the case where the switching element according to the invention has precisely one switching layer S. If the switching element has a plurality of switching layers S which are arranged one after the other, the sum of the thicknesses of these layers is preferably 5-200 μm, particularly preferably 10-100 μm.

In a further preferred embodiment, the switching layer S according to the invention has a thickness in the range from 3 μm to 200 μm, preferably a thickness in the range from 3 to 75 μm, and the total transmission $T_{total}$ is in the range from 0.3 to 1 and the diffusive transmission $T_d$ is in the range from 0.25 to 1 in the opaque switching state at a wavelength of the light rays of 550 nm, In preferred embodiments, the switching layer S according to the invention has a diffusive transmittance of $T_d > 0.25$, particularly preferably $T_d > 0.30$, very particularly preferably $T_d > 0.35$, and most preferably $T_d > 0.40$, in one of the switching states, preferably in the presence of a voltage.

In a further preferred embodiment, the switching layer S according to the invention has a diffusive haze H<5% in another switching state, preferably the voltage-free state, where a diffusive haze H<3% is particularly preferred.

In the preferred embodiment, the non-scattering state preferably occurs without an applied voltage, and the scattering state preferably occurs at voltages in the range from 5 to 200 V, particularly preferably between 20 and 100 V.

In a further preferred embodiment the switching layer S according to the invention provides an opaque scattering switching state with a value of the haze H from 25 to 100%, preferably from 60 to 100%, more preferably from 70 to 100% and most preferably from 80 to 100%.

In a further preferred embodiment, the switching layer S according to the invention preferably scatters less than 45%, particularly preferably less than 20%, more preferably less than 10% and very particularly preferably less than 5% of the parallel light rays in backwards scattering directions D(>) from the upper switching layer plane USLP in one of the switching states. This low backwards scattering is particularly preferably present in all of the switching states of the switching layer, in particular also in the scattering switching state of the switching layer.

In a further preferred embodiment, the switching layer S according to the invention has a range of control of the total transmission within a total transmission range from 0% to 80%, where the range of control is at least 15%.

The switching layer S according to the invention may be present in a multi-switching layer device together with further switching layers comprising liquid-crystalline medium. The additional switching layers here may be further switching layers S, and/or they may be switching layers which switch from bright to dark without having a scattering switching state. Especial preference is given to multi-switching layer devices comprising two, three or four switching layers, particularly preferably those comprising two or three switching layers. Preferably, at least one of these switching layers is a switching layer which has no scattering switching state.

The present invention furthermore encompasses a switching element comprising a switching layer S of the type described above, where the switching layer S is arranged in a first layer sequence, and where the first layer sequence comprises, from the outside inward, an outer substrate layer,
an outer electrically conductive layer,
the switching layer S,
an inner electrically conductive layer and
an inner substrate layer.

The outer and inner substrate layers may consist of glass or of a polymer, in particular of glass, polyethylene terephthalate (PET), polyethylene naphthalate (PEN), polyvinylbutyral (PVB), polymethyl methacrylate (PMMA), polycarbonate (PC), polyimide (PI), COP (cyclic olefin polymers) or TAC (triacetylcellulose).

The outer and inner electrically conductive layers may consist of electrically conductive transparent oxides (TCO), preferably ITO or $SnO_2$:F, or of a thin transparent metal and/or metal oxide layer, for example of silver. The outer and inner electrically conductive layers are preferably provided with electri-cal connections. The voltage supply is preferably provided by a battery, a rechargeable battery, a supercapacitor or an external current source.

In a further preferred embodiment of the switching element according to the invention, the switching element has a second layer sequence on the outer substrate layer of the first layer sequence and/or on the inner substrate layer of the first layer sequence, where the second layer sequence comprises, from the outside inward, a substrate layer,
an electrically conductive layer,
a switching layer comprising a second liquid-crystalline medium,
an electrically conductive layer and
a substrate layer.

For preferred embodiments of substrate layer, electrically conductive layer and alignment layer of the second layer sequence, the same as has already been explained in the description of the corresponding layers of the first layer sequence applies correspondingly. The liquid-crystalline medium of the switching layer of the second layer sequence is preferably not forwards-scattering but contains one or more dichroic dyes. Alternatively and likewise preferably, the switching layer of the second layer sequence may be a further switching layer S, i.e. a switching layer which has a scattering state.

Furthermore, the present invention encompasses a window element containing a switching element of the type described above. For the purposes of the present invention, the term "window element" means a light-transmitting component of a window, i.e. a glass pane of a single- or multiple-glazed window, which is intended for or equivalent to part of a building wall.

The glass pane has a side (outside) facing the incident parallel light rays, and a side (inside) facing away from the incident parallel light rays. The switching element of the type described above may be arranged on the outside or inside of the window element according to the invention.

However, the switching element according to the invention can be employed not only in a window, but also in the inside of rooms, for example in dividing walls between rooms and elements for the separation of individual compartments of rooms. In this case, a visual barrier can be generated between the room parts by the privacy achieved by the switching of the switching element from scattering to clear.

Furthermore, the switching element of the type described above can be built into a cladding element suspended in front, where the cladding element suspended in front is arranged in front of the outside of the window. Incident parallel light rays are thereby scattered at a greater separation from an observer who is located in a room adjoining the inside of the window. The greater separation increases the probability that light scattered at small scattering angles passes by the observer and consequently does not dazzle him.

Measurement Methods

The measurements of the measurement quantities used in the present invention are carried out in a Perkin Elmer Lambda 1050 UV/VIS/NIR spectrometer with 150 mm integration sphere (Ulbricht sphere). The values for the transmission intensities are in each case determined averaged over the spectral region from 380 to 780 nm. "Averaged" here is taken to mean numerically averaged.

For measurement of the intensity of large-angle scattering $I_{\geq 2.5°}$, the sample is mounted directly on the sample holder of the integration sphere. The integration sphere is opened. Exiting light is collected in a light trap, i.e. in a non-reflective black medium, for example in a black, non-reflective cloth, so that light having an aperture angle less than 2.5° leaves the sphere and no longer enters the measurement.

For measurement of the intensity of the total transmission $I_t$, the sample is mounted directly on the sample holder at the entrance of the integration sphere. The integration sphere (Ulbricht sphere) is closed and guides all light passing through the sample, i.e. both unscattered and also scattered light, to the detector.

Measurements are made with or without driving voltage at the switching medium, in order to obtain the characteristic intensities in different switching states. For a full characterisation, intensity versus voltage curves are measured.

For measurement of the backwards scattering intensity, the sample is mounted at the opened exit aperture of the integration sphere. A light trap is located in the further light path behind the sample. Light reflected by the sample reaches the detector via the integration sphere and is measured. Non-reflected light leaves the integration sphere without reaching the detector.

Free from scattering below is intended to mean a value of $T_d$ of less than 0.03, preferably less than 0.01. In practical embodiments a value of $T_d$ equal to zero will never be fully achievable.

Throughout the patent application, 1,4-cyclohexylene rings and 1,4-phenylene rings respectively are depicted as follows:

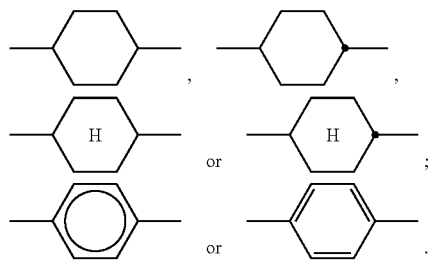

Throughout the patent application and in the working examples, the structures of the liquid-crystalline compounds are indicated by means of acronyms. Unless indicated otherwise, the transformation into chemical formulae is carried out in accordance with Tables 1-3. All radicals $C_nH_{2n+1}$, $C_mH_{2m+1}$ and $C_{m'}H_{2m'+1}$ or $C_nH_{2n}$ and $C_mH_{2m}$ are straight-chain alkyl radicals or alkylene radicals in each case having n, m, m' or z C atoms respectively. n, m, m', z each denote, independently of one another, 1, 2, 3, 4, 5, 6, 7, 8, 9, 10, 11 or 12, preferably 1, 2, 3, 4, 5 or 6. In Table 1 the ring elements of the respective compound are coded, in Table 2 the bridging members are listed and in Table 3 the meanings of the symbols for the left-hand or right-hand side chains of the compounds are indicated.

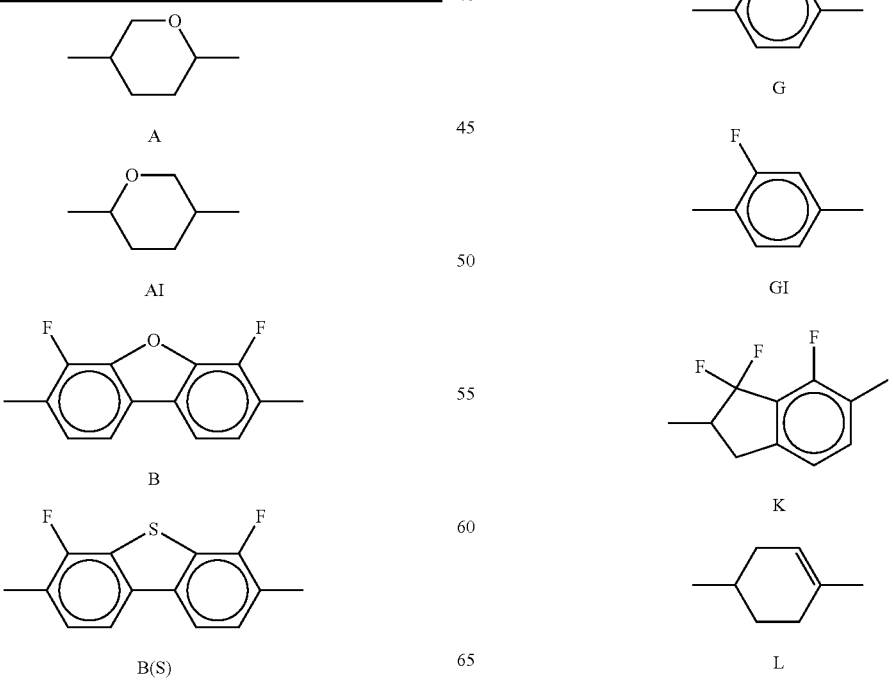

TABLE 1-continued

Ring elements

| Symbol | Structure |
|---|---|
| LI | cyclohexene (1,4-disubstituted cyclohex-1-ene) |
| M | pyrimidine (2,5-disubstituted, N at 1,3) |
| MI | pyrimidine (2,5-disubstituted, alternate orientation) |
| N | pyridine |
| NI | pyridine (alternate orientation) |
| P | 1,4-phenylene |
| S | 2,5-thiophene |
| U | 2,3-difluoro-1,4-phenylene |
| UI | 2,6-difluoro-1,4-phenylene |
| Y | 2,3-difluoro-1,4-phenylene (alt.) |
| Y(F, Cl) | 2-fluoro-3-chloro-1,4-phenylene |
| Y(Cl, F) | 2-chloro-3-fluoro-1,4-phenylene |

TABLE 2

Bridging members

| Symbol | Group | Symbol | Group |
|---|---|---|---|
| E | —CH$_2$CH$_2$— | | |
| V | —CH=CH— | | |
| T | —C≡C— | | |
| W | —CF$_2$CF$_2$— | | |
| Z | —COO— | ZI | —OCO— |
| O | —CH$_2$O— | OI | —OCH$_2$— |
| Q | —CF$_2$O— | QI | —OCF$_2$— |

TABLE 3

Side chains

| Left-hand side chain | | Right-hand side chain | |
|---|---|---|---|
| n- | C$_n$H$_{2n+1}$— | -n | —C$_n$H$_{2n+1}$ |
| nO- | C$_n$H$_{2n+1}$—O— | -On | —O—C$_n$H$_{2n+1}$ |
| V— | CH$_2$=CH— | —V | —CH=CH$_2$ |
| nV- | C$_n$H$_{2n+1}$—CH=CH— | -nV | —C$_n$H$_{2n}$—CH=CH$_2$ |
| Vn- | CH$_2$=CH—C$_n$H$_{2n}$— | -Vn | —CH=CH—C$_n$H$_{2n+1}$ |
| nVm- | C$_n$H$_{2n+1}$—CH=CH—C$_m$H$_{2m}$— | -nVm | —C$_n$H$_{2n}$—CH=CH—C$_m$H$_{2m+1}$ |
| N— | N≡C— | —N | —C≡N |
| F— | F— | —F | —F |
| Cl— | Cl— | —Cl | —Cl |

TABLE 3-continued

| Side chains | | | |
|---|---|---|---|
| Left-hand side chain | | Right-hand side chain | |
| M- | CFH$_2$— | -M | —CFH$_2$ |
| D- | CF$_2$H— | -D | —CF$_2$H |
| T- | CF$_3$— | -T | —CF$_3$ |
| MO- | CFH$_2$O— | -OM | —OCFH$_2$ |
| DO- | CF$_2$HO— | -OD | —OCF$_2$H |
| TO- | CF$_3$O— | -OT | —OCF$_3$ |
| T- | CF$_3$— | -T | —CF$_3$ |
| A- | H—C≡C— | -A | —C≡C—H |

In a preferred embodiment the switching layers or LC media according to the invention contain at least two compounds selected from the compounds listed in Table A. The compounds are part of the (non-polymerizable) liquid-crystalline low-molecular-weight component.

TABLE A

The following abbreviations are used:
(n, m, m', z: each, independently of one another, 1, 2, 3, 4, 5 or 6;
(O)C$_m$H$_{2m+1}$ denotes OC$_m$H$_{2m+1}$ or C$_m$H$_{2m+1}$)

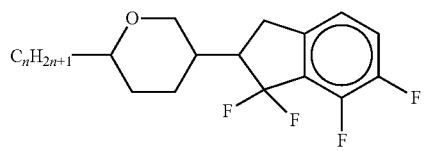

AIK-n-F

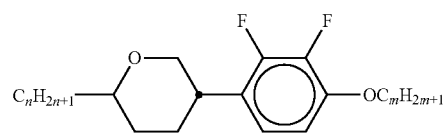

AIY-n-Om

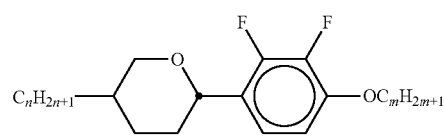

AY-n-Om

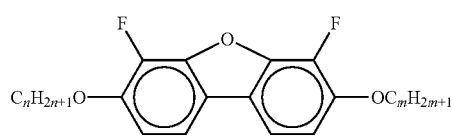

B-nO-Om

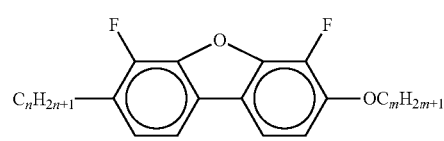

B-n-Om

TABLE A-continued
The following abbreviations are used:
(n, m, m', z: each, independently of one another, 1, 2, 3, 4, 5 or 6;
(O)$C_mH_{2m+1}$ denotes $OC_mH_{2m+1}$ or $C_mH_{2m+1}$)
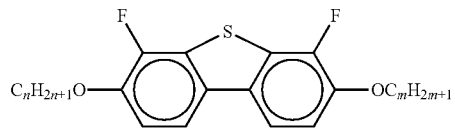
B(S)-nO-Om
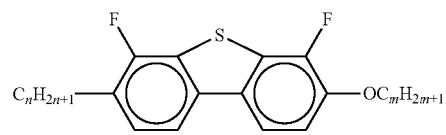
B(S)-n-Om
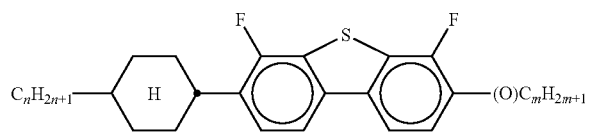
CB(S)-n-(O)m
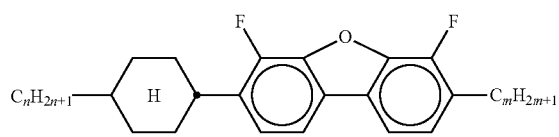
CB-n-m
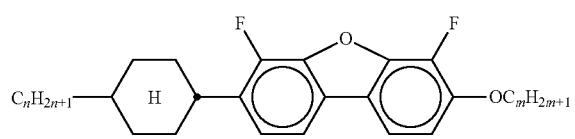
CB-n-Om
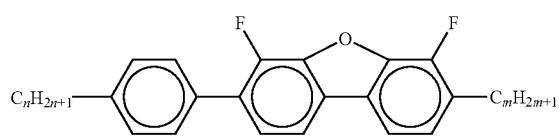
PB-n-m
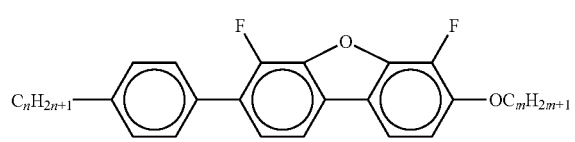
PB-n-Om
BCH-nm TABLE A-continued
The following abbreviations are used:
(n, m, m', z: each, independently of one another, 1, 2, 3, 4, 5 or 6;
$(O)C_mH_{2m+1}$ denotes $OC_mH_{2m+1}$ or $C_mH_{2m+1}$)
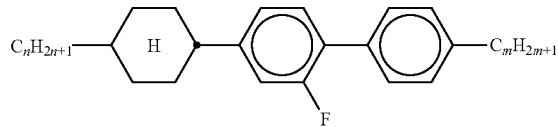
BCH-nmF
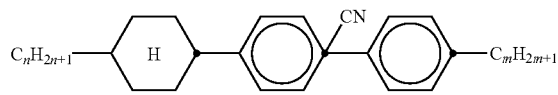
BCN-nm
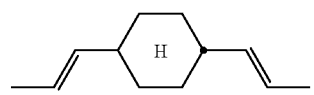
C-1V-V1
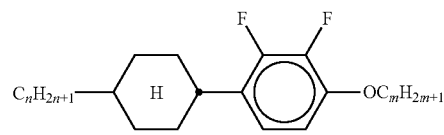
CY-n-Om
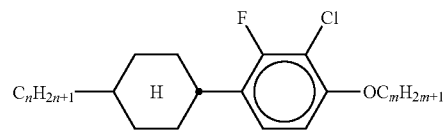
CY(F,Cl)-n-Om
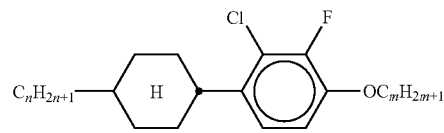
CY(Cl,F)-n-Om
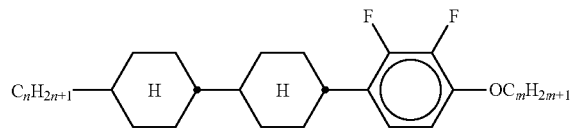
CCY-n-Om
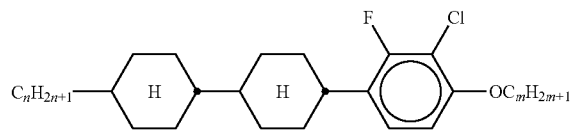
CCY(F,Cl)-n-Om
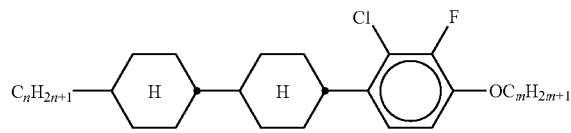
CCY(Cl,F)-n-Om TABLE A-continued
The following abbreviations are used:
(n, m, m', z: each, independently of one another, 1, 2, 3, 4, 5 or 6;
(O)$C_mH_{2m+1}$ denotes $OC_mH_{2m+1}$ or $C_mH_{2m+1}$)
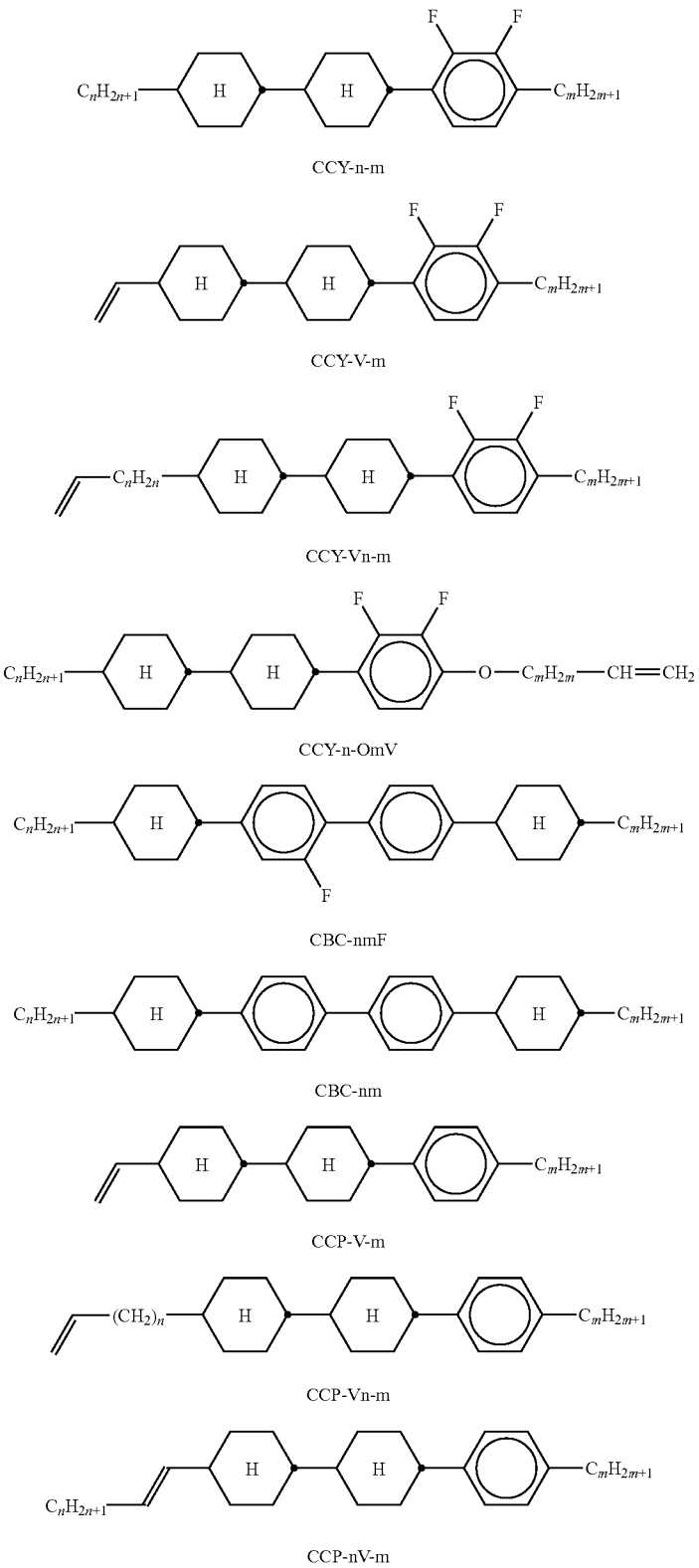
CCY-n-m
CCY-V-m
CCY-Vn-m
CCY-n-OmV
CBC-nmF
CBC-nm
CCP-V-m
CCP-Vn-m
CCP-nV-m TABLE A-continued
The following abbreviations are used:
(n, m, m', z: each, independently of one another, 1, 2, 3, 4, 5 or 6;
(O)$C_mH_{2m+1}$ denotes $OC_mH_{2m+1}$ or $C_mH_{2m+1}$)
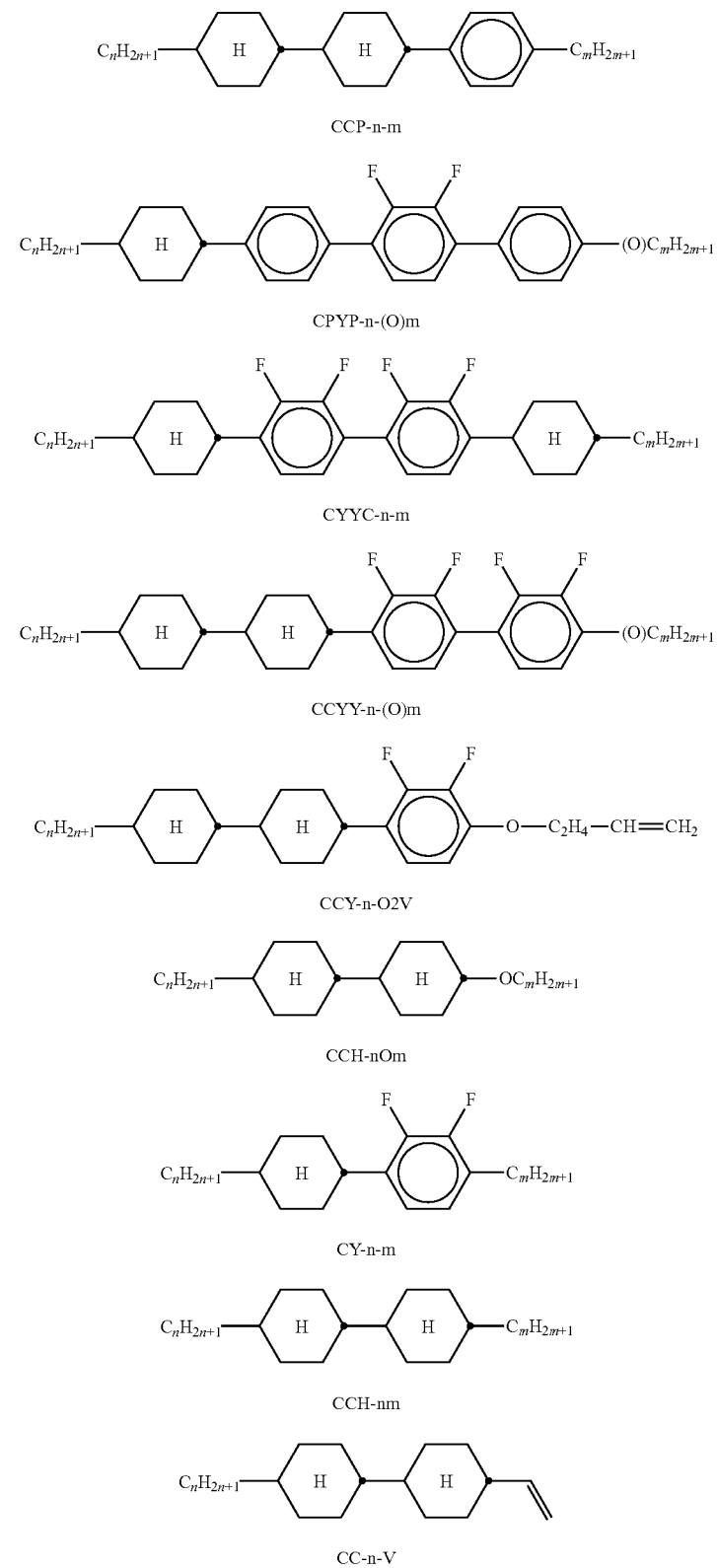

TABLE A-continued
The following abbreviations are used:
(n, m, m', z: each, independently of one another, 1, 2, 3, 4, 5 or 6;
$(O)C_mH_{2m+1}$ denotes $OC_mH_{2m+1}$ or $C_mH_{2m+1}$)
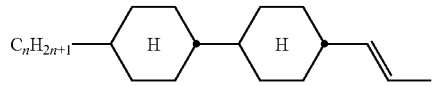
CC-n-V1
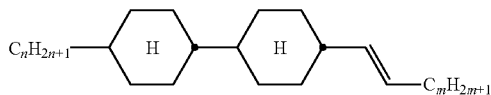
CC-n-Vm
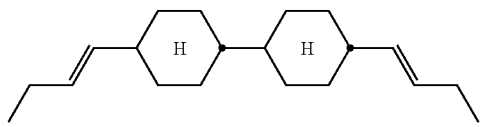
CC-2V-V2
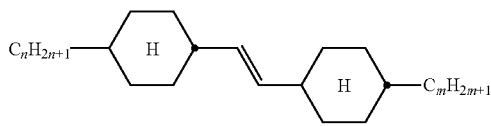
CVC-n-m
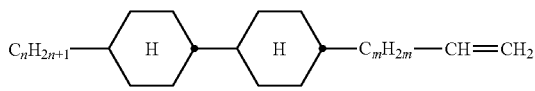
CC-n-mV
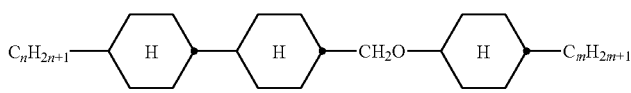
CCOC-n-m
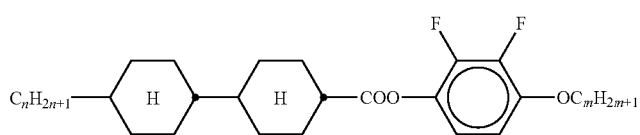
CP-nOmFF
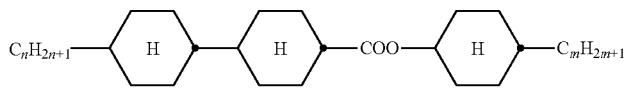
CH-nm
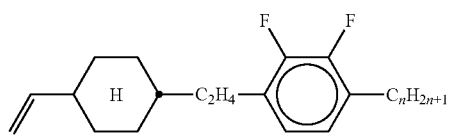
CEY-V-n TABLE A-continued
The following abbreviations are used:
(n, m, m', z: each, independently of one another, 1, 2, 3, 4, 5 or 6;
$(O)C_mH_{2m+1}$ denotes $OC_mH_{2m+1}$ or $C_mH_{2m+1}$)
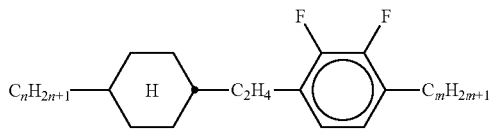
CEY-n-m
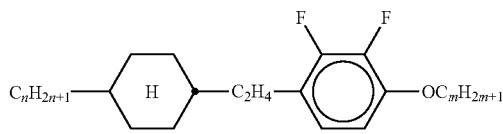
CEY-n-Om
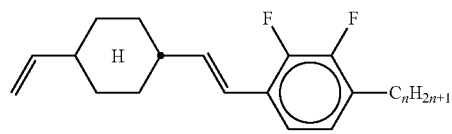
CVY-V-n
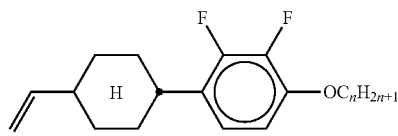
CY-V-On
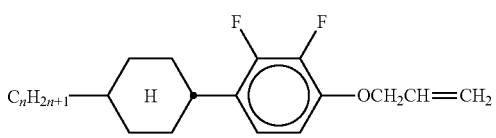
CY-n-O1V
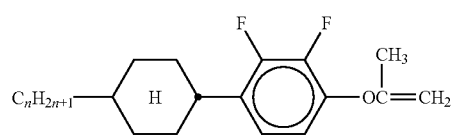
CY-n-OC(CH$_3$)=CH$_2$
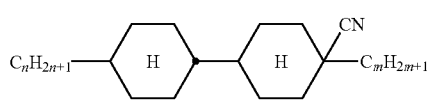
CCN-nm
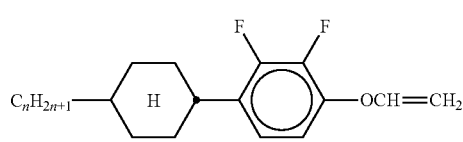
CY-n-OV
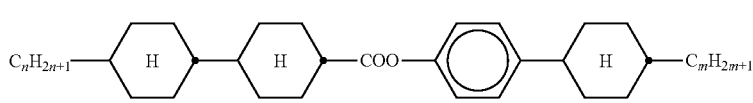
CCPC-nm TABLE A-continued
The following abbreviations are used:
(n, m, m', z: each, independently of one another, 1, 2, 3, 4, 5 or 6;
$(O)C_mH_{2m+1}$ denotes $OC_mH_{2m+1}$ or $C_mH_{2m+1}$)
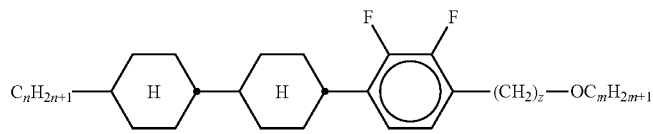
CCY-n-zOm
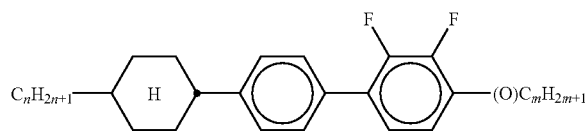
CPY-n-(O)m
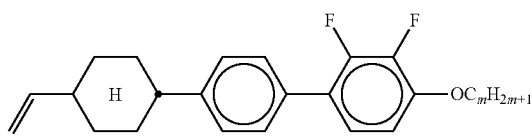
CPY-V-Om
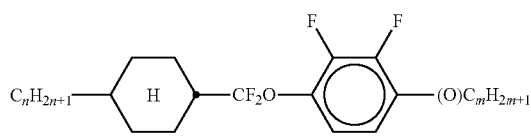
CQY-n-(O)m
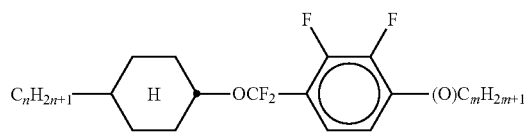
CQIY-n-(O)m
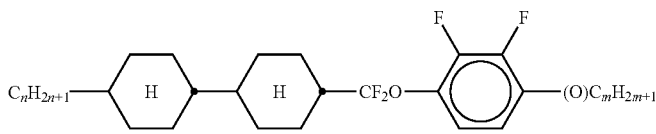
CCQY-n-(O)m
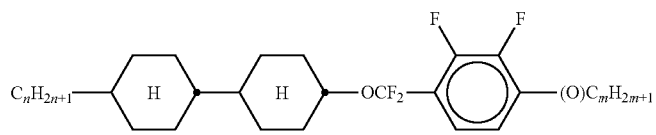
CCQIY-n-(O)m
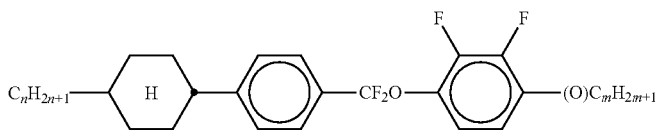
CPQY-n-(O)m TABLE A-continued
The following abbreviations are used:
(n, m, m', z: each, independently of one another, 1, 2, 3, 4, 5 or 6;
$(O)C_mH_{2m+1}$ denotes $OC_mH_{2m+1}$ or $C_mH_{2m+1}$)
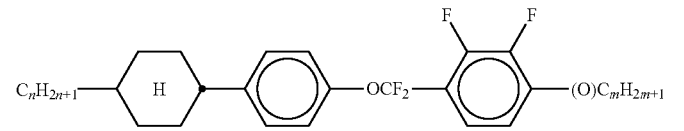
CPQIY-n-(O)m
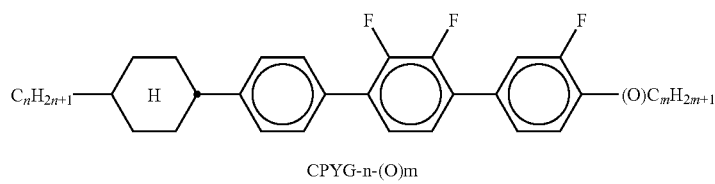
CPYG-n-(O)m
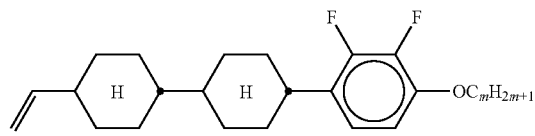
CCY-V-Om
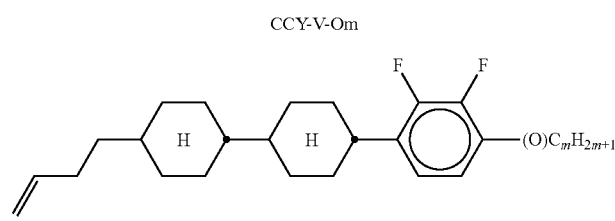
CCY-V2-(O)m
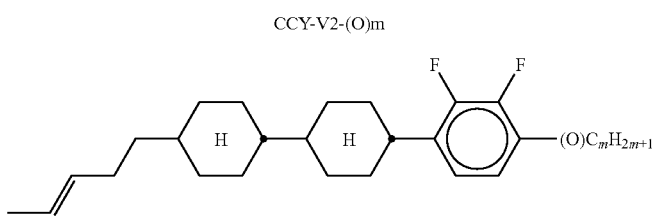
CCY-1V2-(O)m
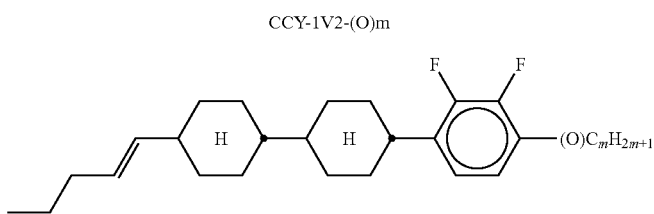
CCY-3V-(O)m
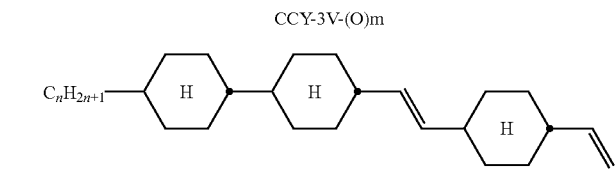
CCVC-n-V
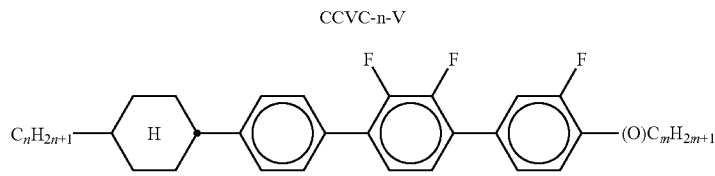
CPYG-n-(O)m TABLE A-continued
The following abbreviations are used:
(n, m, m', z: each, independently of one another, 1, 2, 3, 4, 5 or 6;
(O)$C_mH_{2m+1}$ denotes $OC_mH_{2m+1}$ or $C_mH_{2m+1}$)
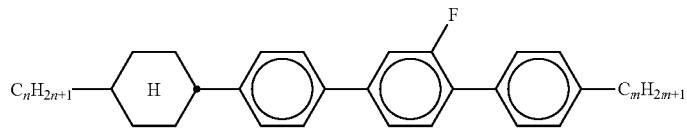
CPGP-n-m
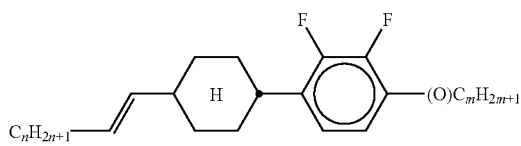
CY-nV-(O)m
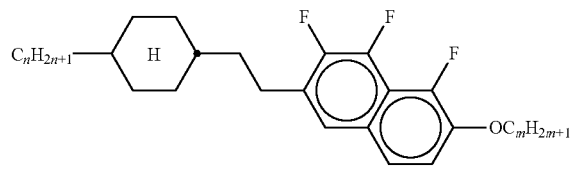
CENaph-n-Om
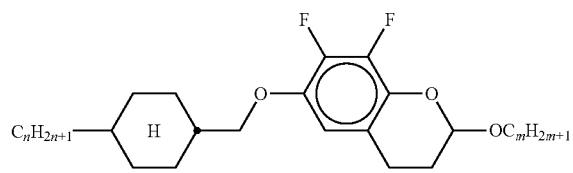
COChrom-n-Om
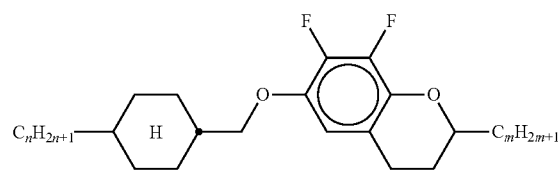
COChrom-n-m
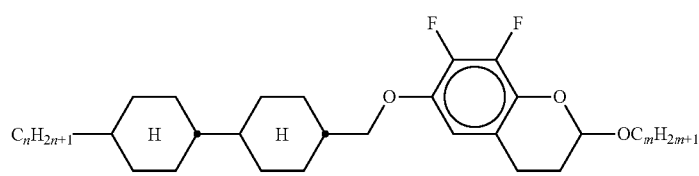
CCOChrom-n-Om
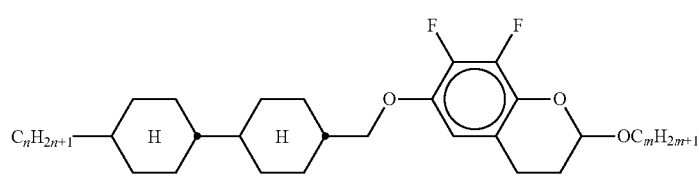
CCOChrom-n-m TABLE A-continued
The following abbreviations are used:
(n, m, m', z: each, independently of one another, 1, 2, 3, 4, 5 or 6;
$(O)C_mH_{2m+1}$ denotes $OC_mH_{2m+1}$ or $C_mH_{2m+1}$)
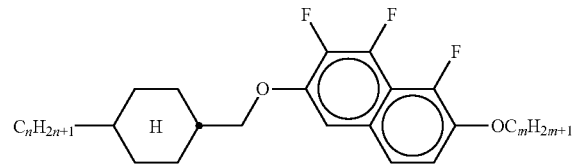
CONaph-n-Om
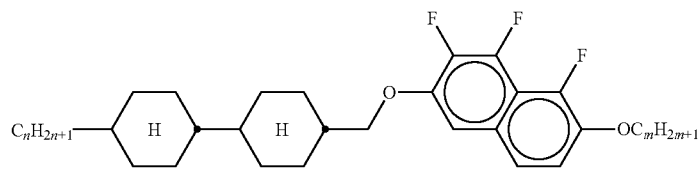
CCONaph-n-Om
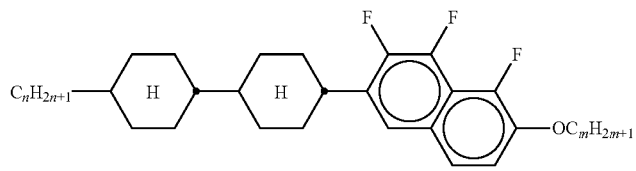
CCNaph-n-Om
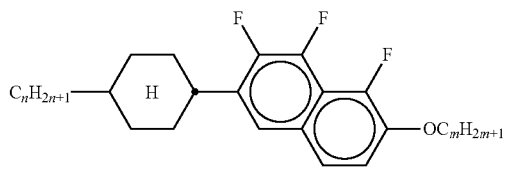
CNaph-n-Om
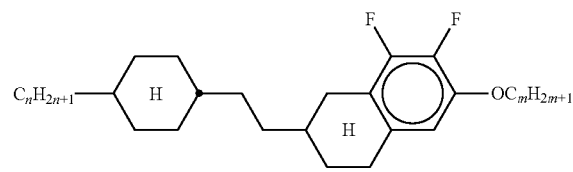
CETNaph-n-Om
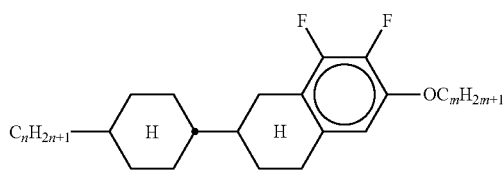
CTNaph-n-Om
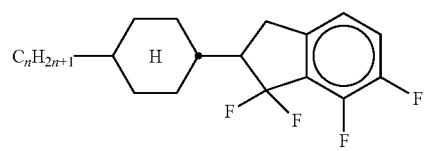
CK-n-F TABLE A-continued
The following abbreviations are used:
(n, m, m', z: each, independently of one another, 1, 2, 3, 4, 5 or 6;
(O)C$_m$H$_{2m+1}$ denotes OC$_m$H$_{2m+1}$ or C$_m$H$_{2m+1}$)
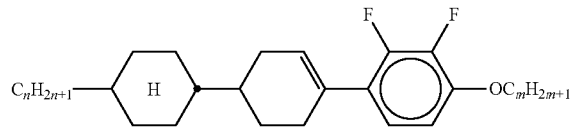
CLY-n-Om
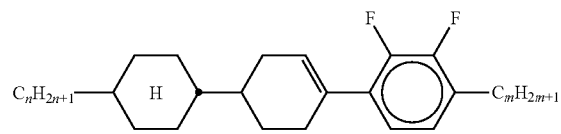
CLY-n-m
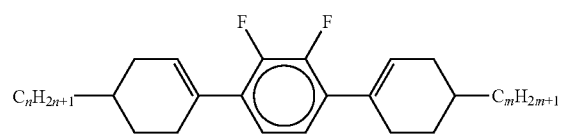
LYLI-n-m
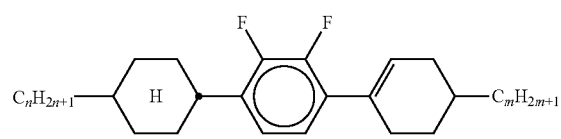
CYLI-n-m
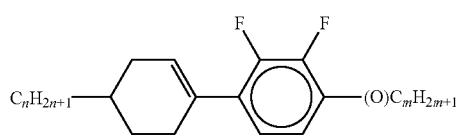
LY-n-(O)m
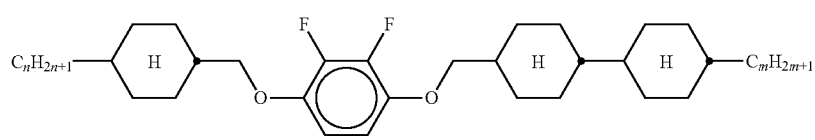
COYOICC-n-m
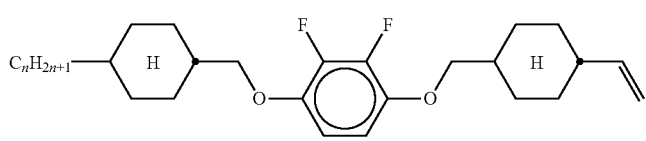
COYOIC-n-V
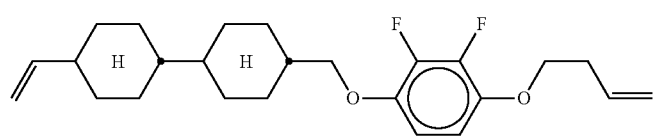
CCOY-V-O2V TABLE A-continued
The following abbreviations are used:
(n, m, m', z: each, independently of one another, 1, 2, 3, 4, 5 or 6;
$(O)C_mH_{2m+1}$ denotes $OC_mH_{2m+1}$ or $C_mH_{2m+1}$)
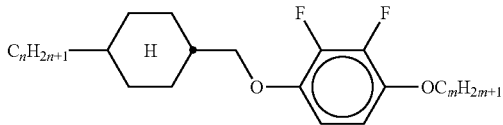
COY-n-Om
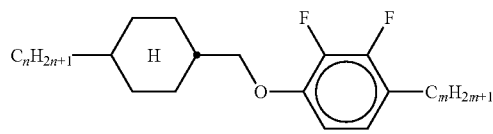
COY-n-m
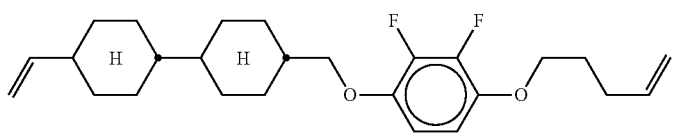
CCOY-V-O3V
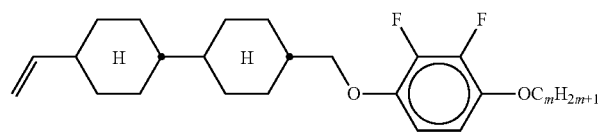
CCOY-V-Om
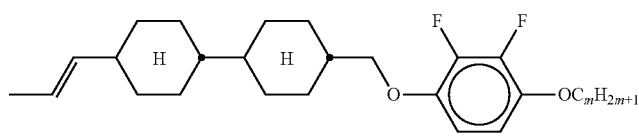
CCOY-1V-Om
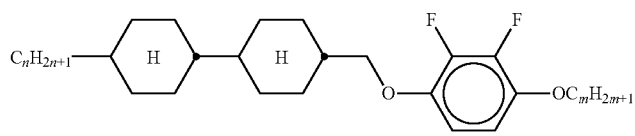
CCOY-n-Om
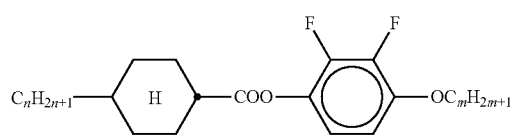
D-nOmFF
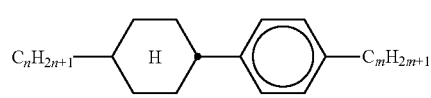
PCH-nm
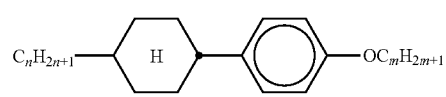
PCH-nOm TABLE A-continued
The following abbreviations are used:
(n, m, m', z: each, independently of one another, 1, 2, 3, 4, 5 or 6;
$(O)C_mH_{2m+1}$ denotes $OC_mH_{2m+1}$ or $C_mH_{2m+1}$)
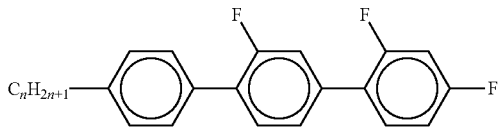
PGIGI-n-F
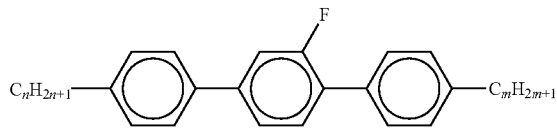
PGP-n-m
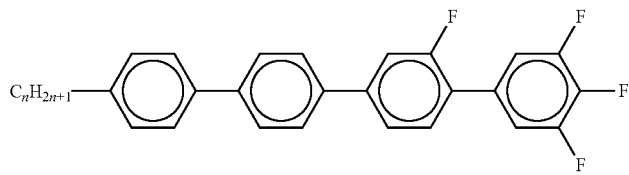
PPGU-n-F
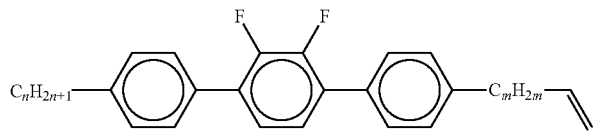
PYP-n-mV
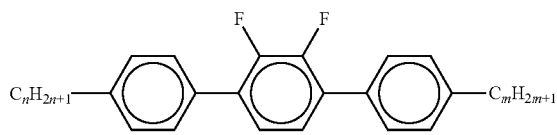
PYP-n-m
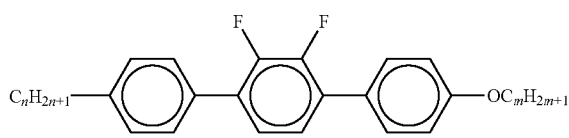
PYP-n-Om
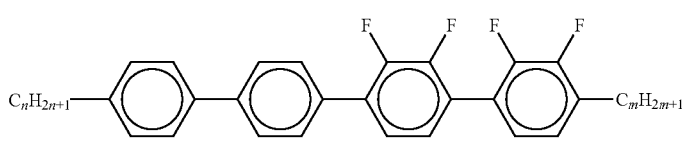
PPYY-n-m
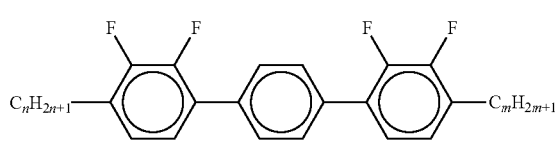
YPY-n-m TABLE A-continued
The following abbreviations are used:
(n, m, m', z: each, independently of one another, 1, 2, 3, 4, 5 or 6;
$(O)C_mH_{2m+1}$ denotes $OC_mH_{2m+1}$ or $C_mH_{2m+1}$)
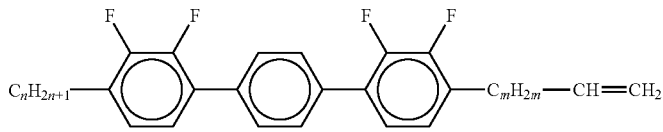
YPY-n-mV
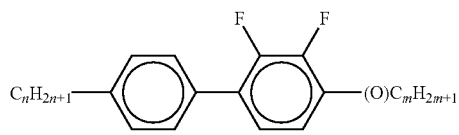
PY-n-(O)m
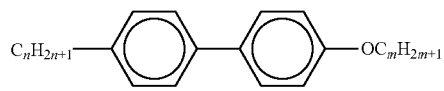
PP-n-Om
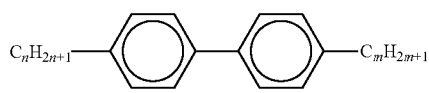
PP-n-m
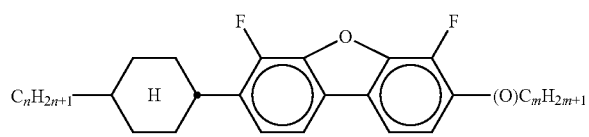
CB-n-(O)m
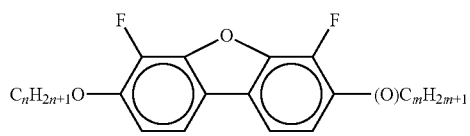
B-nO-(O)m
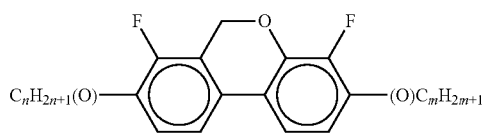
DFDBC-n(O)-(O)m
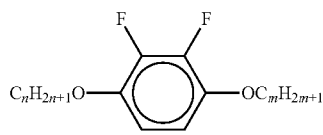
Y-nO-Om
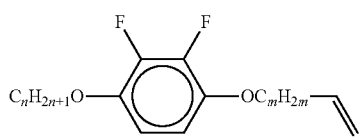
Y-nO-OmV TABLE A-continued
The following abbreviations are used:
(n, m, m', z: each, independently of one another, 1, 2, 3, 4, 5 or 6;
$(O)C_mH_{2m+1}$ denotes $OC_mH_{2m+1}$ or $C_mH_{2m+1}$)
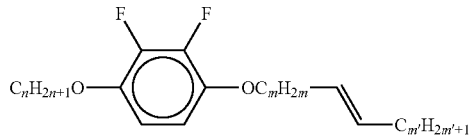
Y-nO-OmVm'
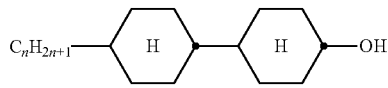
CC-n-O
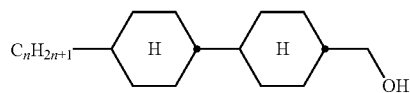
CC-n-1O
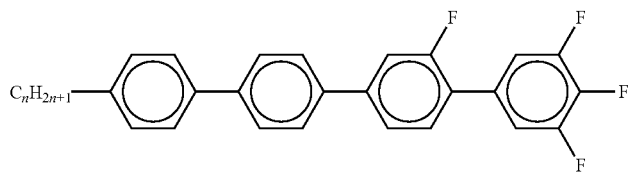
PPGU-n-F
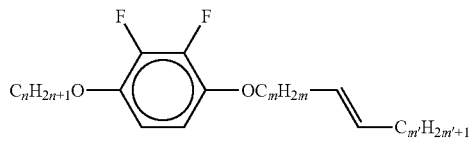
Y-nO-OmVm'
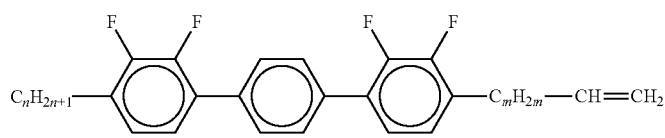
YPY-n-mV
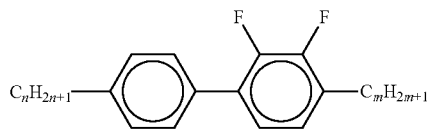
PY-n-m
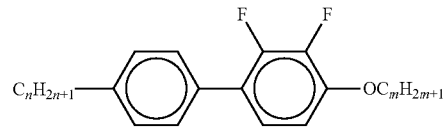
PY-n-Om TABLE A-continued
The following abbreviations are used:
(n, m, m', z: each, independently of one another, 1, 2, 3, 4, 5 or 6;
$(O)C_mH_{2m+1}$ denotes $OC_mH_{2m+1}$ or $C_mH_{2m+1}$)
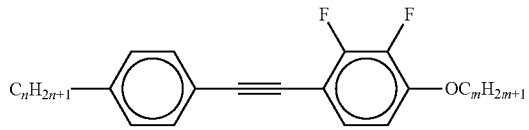
PTP-nOmFF
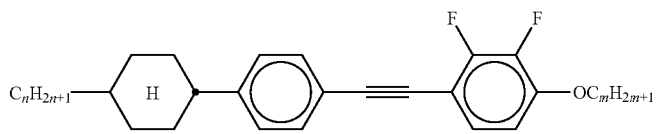
CPTP-nOmFF
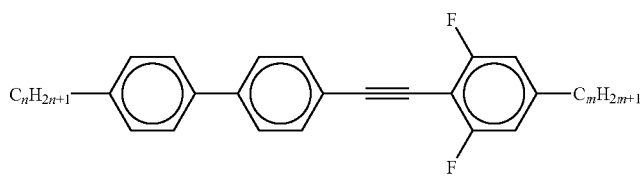
PPTUI-n-m
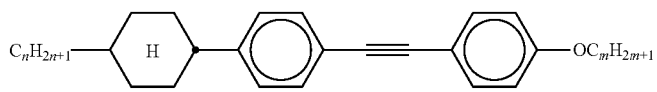
CPTP-nOm
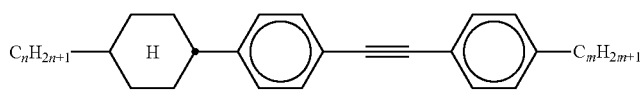
CPTP-nm
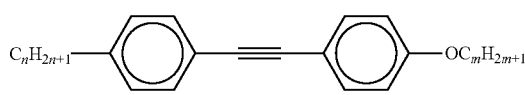
PTP-nOm
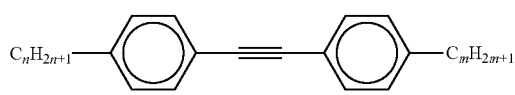
PTP-nm
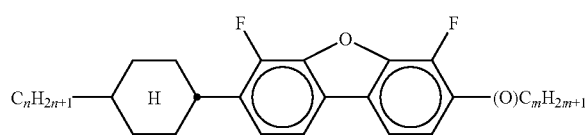
C-DFDBC-n-(O)m
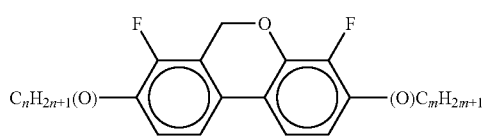
DFDBC-n(O)-(O)m TABLE A-continued The following abbreviations are used:
(n, m, m', z: each, independently of one another, 1, 2, 3, 4, 5 or 6;
$(O)C_mH_{2m+1}$ denotes $OC_mH_{2m+1}$ or $C_mH_{2m+1}$)

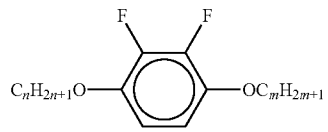

Y-nO-Om

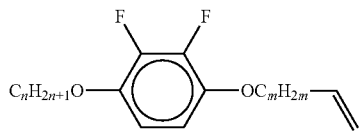

Y-nO-OmV

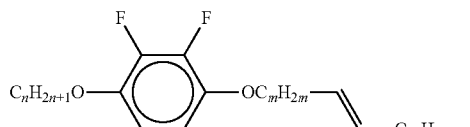

Y-nO-OmVm'

The liquid-crystal mixtures which can be used in accordance with the invention are prepared in a manner which is conventional per se. In general, the desired amount of the components used in lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing.

The dielectrics may also comprise further additives known to the person skilled in the art and described in the literature, such as, for example, UV absorbers, antioxidants, nanoparticles and free-radical scavengers. For example, 0-15% of pleochroic dyes, stabilisers or chiral dopants may be added. Suitable stabilisers for the mixtures according to the invention are, in particular, those listed in Table C.

For example, 0-15% of pleochroic dyes may be added, furthermore conductive salts, preferably ethyldimethyldodecylammonium 4-hexoxybenzoate, tetrabutylammonium tetraphenylboranate or complex salts of crown ethers (cf., for example, Haller et al., Mol. Cryst. Liq. Cryst. Volume 24 pages 249-258 (1973)), may be added in order to improve the conductivity or substances may be added in order to modify the dielectric anisotropy, the viscosity and/or the alignment of the nematic phases. Substances of this type are described, for example, in DE-A 22 09 127, 22 40 864, 23 21 632, 23 38 281, 24 50 088, 26 37 430 and 28 53 728.

Table B shows possible dopants which can be added to the mixtures according to the invention. If the mixtures comprise a dopant, it is employed in amounts of 0.01-4% by weight, preferably 0.1-1.0% by weight.

TABLE B

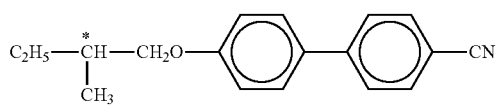

C15

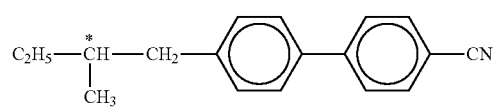

CB 15

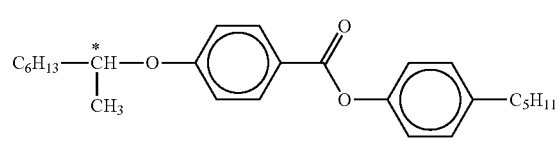

CM 21

TABLE B-continued

| Structure | Code |
|---|---|
| C₆H₁₃O–⟨phenyl⟩–C(O)O–⟨phenyl⟩–C(O)O–*CH(CH₃)–C₆H₁₃ | R/S-811 |
| C₃H₇–⟨Cy⟩–⟨Cy⟩–⟨phenyl⟩–CH₂–*CH(CH₃)–C₂H₅ | CM 44 |
| C₅H₁₁–⟨phenyl⟩–⟨phenyl⟩–C(O)O–*CH(C₂H₅)–phenyl | CM 45 |
| C₈H₁₇O–⟨phenyl⟩–⟨phenyl⟩–C(O)O–*CH(C₂H₅)–phenyl | CM 47 |
| Cholesteryl octanoate (C₈H₁₇C(O)O–cholesteryl) | CN |
| C₅H₁₁–⟨Cy⟩–⟨phenyl⟩–COO–CH₂–*C(phenyl)–OCO–⟨phenyl⟩–⟨Cy⟩–C₅H₁₁ | R/S-1011 |
| C₃H₇–⟨Cy⟩–⟨Cy⟩–⟨2,6-F₂-phenyl⟩–O*CH(CH₃)–C₆H₁₃ | R/S-2011 |
| C₃H₇–⟨Cy⟩–⟨Cy⟩–⟨2,3-F₂-phenyl⟩–O–*CH(C≡CH)–C₅H₁₁ | R/S-3011 |
| C₅H₁₁–⟨bicyclo[2.2.2]octyl⟩–⟨phenyl⟩–⟨2,6-F₂-phenyl⟩–O*CH(CH₃)–C₆H₁₃ | R/S-4011 |

TABLE B-continued

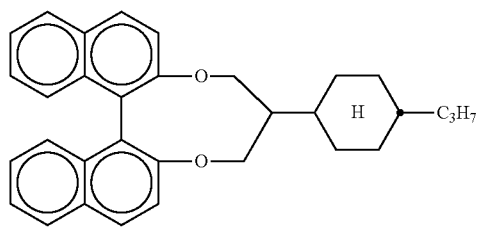

R/S-5011

Stabilisers which can be added, for example, to the mixtures according to the invention in amounts of up to 10% by weight, based on the total amount of the mixture, preferably 0.01 to 6% by weight, in particular 0.1 to 3% by weight, are shown below in Table C. Preferred stabilisers are, in particular, BHT derivatives, for example 2,6-di-tert-butyl-4-alkylphenols, and Tinuvin 770, as well as Tunivin P and Tempol.

TABLE C

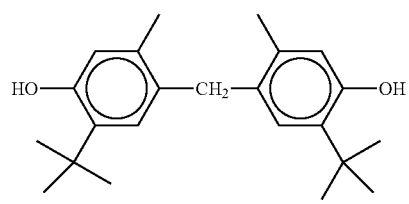

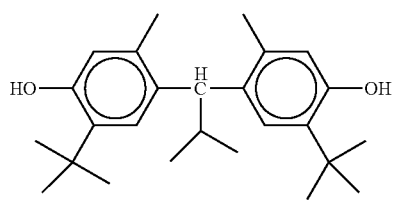

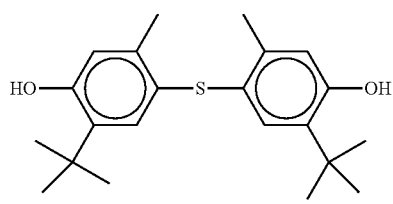

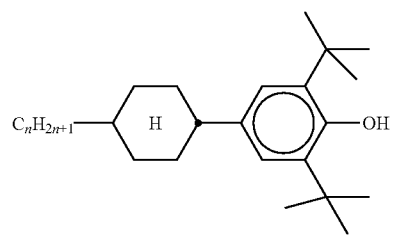

n = 1, 2, 3, 4, 5, 6 or 7

TABLE C-continued
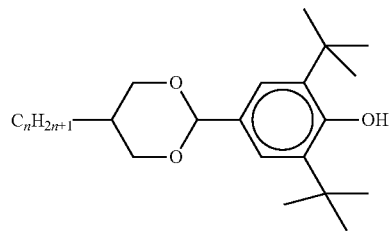
n = 1, 2, 3, 4, 5, 6 or 7
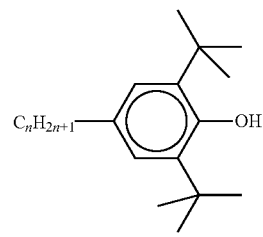
n = 1, 2, 3, 4, 5, 6 or 7
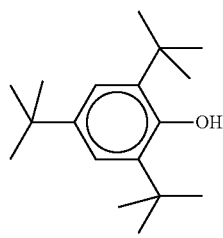
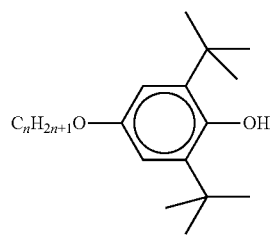
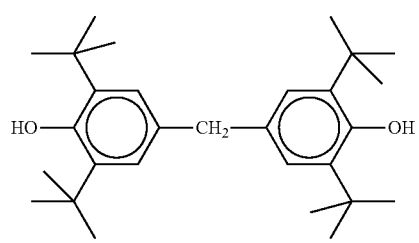
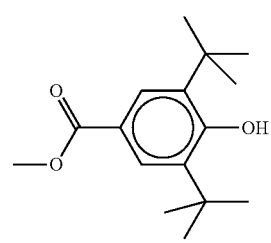

TABLE C-continued
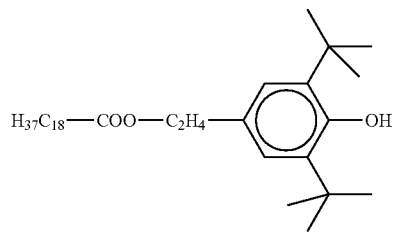
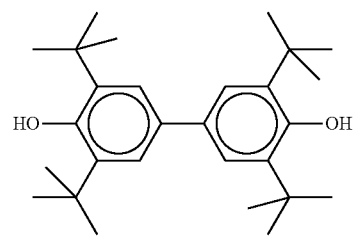
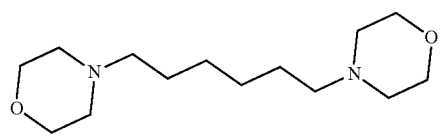 [SMILES: C(CCCN1CCOCC1)CCN1CCOCC1]
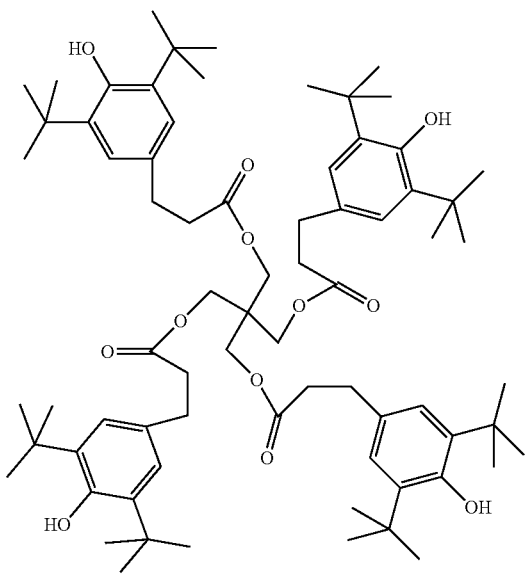 [SMILES: CC(C)(C)c1cc(CCC(=O)OCC(COC(=O)CCc2cc(C(C)(C)C)c(O)c(C(C)(C)C)c2)(COC(=O)CCc2cc(C(C)(C)C)c(O)c(C(C)(C)C)c2)COC(=O)CCc2cc(C(C)(C)C)c(O)c(C(C)(C)C)c2)cc(C(C)(C)C)c1O]
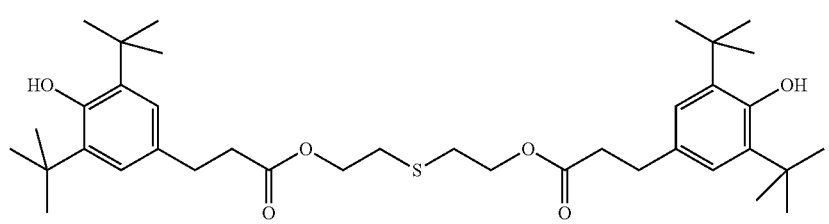 [SMILES: CC(C)(C)c1cc(CCC(=O)OCCSCCOC(=O)CCc2cc(C(C)(C)C)c(O)c(C(C)(C)C)c2)cc(C(C)(C)C)c1O]

TABLE C-continued
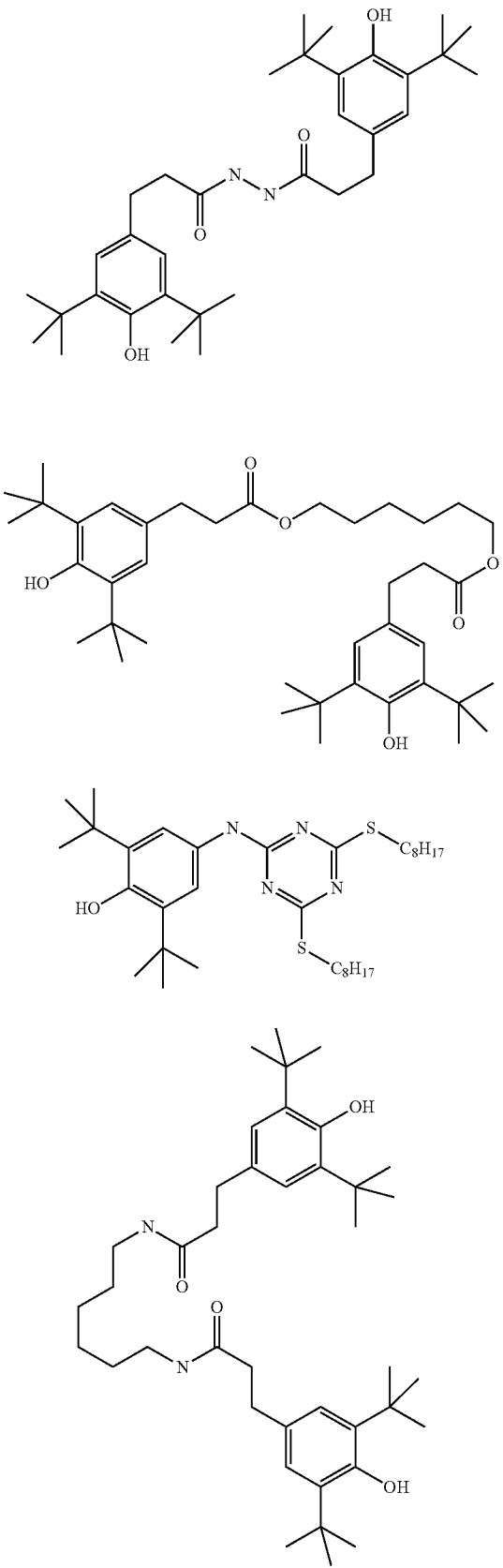

TABLE C-continued
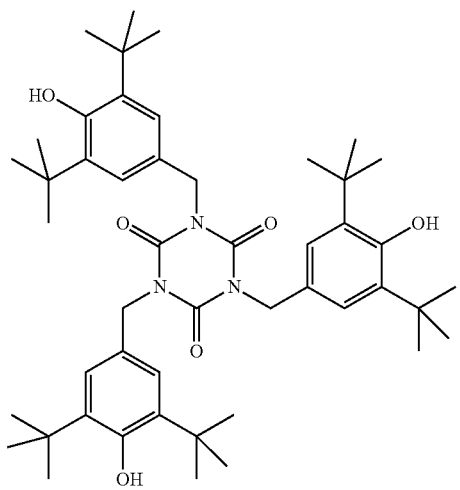 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]
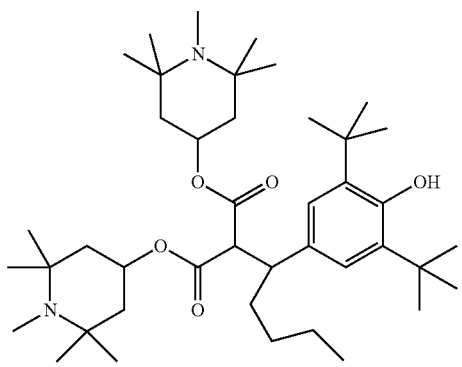 [SMILES: CCCCC(c1cc(C(C)(C)C)c(O)c(C(C)(C)C)c1)C(C(=O)OC1CC(C)(C)N(C)C(C)(C)C1)C(=O)OC1CC(C)(C)N(C)C(C)(C)C1]
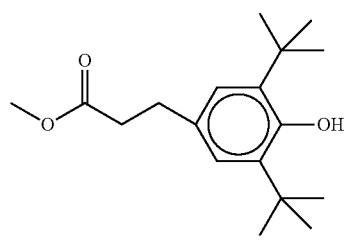
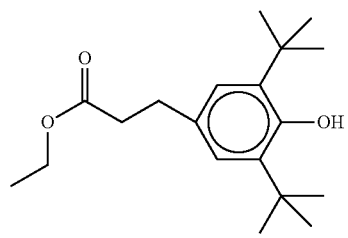
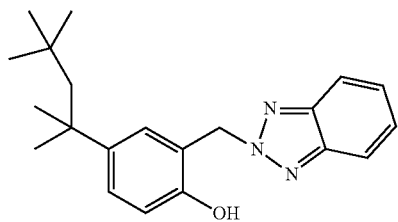 [SMILES: CC(C)(C)CC(C)(C)c1ccc(O)c(Cn2nc3ccccc3n2)c1]

TABLE C-continued
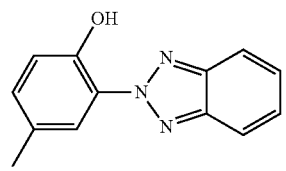 [SMILES: Cc1ccc(O)c(-n2nc3ccccc3n2)c1]
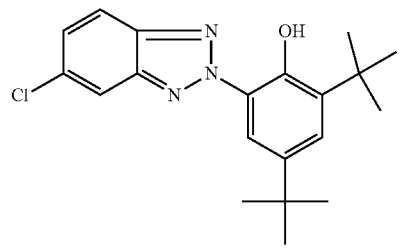 [SMILES: CC(C)(C)c1cc(-n2nc3ccc(Cl)cc3n2)c(O)c(C(C)(C)C)c1]
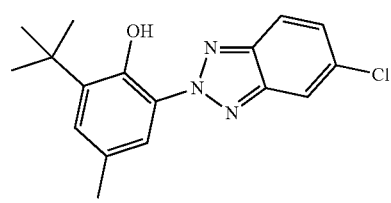 [SMILES: Cc1cc(-n2nc3ccc(Cl)cc3n2)c(O)c(C(C)(C)C)c1]
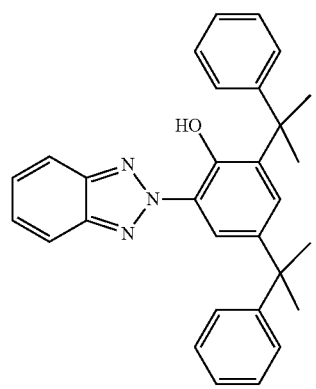 [SMILES: CC(C)(c1ccccc1)c1cc(-n2nc3ccccc3n2)c(O)c(C(C)(C)c2ccccc2)c1]
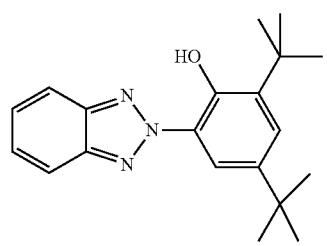 [SMILES: CC(C)(C)c1cc(-n2nc3ccccc3n2)c(O)c(C(C)(C)C)c1]
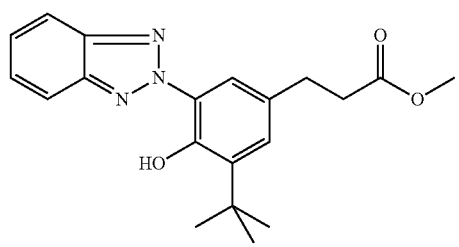 [SMILES: COC(=O)CCc1cc(-n2nc3ccccc3n2)c(O)c(C(C)(C)C)c1]

TABLE C-continued
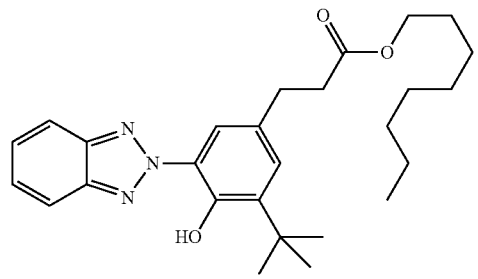 [SMILES: CCCCCCCCOC(=O)CCc1cc(-n2nc3ccccc3n2)c(O)c(C(C)(C)C)c1]
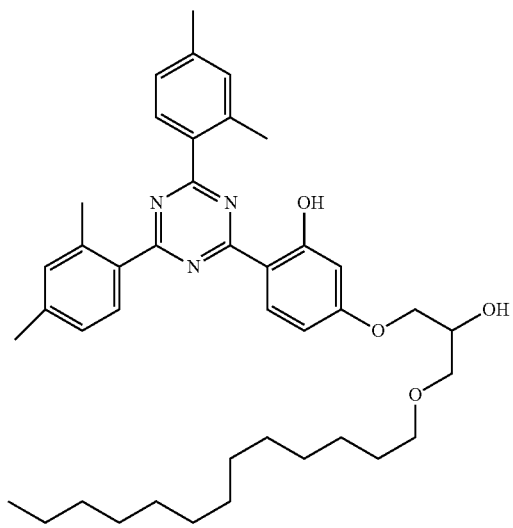 [SMILES: CCCCCCCCCCCCCOCC(O)COc1ccc(-c2nc(-c3ccc(C)cc3C)nc(-c3ccc(C)cc3C)n2)c(O)c1]
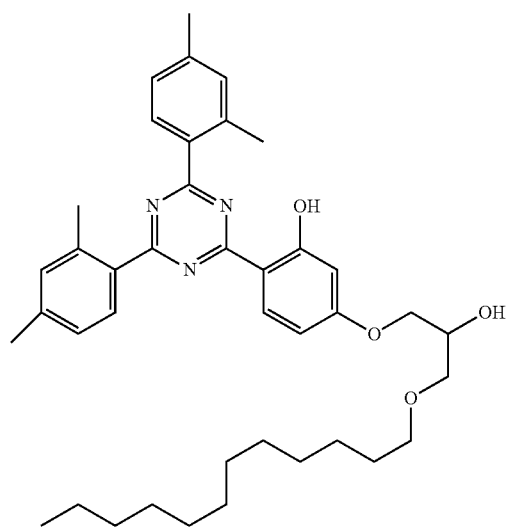 [SMILES: CCCCCCCCCCCCOCC(O)COc1ccc(-c2nc(-c3ccc(C)cc3C)nc(-c3ccc(C)cc3C)n2)c(O)c1]

TABLE C-continued
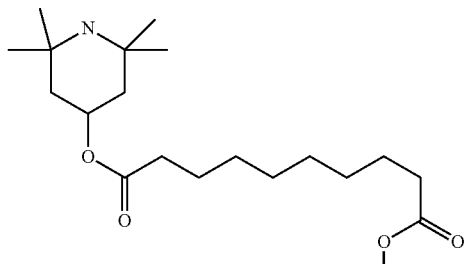
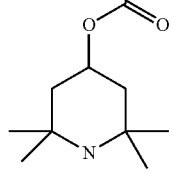
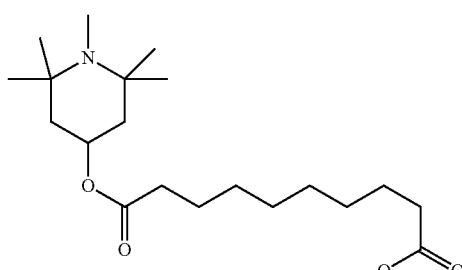
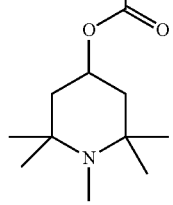
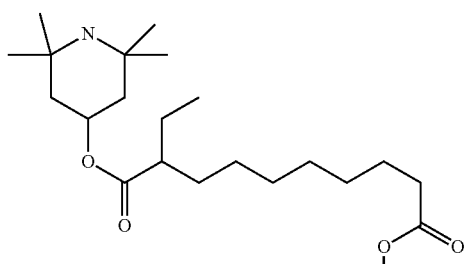
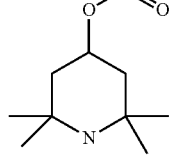
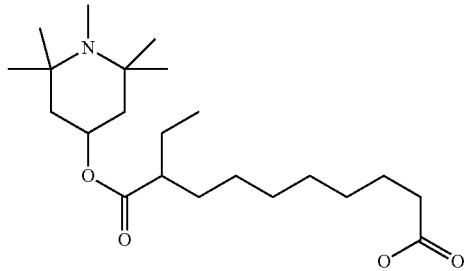
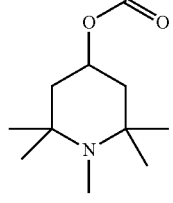

TABLE C-continued
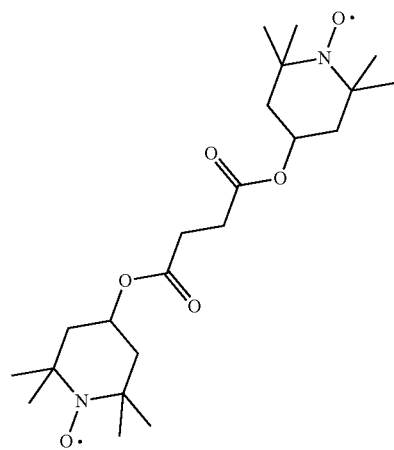
(n = 1-12)

Preferred reactive mesogens (polymerisable compounds) for use in the mixtures according to the invention are shown in Table D below:
TABLE D
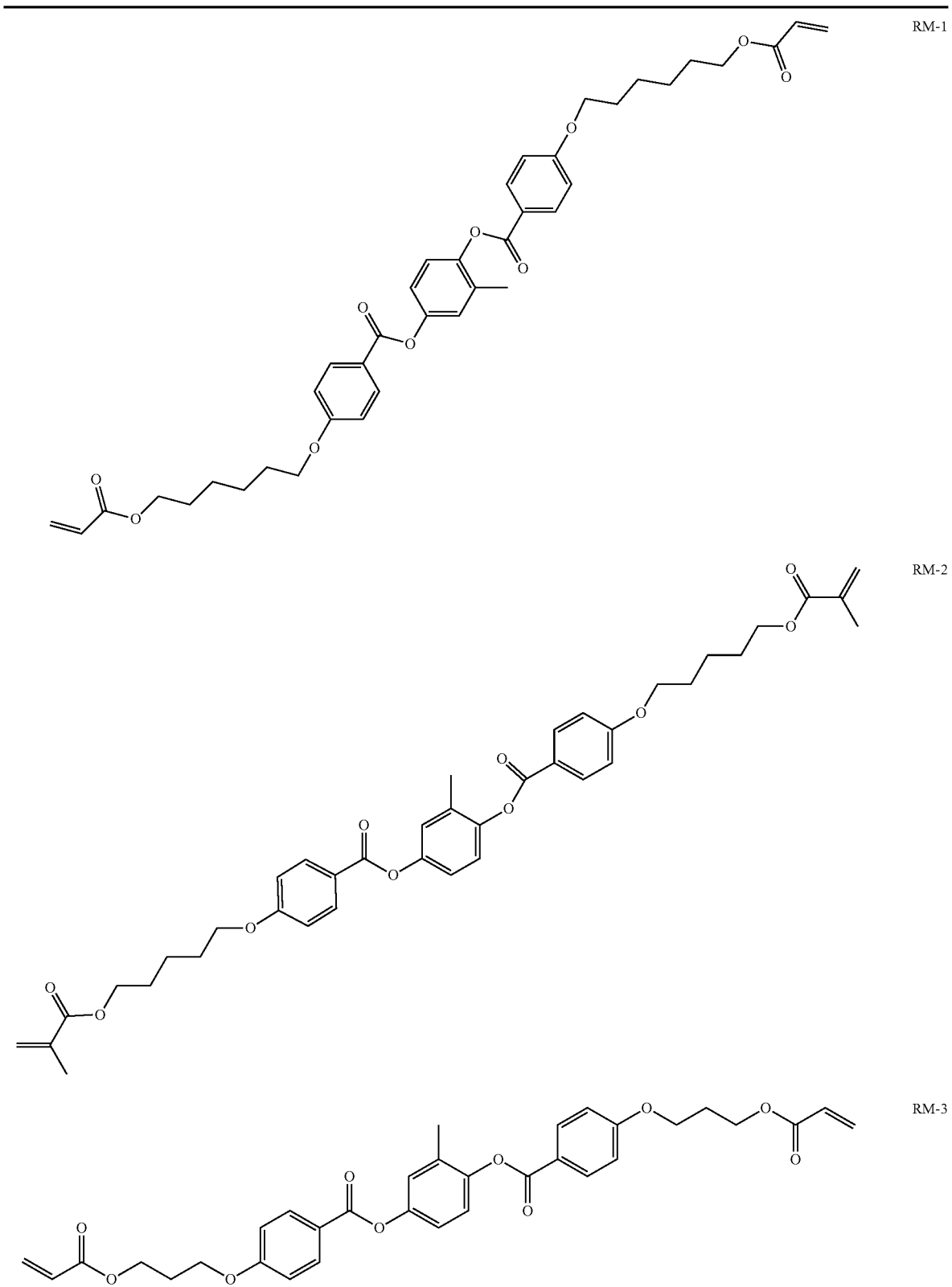

TABLE D-continued
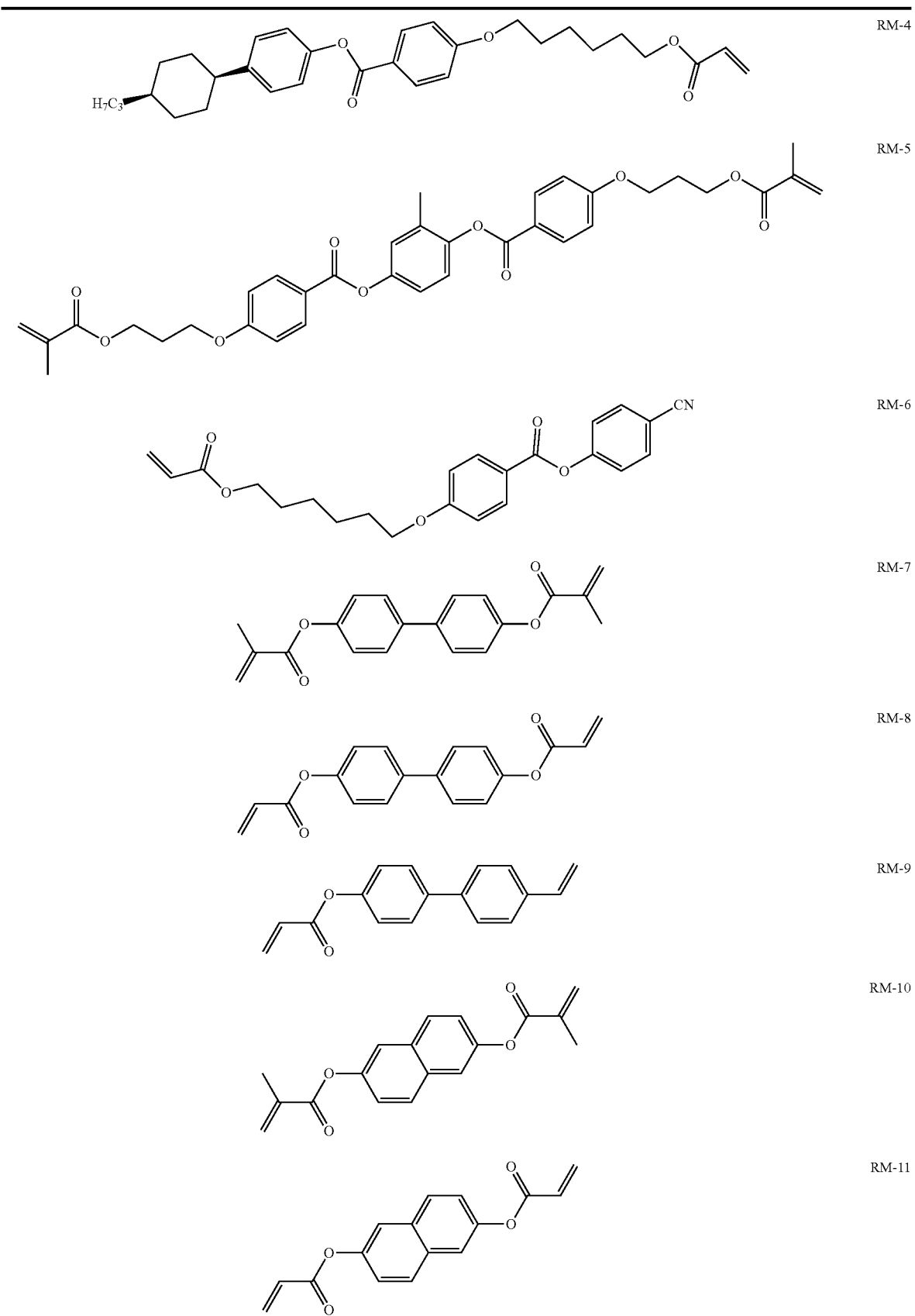

TABLE D-continued
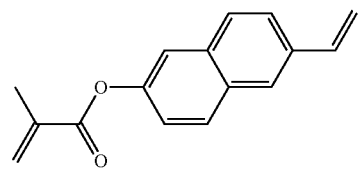 [SMILES: C=Cc1ccc2cc(OC(=O)C(=C)C)ccc2c1] RM-12
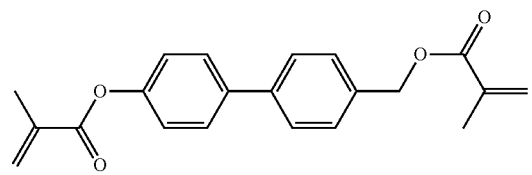 [SMILES: C=C(C)C(=O)OCc1ccc(-c2ccc(OC(=O)C(=C)C)cc2)cc1] RM-13
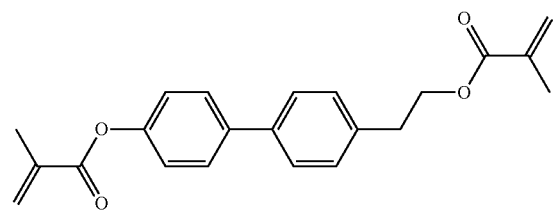 [SMILES: C=C(C)C(=O)OCCc1ccc(-c2ccc(OC(=O)C(=C)C)cc2)cc1] RM-14
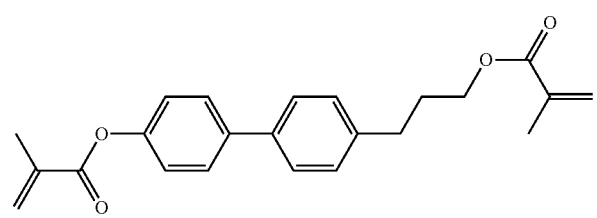 [SMILES: C=C(C)C(=O)OCCCc1ccc(-c2ccc(OC(=O)C(=C)C)cc2)cc1] RM-15
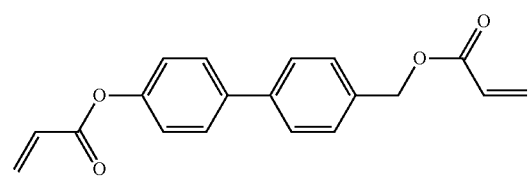 RM-16
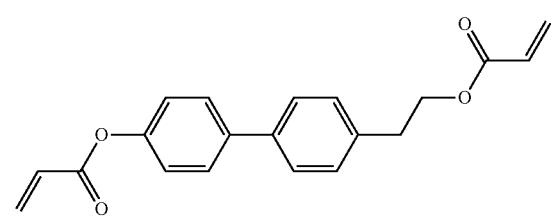 [SMILES: C=CC(=O)OCCc1ccc(-c2ccc(OC(=O)C=C)cc2)cc1] RM-17
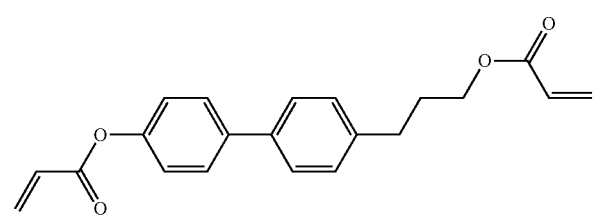 [SMILES: C=CC(=O)OCCCc1ccc(-c2ccc(OC(=O)C=C)cc2)cc1] RM-18
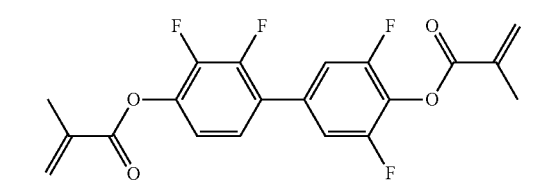 [SMILES: C=C(C)C(=O)Oc1ccc(-c2cc(F)c(OC(=O)C(=C)C)c(F)c2)c(F)c1F] RM-19

TABLE D-continued
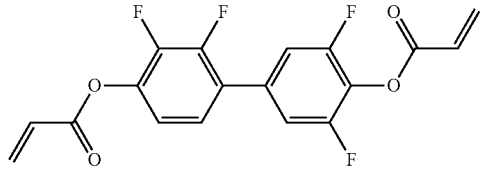 [SMILES: C=CC(=O)Oc1ccc(-c2cc(F)c(OC(=O)C=C)c(F)c2)c(F)c1F]  RM-20
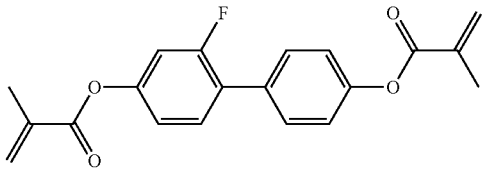 [SMILES: C=C(C)C(=O)Oc1ccc(-c2ccc(OC(=O)C(=C)C)cc2F)cc1]  RM-21
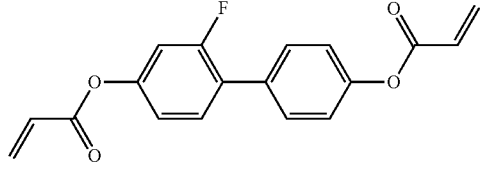 [SMILES: C=CC(=O)Oc1ccc(-c2ccc(OC(=O)C=C)cc2F)cc1]  RM-22
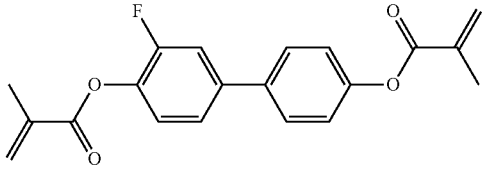 [SMILES: C=C(C)C(=O)Oc1ccc(-c2ccc(OC(=O)C(=C)C)c(F)c2)cc1F]  RM-23
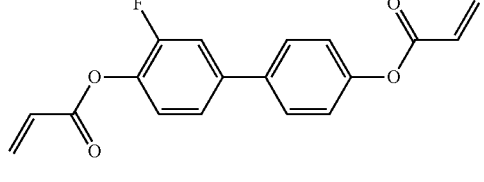  RM-24
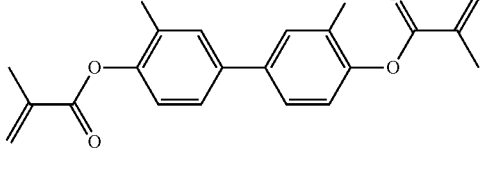  RM-25
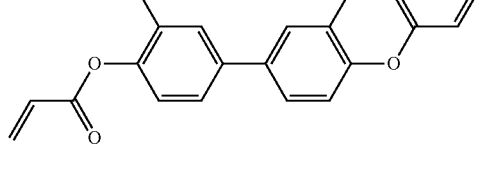  RM-26
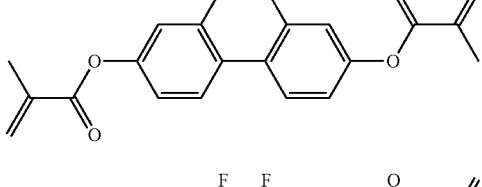  RM-27
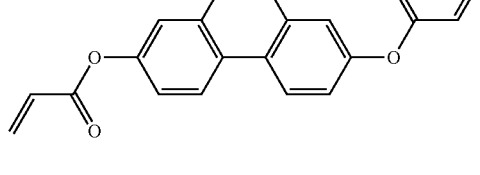  RM-28

TABLE D-continued
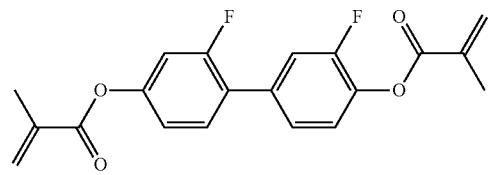 RM-29
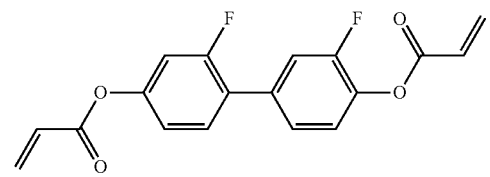 RM-30
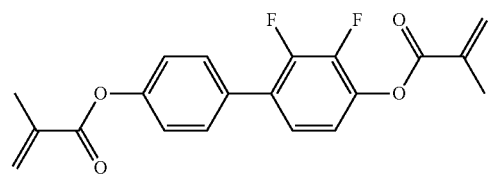 [SMILES: C=C(C)C(=O)Oc1ccc(-c2ccc(OC(=O)C(=C)C)c(F)c2F)cc1] RM-31
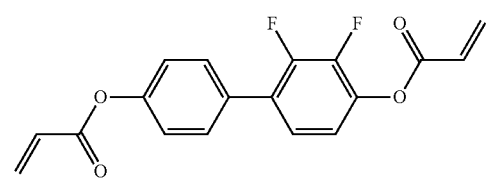 [SMILES: C=CC(=O)Oc1ccc(-c2ccc(OC(=O)C=C)c(F)c2F)cc1] RM-32
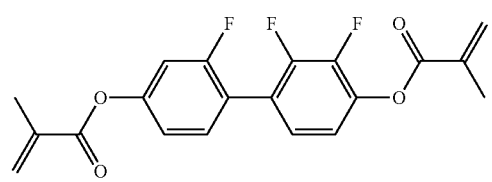 [SMILES: C=C(C)C(=O)Oc1ccc(-c2ccc(OC(=O)C(=C)C)c(F)c2F)c(F)c1] RM-33
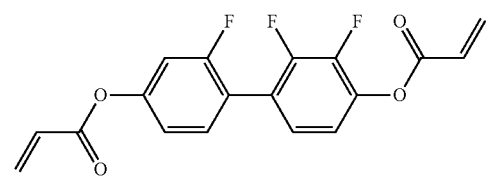 [SMILES: C=CC(=O)Oc1ccc(-c2ccc(OC(=O)C=C)c(F)c2F)c(F)c1] RM-34
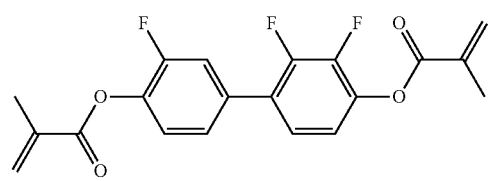 [SMILES: C=C(C)C(=O)Oc1ccc(-c2ccc(OC(=O)C(=C)C)c(F)c2F)cc1F] RM-35
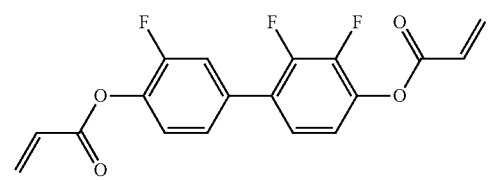 RM-36

TABLE D-continued
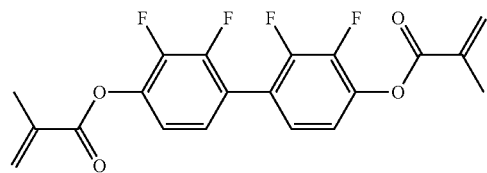 [SMILES: C=C(C)C(=O)Oc1ccc(-c2ccc(OC(=O)C(=C)C)c(F)c2F)c(F)c1F]
RM-37
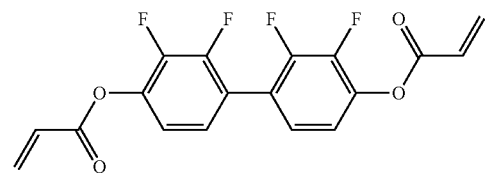 [SMILES: C=CC(=O)Oc1ccc(-c2ccc(OC(=O)C=C)c(F)c2F)c(F)c1F]
RM-38
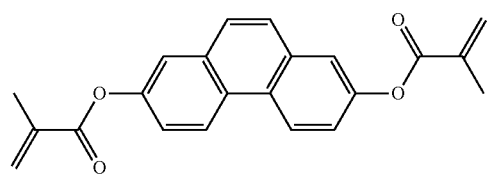 [SMILES: C=C(C)C(=O)Oc1ccc2c(ccc3cc(OC(=O)C(=C)C)ccc32)c1]
RM-39
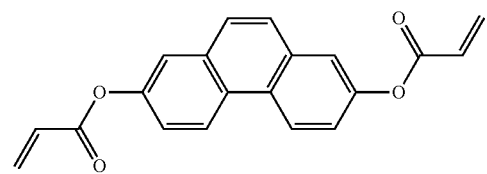
RM-40
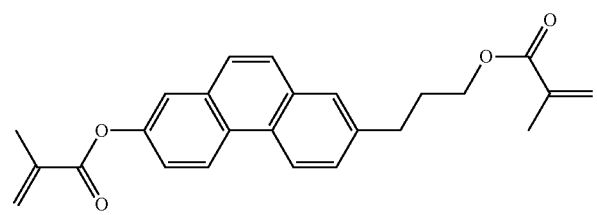 [SMILES: C=C(C)C(=O)OCCCc1ccc2c(ccc3cc(OC(=O)C(=C)C)ccc32)c1]
RM-41
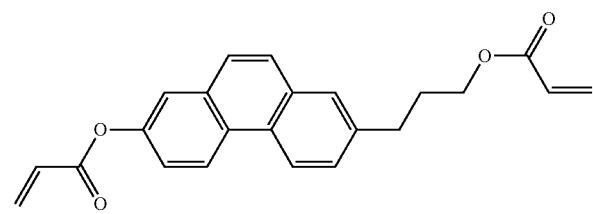 [SMILES: C=CC(=O)OCCCc1ccc2c(ccc3cc(OC(=O)C=C)ccc32)c1]
RM-42
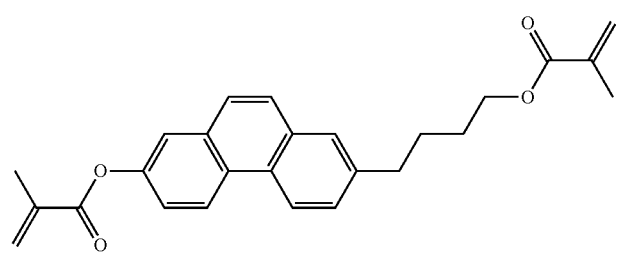
RM-43

TABLE D-continued
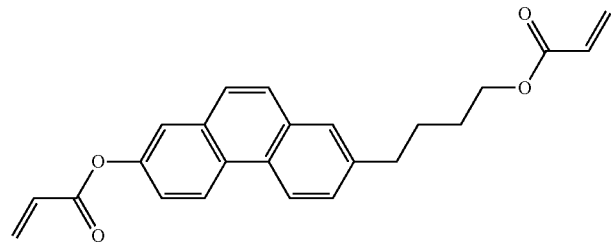 [SMILES: C=CC(=O)OCCCCc1ccc2c(ccc3cc(OC(=O)C=C)ccc32)c1] RM-44
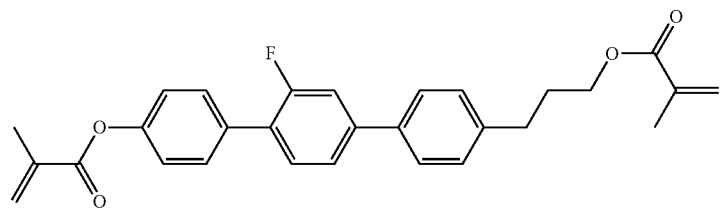 RM-45
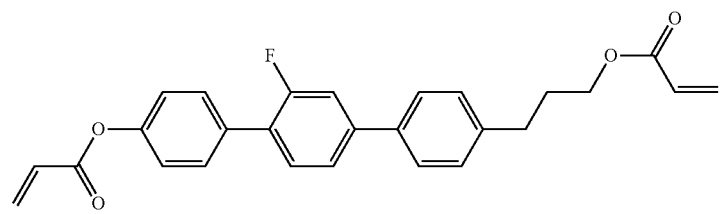 [SMILES: C=CC(=O)OCCCc1ccc(-c2ccc(-c3ccc(OC(=O)C=C)cc3)c(F)c2)cc1] RM-46
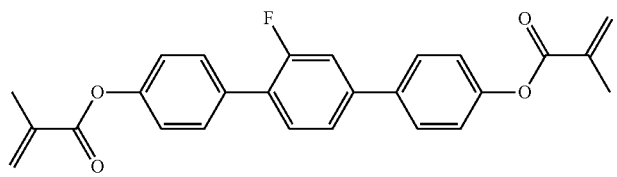 [SMILES: C=C(C)C(=O)Oc1ccc(-c2ccc(-c3ccc(OC(=O)C(=C)C)cc3)c(F)c2)cc1] RM-47
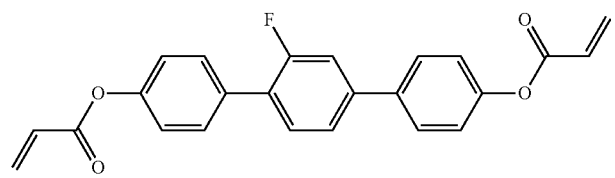 RM-48
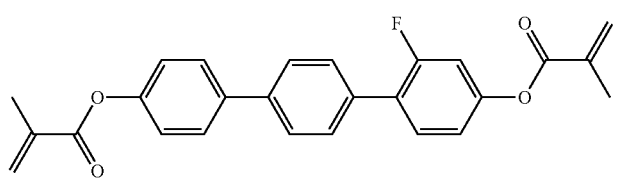 [SMILES: C=C(C)C(=O)Oc1ccc(-c2ccc(-c3ccc(OC(=O)C(=C)C)cc3F)cc2)cc1] RM-49
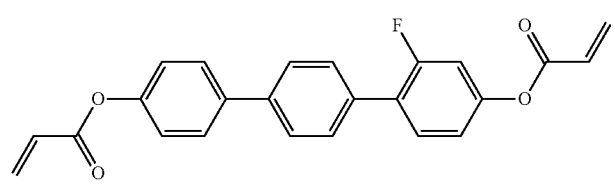 [SMILES: C=CC(=O)Oc1ccc(-c2ccc(-c3ccc(OC(=O)C=C)cc3F)cc2)cc1] RM-50
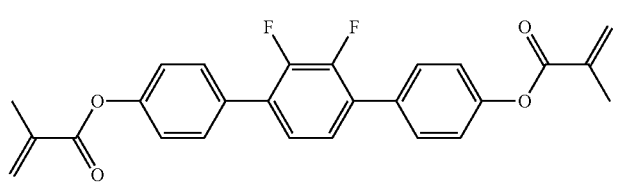 [SMILES: C=C(C)C(=O)Oc1ccc(-c2ccc(-c3ccc(OC(=O)C(=C)C)cc3)c(F)c2F)cc1] RM-51

TABLE D-continued
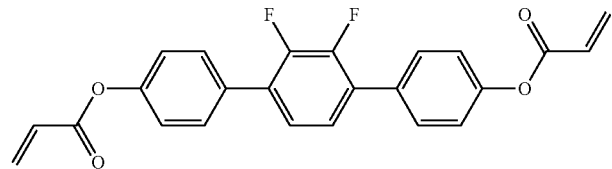 [SMILES: C=CC(=O)Oc1ccc(-c2ccc(-c3ccc(OC(=O)C=C)cc3)c(F)c2F)cc1]
RM-52
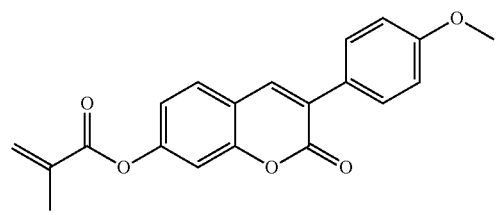 [SMILES: C=C(C)C(=O)Oc1ccc2cc(-c3ccc(OC)cc3)c(=O)oc2c1]
RM-53
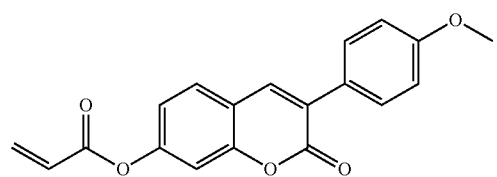 [SMILES: C=CC(=O)Oc1ccc2cc(-c3ccc(OC)cc3)c(=O)oc2c1]
RM-54
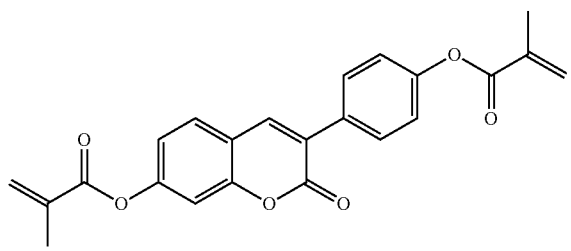 [SMILES: C=C(C)C(=O)Oc1ccc(-c2cc3ccc(OC(=O)C(=C)C)cc3oc2=O)cc1]
RM-55
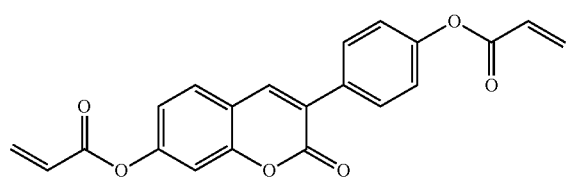 [SMILES: C=CC(=O)Oc1ccc(-c2cc3ccc(OC(=O)C=C)cc3oc2=O)cc1]
RM-56
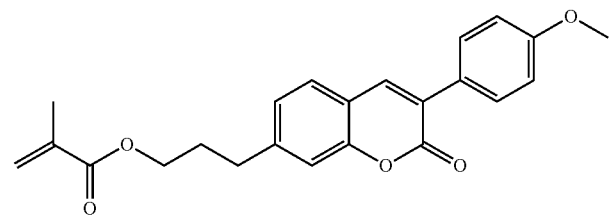 [SMILES: C=C(C)C(=O)OCCCc1ccc2cc(-c3ccc(OC)cc3)c(=O)oc2c1]
RM-57
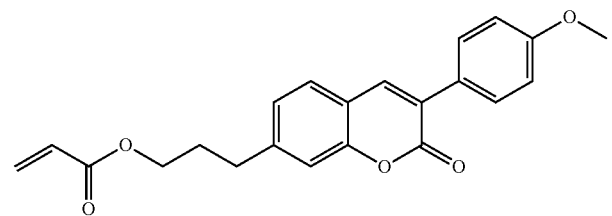 [SMILES: C=CC(=O)OCCCc1ccc2cc(-c3ccc(OC)cc3)c(=O)oc2c1]
RM-58

TABLE D-continued
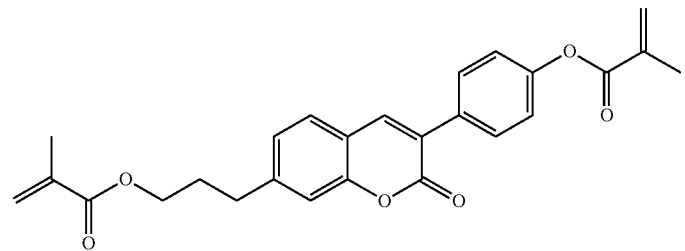 [SMILES: C=C(C)C(=O)OCCCc1ccc2cc(-c3ccc(OC(=O)C(=C)C)cc3)c(=O)oc2c1]
RM-59
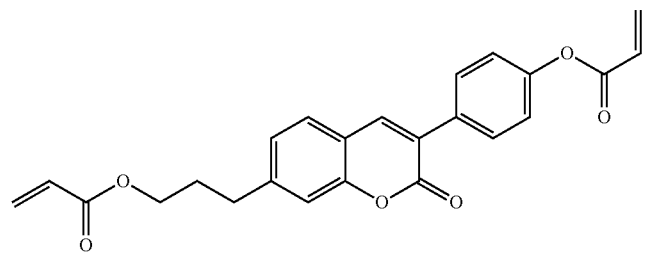 [SMILES: C=CC(=O)OCCCc1ccc2cc(-c3ccc(OC(=O)C=C)cc3)c(=O)oc2c1]
RM-60
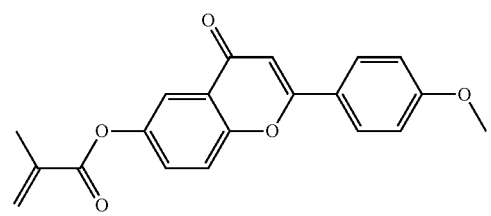 [SMILES: C=C(C)C(=O)Oc1ccc2oc(-c3ccc(OC)cc3)cc(=O)c2c1]
RM-61
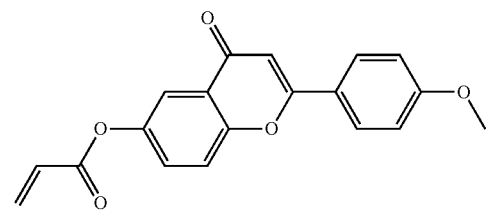 [SMILES: C=CC(=O)Oc1ccc2oc(-c3ccc(OC)cc3)cc(=O)c2c1]
RM-62
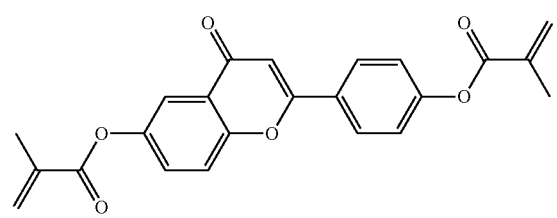 [SMILES: C=C(C)C(=O)Oc1ccc(-c2cc(=O)c3cc(OC(=O)C(=C)C)ccc3o2)cc1]
RM-63
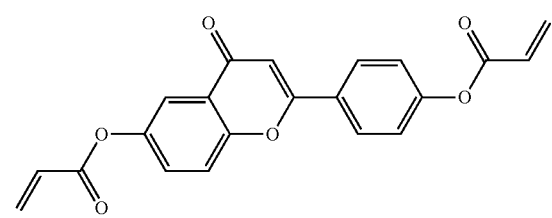 [SMILES: C=CC(=O)Oc1ccc(-c2cc(=O)c3cc(OC(=O)C=C)ccc3o2)cc1]
RM-64

TABLE D-continued
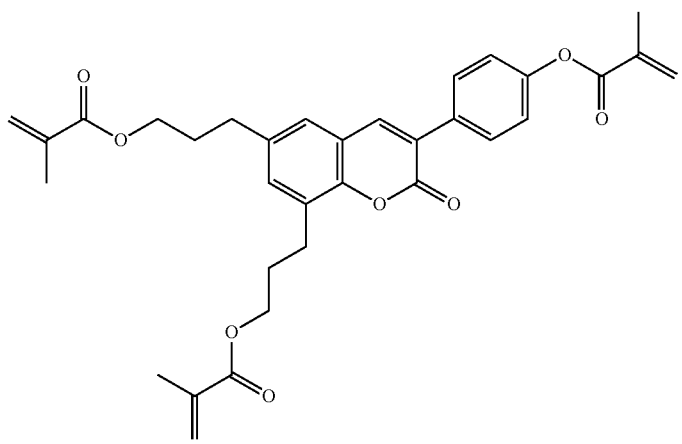 [SMILES: C=C(C)C(=O)OCCCc1cc(CCCOC(=O)C(=C)C)c2oc(=O)c(-c3ccc(OC(=O)C(=C)C)cc3)cc2c1]
RM-65
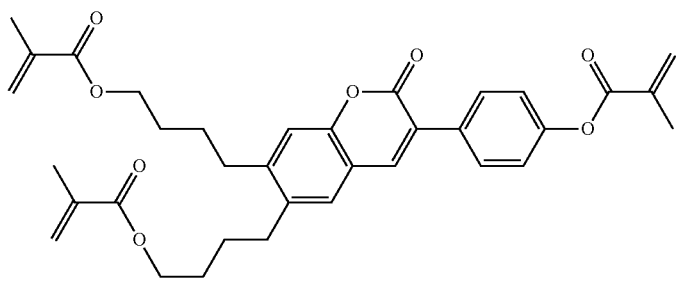 [SMILES: C=C(C)C(=O)OCCCCc1cc2cc(-c3ccc(OC(=O)C(=C)C)cc3)c(=O)oc2cc1CCCCOC(=O)C(=C)C]
RM-66
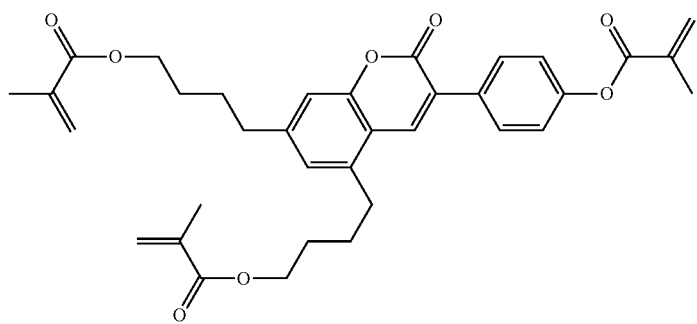 [SMILES: C=C(C)C(=O)OCCCCc1cc(CCCCOC(=O)C(=C)C)c2cc(-c3ccc(OC(=O)C(=C)C)cc3)c(=O)oc2c1]
RM-67
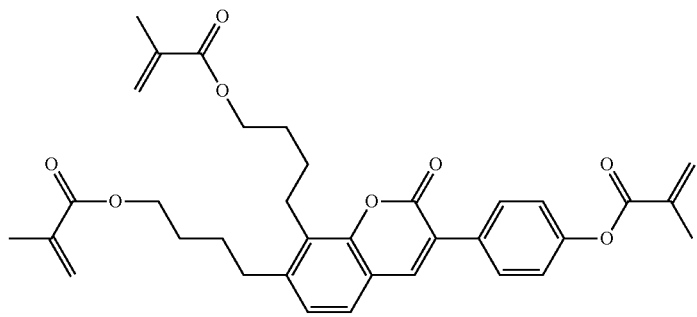 [SMILES: C=C(C)C(=O)OCCCCc1ccc2cc(-c3ccc(OC(=O)C(=C)C)cc3)c(=O)oc2c1CCCCOC(=O)C(=C)C]
RM-68
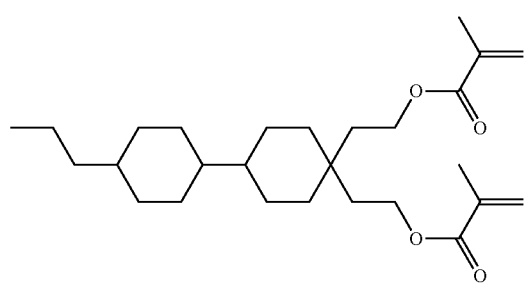 [SMILES: C=C(C)C(=O)OCCC1(CCOC(=O)C(=C)C)CCC(C2CCC(CCC)CC2)CC1]
RM-69

TABLE D-continued
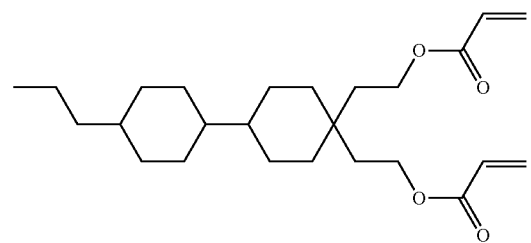 [SMILES: C=CC(=O)OCCC1(CCOC(=O)C=C)CCC(C2CCC(CCC)CC2)CC1]
RM-70
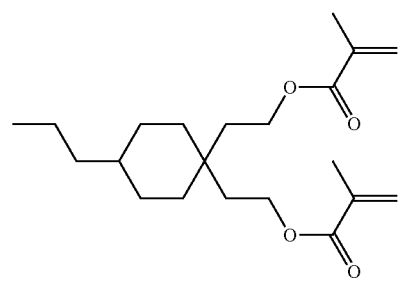 [SMILES: C=C(C)C(=O)OCCC1(CCOC(=O)C(=C)C)CCC(CCC)CC1]
RM-71
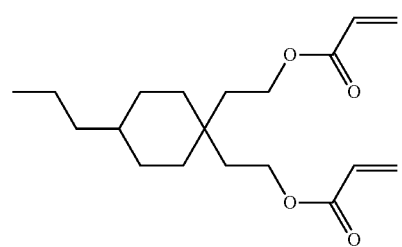 [SMILES: C=CC(=O)OCCC1(CCOC(=O)C=C)CCC(CCC)CC1]
RM-72
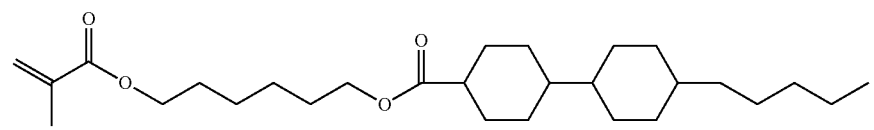 [SMILES: C=C(C)C(=O)OCCCCCCOC(=O)C1CCC(C2CCC(CCCCC)CC2)CC1]
RM-73
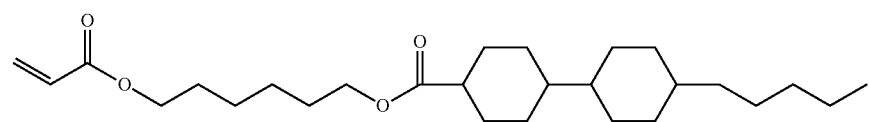 [SMILES: C=CC(=O)OCCCCCCOC(=O)C1CCC(C2CCC(CCCCC)CC2)CC1]
RM-74
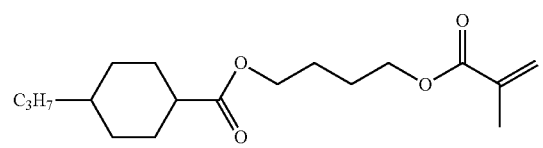
RM-75
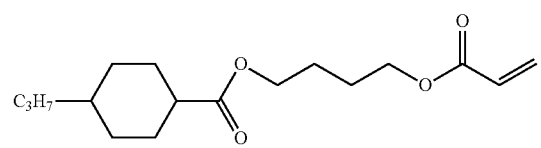
RM-76

TABLE D-continued
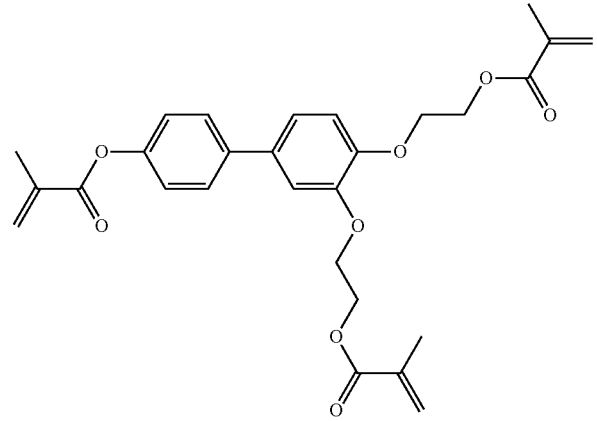 [SMILES: C=C(C)C(=O)OCCOc1ccc(-c2ccc(OC(=O)C(=C)C)cc2)cc1OCCOC(=O)C(=C)C]
RM-77
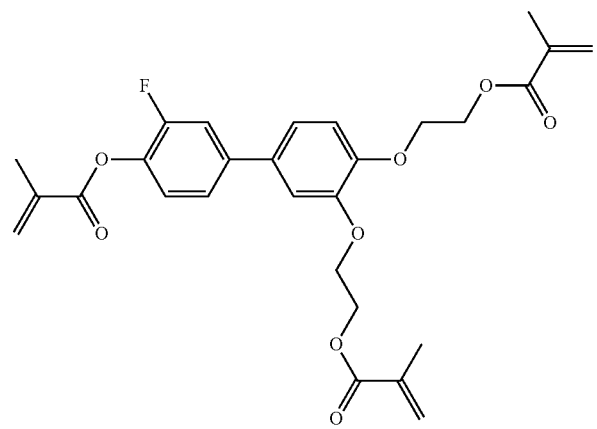 [SMILES: C=C(C)C(=O)OCCOc1ccc(-c2ccc(OC(=O)C(=C)C)c(F)c2)cc1OCCOC(=O)C(=C)C]
RM-78
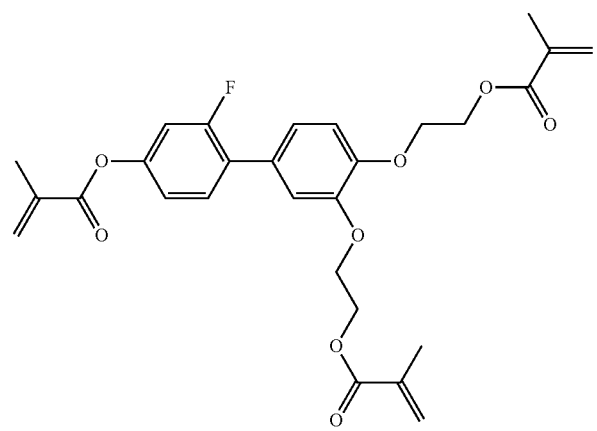 [SMILES: C=C(C)C(=O)OCCOc1ccc(-c2ccc(OC(=O)C(=C)C)cc2F)cc1OCCOC(=O)C(=C)C]
RM-79

TABLE D-continued
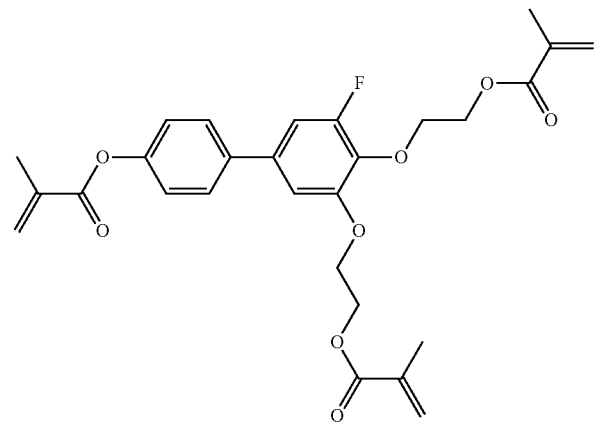 [SMILES: C=C(C)C(=O)OCCOc1cc(-c2ccc(OC(=O)C(=C)C)cc2)cc(F)c1OCCOC(=O)C(=C)C]
RM-80
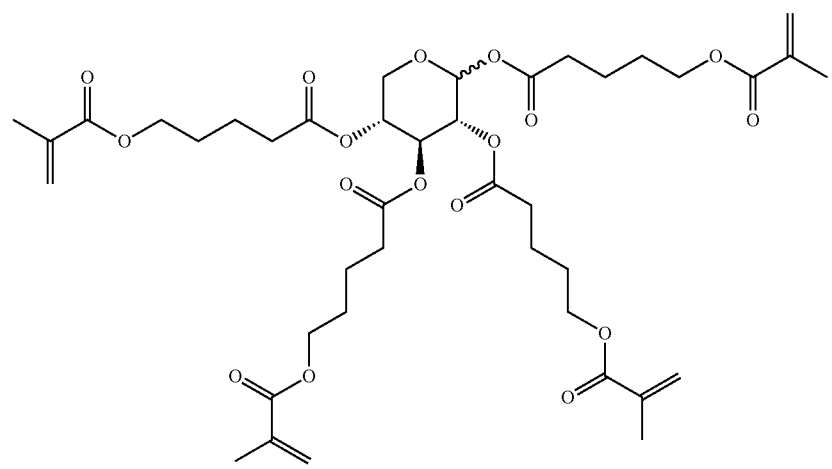 [SMILES: C=C(C)C(=O)OCCCCC(=O)OC1OC[C@@H](OC(=O)CCCCOC(=O)C(=C)C)[C@H](OC(=O)CCCCOC(=O)C(=C)C)[C@H]1OC(=O)CCCCOC(=O)C(=C)C]
RM-81
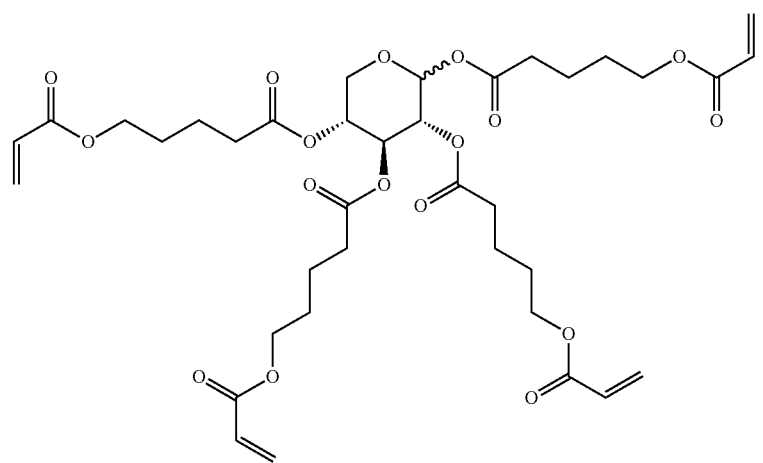 [SMILES: C=CC(=O)OCCCCC(=O)OC1OC[C@@H](OC(=O)CCCCOC(=O)C=C)[C@H](OC(=O)CCCCOC(=O)C=C)[C@H]1OC(=O)CCCCOC(=O)C=C]
RM-82

TABLE D-continued
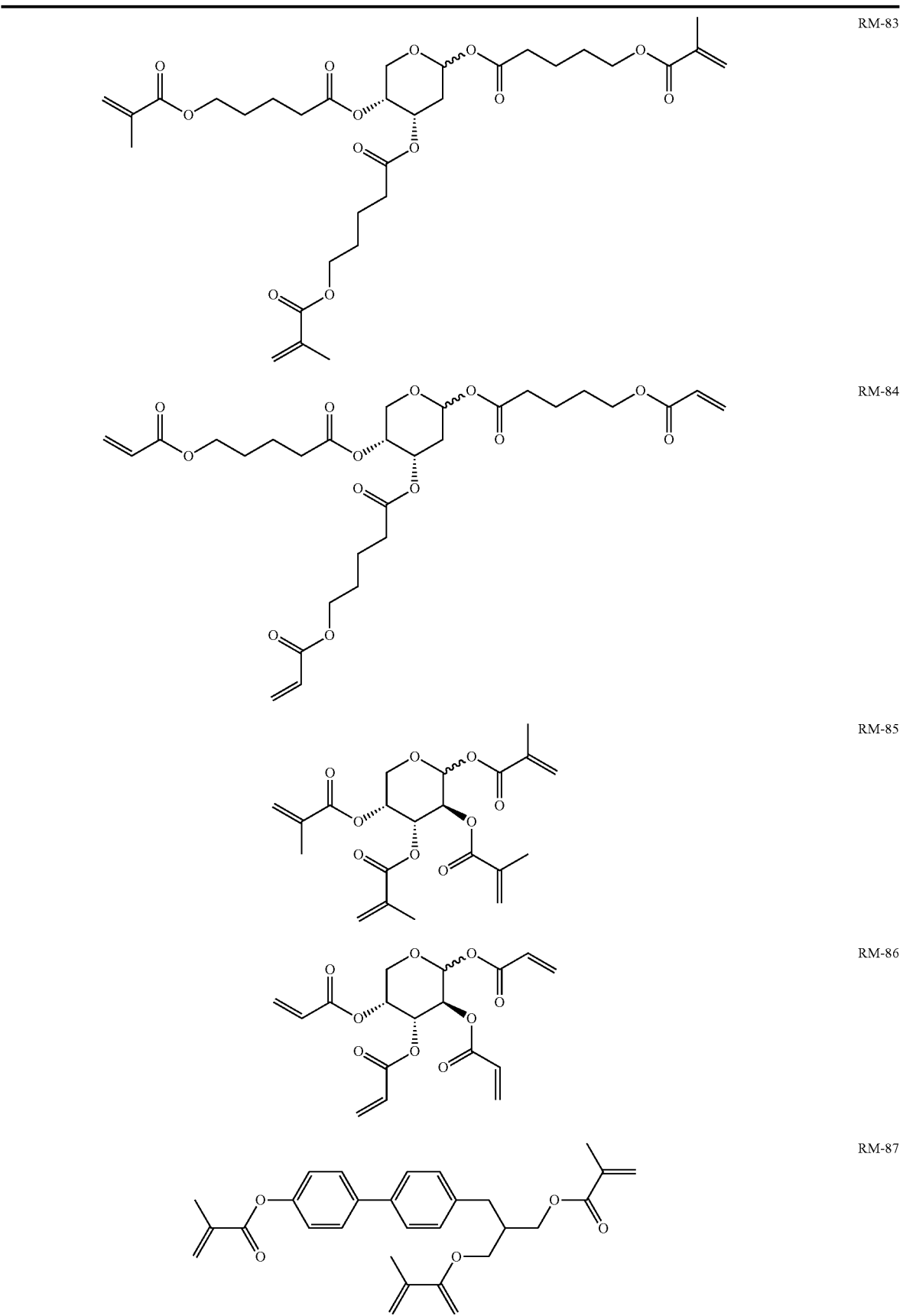

TABLE D-continued
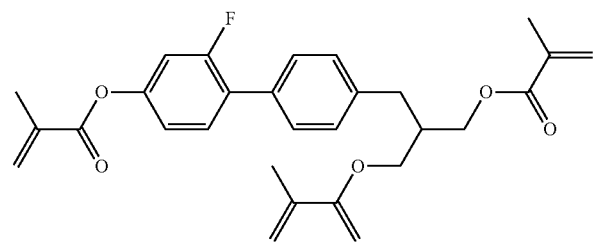 [SMILES: C=C(C)C(=C)OCC(COC(=O)C(=C)C)Cc1ccc(-c2ccc(OC(=O)C(=C)C)cc2F)cc1] RM-88
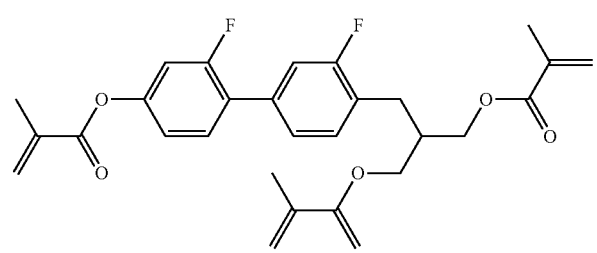 [SMILES: C=C(C)C(=C)OCC(COC(=O)C(=C)C)Cc1ccc(-c2ccc(OC(=O)C(=C)C)cc2F)cc1F] RM-89
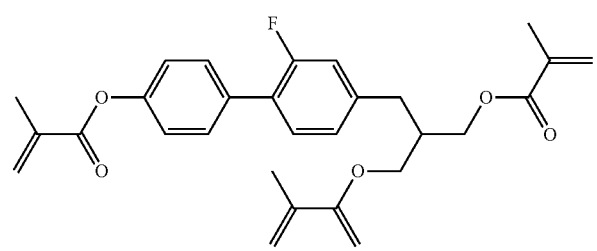 [SMILES: C=C(C)C(=C)OCC(COC(=O)C(=C)C)Cc1ccc(-c2ccc(OC(=O)C(=C)C)cc2)c(F)c1] RM-90
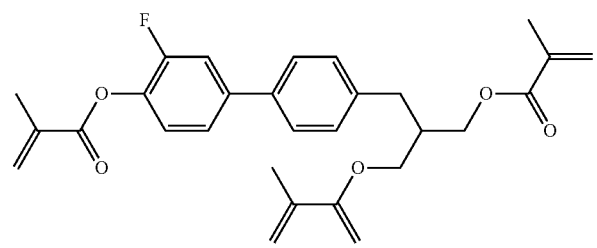 [SMILES: C=C(C)C(=C)OCC(COC(=O)C(=C)C)Cc1ccc(-c2ccc(OC(=O)C(=C)C)c(F)c2)cc1] RM-91
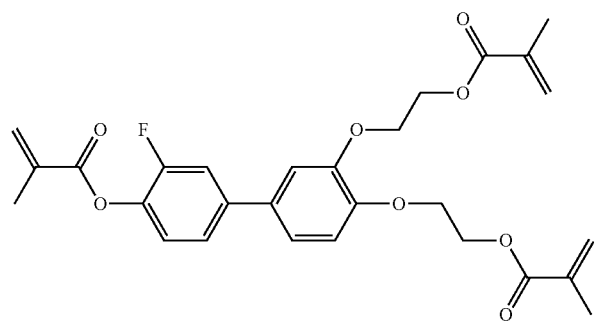 [SMILES: C=C(C)C(=O)OCCOc1ccc(-c2ccc(OC(=O)C(=C)C)c(F)c2)cc1OCCOC(=O)C(=C)C] RM-92

TABLE D-continued
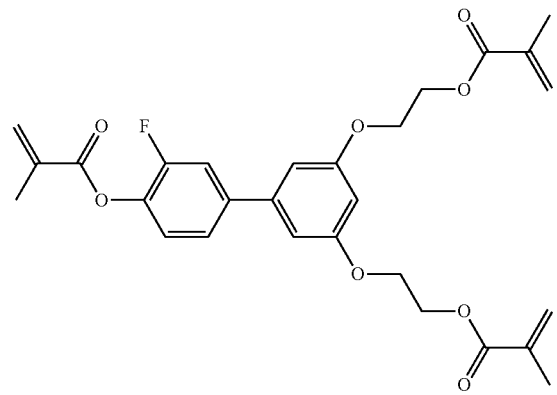 [SMILES: C=C(C)C(=O)OCCOc1cc(OCCOC(=O)C(=C)C)cc(-c2ccc(OC(=O)C(=C)C)c(F)c2)c1]
RM-93
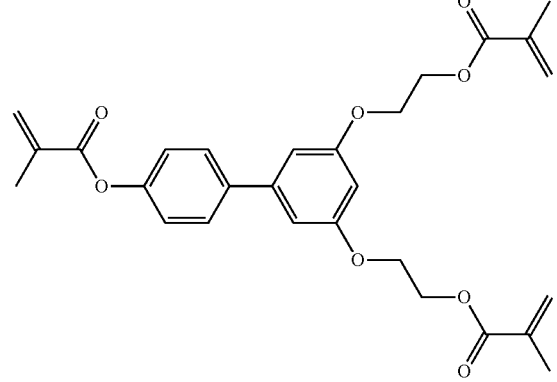
RM-94
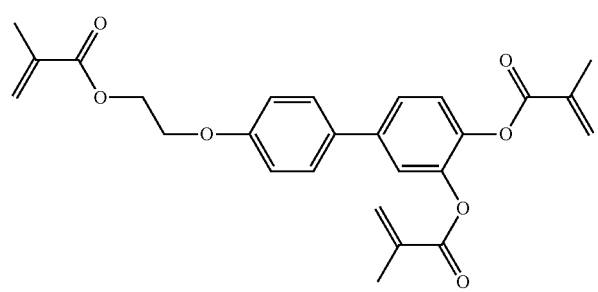 [SMILES: C=C(C)C(=O)OCCOc1ccc(-c2ccc(OC(=O)C(=C)C)c(OC(=O)C(=C)C)c2)cc1]
RM-95
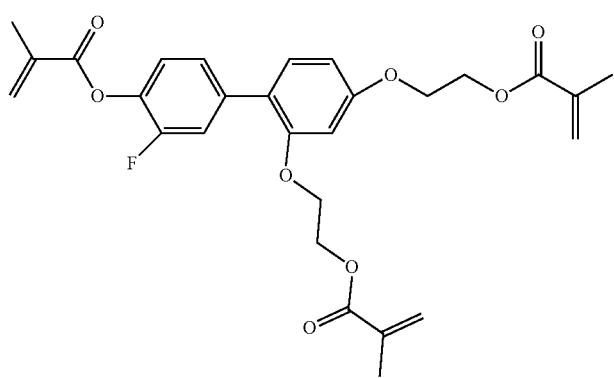 [SMILES: C=C(C)C(=O)OCCOc1ccc(-c2ccc(OC(=O)C(=C)C)c(F)c2)c(OCCOC(=O)C(=C)C)c1]
RM-96

TABLE D-continued
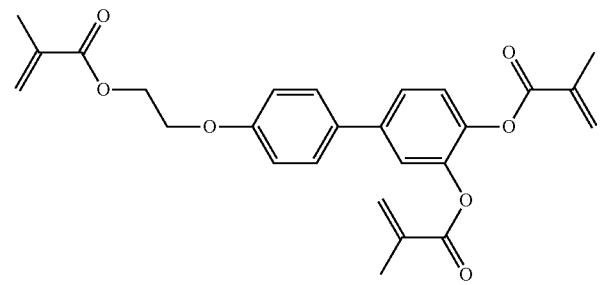 [SMILES: C=C(C)C(=O)OCCOc1ccc(-c2ccc(OC(=O)C(=C)C)c(OC(=O)C(=C)C)c2)cc1] RM-97
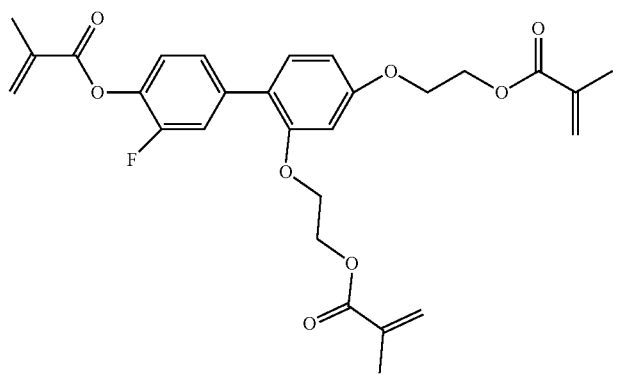 [SMILES: C=C(C)C(=O)OCCOc1ccc(-c2ccc(OC(=O)C(=C)C)c(F)c2)c(OCCOC(=O)C(=C)C)c1] RM-98
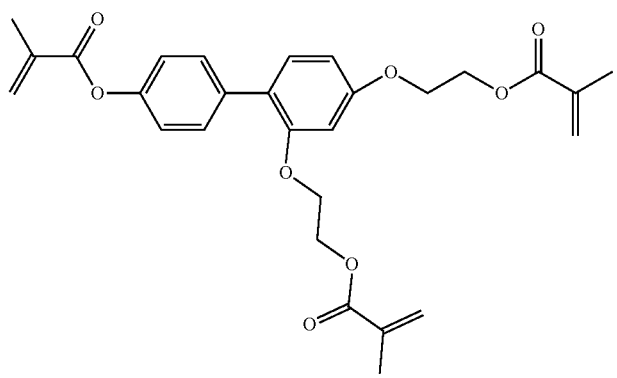 RM-99
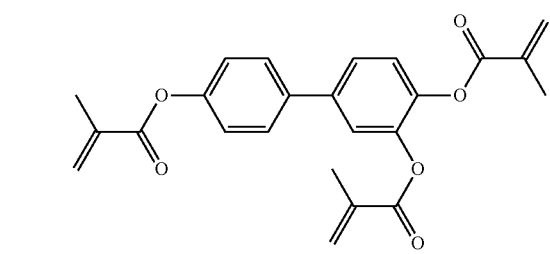 [SMILES: C=C(C)C(=O)Oc1ccc(-c2ccc(OC(=O)C(=C)C)c(OC(=O)C(=C)C)c2)cc1] RM-100
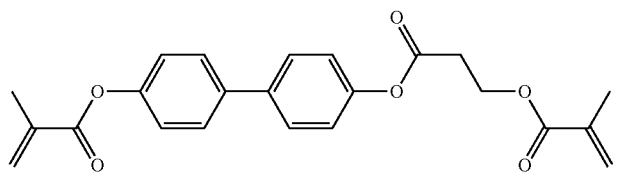 [SMILES: C=C(C)C(=O)OCCC(=O)Oc1ccc(-c2ccc(OC(=O)C(=C)C)cc2)cc1] RM-101
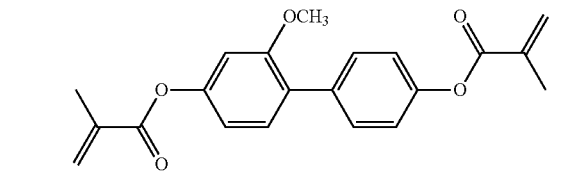 [SMILES: C=C(C)C(=O)Oc1ccc(-c2ccc(OC(=O)C(=C)C)cc2OC)cc1] RM-102

WORKING EXAMPLES

In the following examples
$\Delta n$ denotes the optical anisotropy measured at 20° C. and 589 nm
$\Delta \varepsilon$ denotes the dielectric anisotropy at 20° C. and 1 kHz
cl.p. denotes the clearing point [° C.]
LTS denotes the low-temperature stability (nematic phase), determined in test cells.

All concentrations in this application relate to the corresponding mixture or mixture component, unless explicitly indicated otherwise. All physical properties are determined as described in "Merck Liquid Crystals, Physical Properties of Liquid Crystals", status November 1997, Merck KGaA, Germany, and apply for a temperature of 20° C., unless explicitly indicated otherwise.

Unless indicated otherwise, parts or percent data denote parts by weight or percent by weight.

The present invention is explained in greater detail in the following examples.

MIXTURE EXAMPLES

For the production of the switching layers of the examples according to the present invention the following host mixtures H1 to H3 having the proportions by weight of their components, i.e. the liquid-crystalline molecules, listed below are used:

| H1: Nematic host mixture ($\Delta \varepsilon < 0$) | | | |
|---|---|---|---|
| BCH-32 | 2% | Clearing point [° C.]: | 81.2 |
| CCP-V-1 | 3% | $\Delta n$ (589 nm, 20° C.): | 0.153 |
| CCY-3-O2 | 7% | $\Delta \varepsilon$ (1 KHz, 20° C.): | −5.0 |
| CCY-3-O3 | 4.5% | $\varepsilon_\parallel$ (1 KHz, 20° C.): | 4.1 |
| CPY-2-O2 | 10% | $\varepsilon_\perp$ (1 KHz, 20° C.): | 9.1 |
| CPY-3-O2 | 10% | $K_1$ (20° C.) [pN]: | 13.1 |
| CY-3-O4 | 25% | $K_3$ (20° C.) [pN]: | 15.9 |
| CY-5-O2 | 9% | $\gamma_1$ [mPa · s] (20° C.): | 298 |
| PGP-2-3 | 2% | $V_0$ (20° C.) [V]: | 1.89 |
| PP-1-2V1 | 3.5% | | |
| PYP-2-3 | 14% | | |
| PYP-2-4 | 10% | | |

| H2: Nematic host mixture ($\Delta \varepsilon < 0$) | | | |
|---|---|---|---|
| CCY-3-O1 | 9% | Clearing point [° C.]: | 93.5 |
| CCY-3-O2 | 11% | $\Delta n$ (589 nm, 20° C.): | 0.155 |
| CCY-5-O2 | 10% | $\Delta \varepsilon$ (1 KHz, 20° C.): | −7.2 |
| CPY-2-O2 | 12% | $\varepsilon_\parallel$ (1 KHz, 20° C.): | 4.5 |
| CPY-3-O2 | 12% | $\varepsilon_\perp$ (1 KHz, 20° C.): | 11.7 |
| CY-3-O2 | 15% | $K_1$ (20° C.) [pN]: | 16.8 |
| PGIGI-3-F | 4% | $K_3$ (20° C.) [pN]: | 20.8 |
| PY-3-O2 | 20% | $\gamma_1$ (20° C.) [mPa · s]: | 396 |
| PYP-2-3 | 7% | $V_0$ (20° C.) [V]: | 1.78 |

| H3: Nematic host mixture ($\Delta \varepsilon < 0$) | | | |
|---|---|---|---|
| BCH-32 | 2% | Clearing point [° C.]: | 110.5 |
| CCP-V-1 | 8% | $\Delta n$ (589 nm, 20° C.): | 0.159 |
| CCY-3-O2 | 10% | $\Delta \varepsilon$ (1 KHz, 20° C.): | −5.0 |
| CCY-3-O3 | 10% | $\varepsilon_\parallel$ (1 KHz, 20° C.): | 3.9 |
| CPY-2-O2 | 11% | $\varepsilon_\perp$ (1 KHz, 20° C.): | 8.8 |
| CPY-3-O2 | 12% | $K_1$ (20° C.) [pN]: | 18.2 |
| PGP-2-3 | 2% | $K_3$ (20° C.) [pN]: | 19.2 |
| PYP-2-3 | 14% | $\gamma_1$ (20° C.) [mPa · s]: | 371 |
| PYP-2-4 | 10% | $V_0$ (20° C.) [V]: | 2.07 |
| CY-3-O4 | 11% | | |
| CY-5-O2 | 10% | | |

| H4: Nematic host mixture ($\Delta \varepsilon < 0$) | | | |
|---|---|---|---|
| CBC-33 | 3% | Clearing point [° C.]: | 112.5 |
| CBC-33F | 3% | $\Delta n$ (589 nm, 20° C.): | 0.200 |
| CCY-3-O1 | 3% | $\Delta \varepsilon$ (1 KHz, 20° C.): | −4.9 |
| CCY-3-O2 | 11% | $\varepsilon_\parallel$ (1 KHz, 20° C.): | 4.1 |
| CPY-2-O2 | 12% | $\varepsilon_\perp$ (1 KHz, 20° C.): | 9.1 |
| CPY-3-O2 | 12% | $K_1$ (20° C.) [pN]: | 18.0 |
| PGIGI-3-F | 8% | $K_3$ (20° C.) [pN]: | 22.8 |
| PY-3-O2 | 20% | $\gamma_1$ (20° C.) [mPa · s]: | 467 |
| PYP-2-3 | 14% | $V_0$ (20° C.) [V]: | 2.26 |
| PYP-2-4 | 14% | | |

| H5: Nematic host mixture ($\Delta \varepsilon < 0$) | | | |
|---|---|---|---|
| CCY-3-O1 | 5% | Clearing point [° C.]: | 118.5 |
| CCY-3-O2 | 7% | $\Delta n$ (589 nm, 20° C.): | 0.249 |
| CCY-3-O3 | 5% | $\Delta \varepsilon$ (1 KHz, 20° C.): | −4.2 |
| CPTP-302FF | 8% | $\varepsilon_\parallel$ (1 KHz, 20° C.): | 4.0 |
| CPTP-502FF | 7% | $\varepsilon_\perp$ (1 KHz, 20° C.): | 8.2 |
| CPY-3-O2 | 5% | $K_1$ (20° C.) [pN]: | 17.8 |
| PYP-2-3 | 15% | $K_3$ (20° C.) [pN]: | 27.44 |
| PYP-2-4 | 15% | $\gamma_1$ (20° C.) [mPa · s]: | 444 |
| CY-3-O2 | 3% | $V_0$ (20° C.) [V]: | 2.68 |
| PTP-102 | 5% | | |
| PTP-201 | 5% | | |
| PTP-301 | 5% | | |
| PTP-302FF | 15% | | |

| H6: Nematic host mixture ($\Delta \varepsilon < 0$) | | | |
|---|---|---|---|
| CY-3-O2 | 15.5% | Clearing point [° C.]: | 75.1 |
| CCY-3-O3 | 8.00% | $\Delta n$ (589 nm, 20° C.): | 0.098 |
| CCY-4-O2 | 10.0% | $\Delta \varepsilon$ (1 KHz, 20° C.): | −3.0 |
| CPY-2-O2 | 5.50% | $\varepsilon_\parallel$ (1 KHz, 20° C.): | 3.4 |
| CPY-3-O2 | 11.5% | $\varepsilon_\perp$ (1 KHz, 20° C.): | 6.4 |
| CCH-34 | 9.25% | $K_1$ (20° C.) [pN]: | 13.1 |
| CCH-23 | 24.5% | $K_3$ (20° C.) [pN]: | 13.3 |
| PYP-2-3 | 8.75% | $\gamma_1$ (20° C.) [mPa · s]: | 113 |
| PCH-301 | 7.0% | $V_0$ (20° C.) [V]: | 2.22 |

The following reactive mesogens or monomers are used:
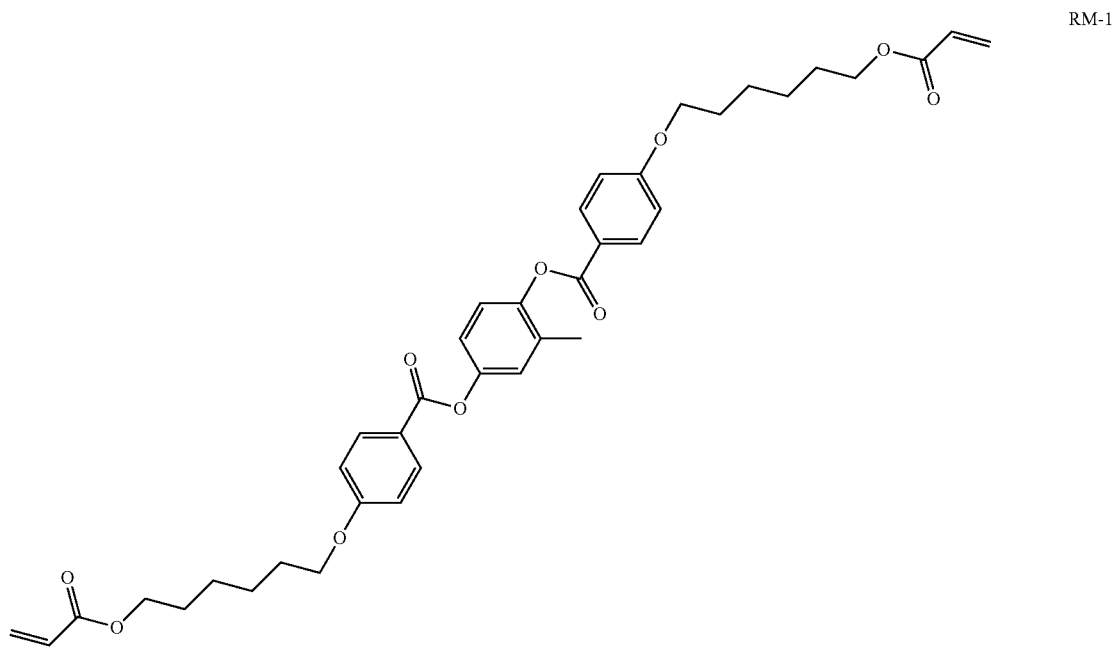
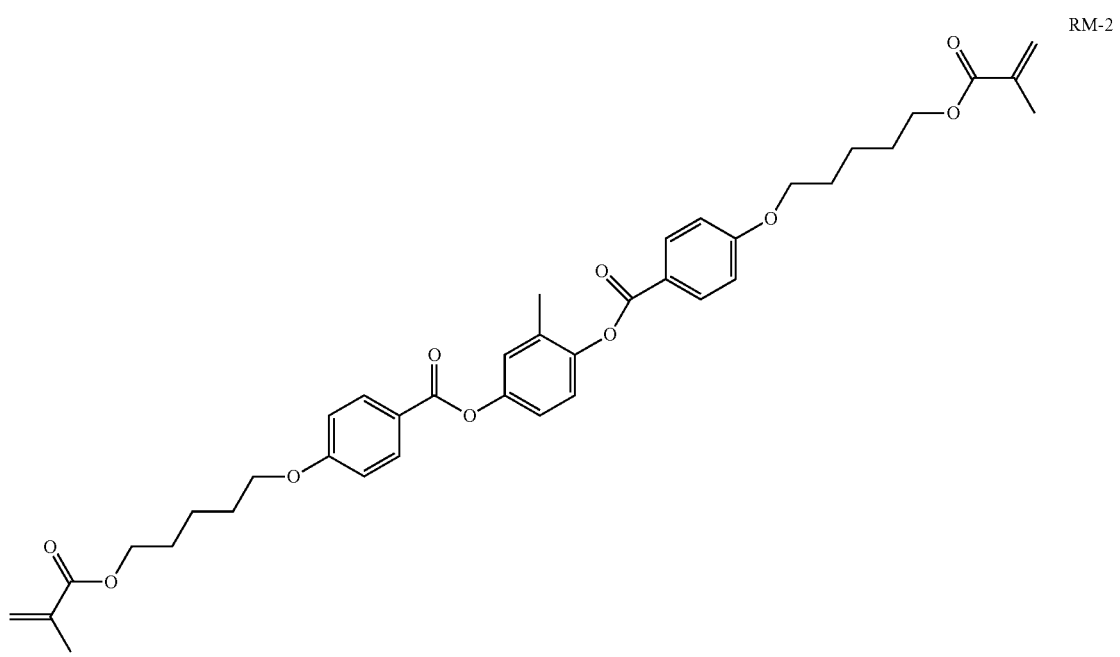
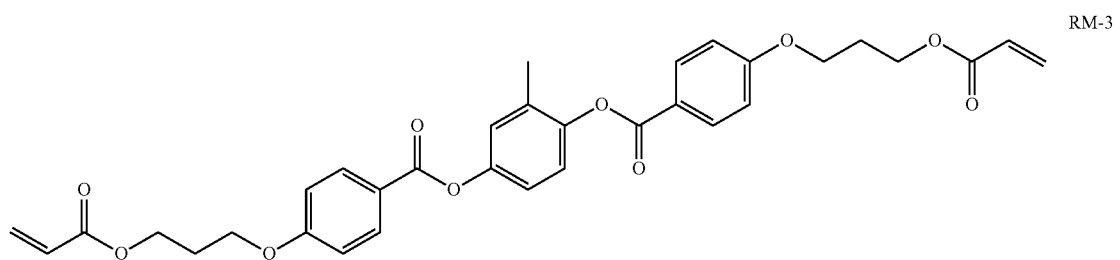

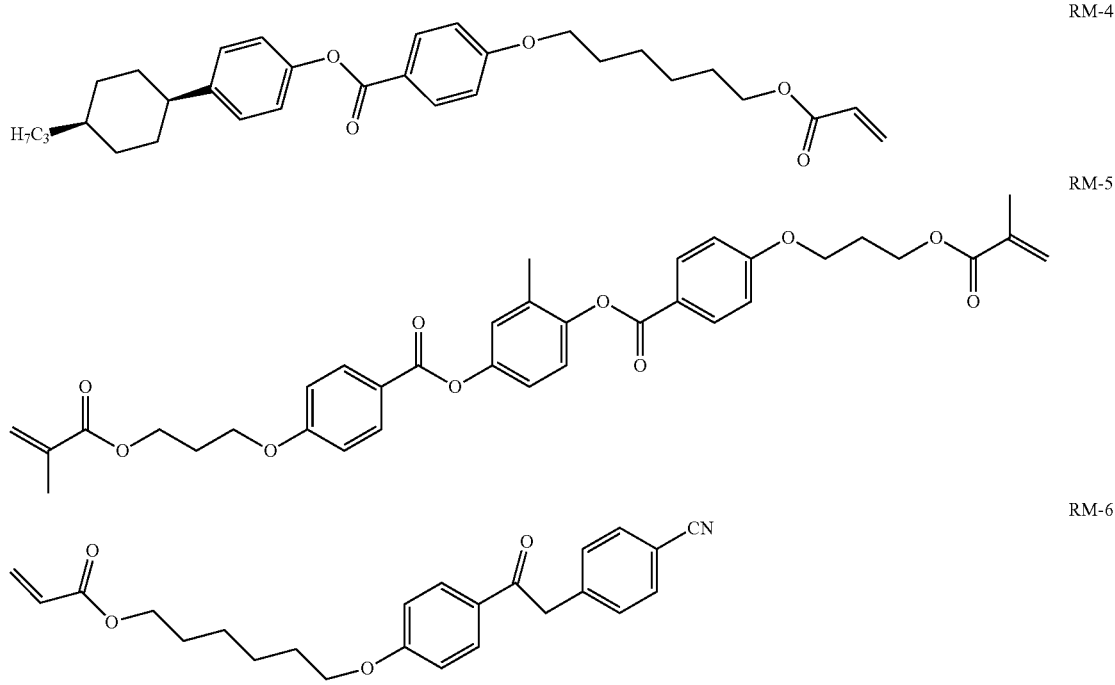

The following alignment additives are used:

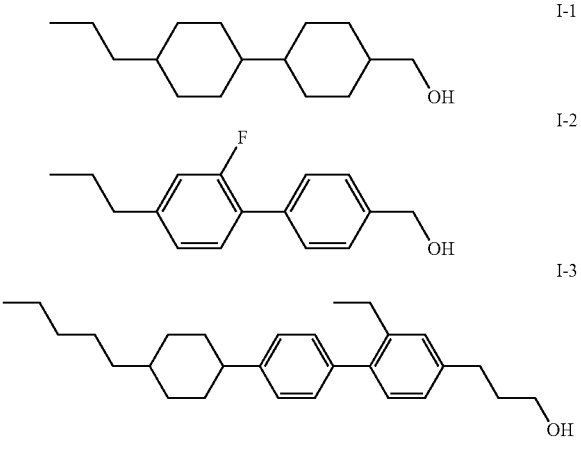

MIXTURE EXAMPLE M1

The compound of the formula I-1 (alignment additive, 3.0%) is added to the nematic host mixture H1. Further, the polymerizable derivative RM-1 (10.0%) and 0.30% by weight of the photoinitiator Irgacure® 651 is added to the mixture. The resulting mixture is homogenised and filled into an "alignment-free" test cell (cell thickness d~4.0 μm, ITO coating on both sides, no alignment layer and no passivation layer).

The LC-mixture shows a spontaneous homeotropic (vertical) orientation, with respect to the surface of the substrates.

Additives like Irganox 1076 (BASF) may be added (e.g. 0.001%) for preventing spontaneous polymerization.

MIXTURE EXAMPLES M2 TO M6

In analogy to Mixture Example M1 the following mixtures are prepared and tested:

TABLE 1

| Mixture no. | Host mixture | Monomer(s) | Alignment additive | Irgacure® 651 |
|---|---|---|---|---|
| M2 | H1 | 10% RM-1 | 1.5% I-1 | 0.3% |
| M3 | H1 | 10% RM-1 | 5% I-2 | 0.3% |
| M4 | H1 | 5% RM-1<br>2% RM-2<br>3% RM-4 | 1.5% I-1 | 0.3% |
| M5 | H1 | 5% RM-1<br>2% RM-2<br>3% RM-4 | 3% I-1 | 0.3% |
| M6 | H1 | 5% RM-1<br>2% RM-2<br>3% RM-4 | 5% I-2 | 0.3% |
| M7 | H1 | 5% RM-1<br>2% RM-2<br>3% RM-4 | 1.5% I-3 | 0.3% |

The mixtures provide vertical alignment of the medium in a test cell before and after UV polymerization.

DEVICE EXAMPLES 1-6

A switching element according to the invention comprises a switching layer S according to the invention in the layer sequence depicted diagrammatically below:

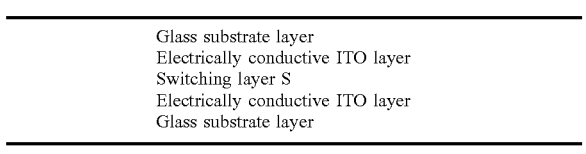

Glass substrate layer
Electrically conductive ITO layer
Switching layer S
Electrically conductive ITO layer
Glass substrate layer For the switching layer the mixture of Mixture Example M1 is used. The mixture is introduced between the glass substrates with ITO layers. The resulting switching layer is treated with UV-light (15 min, 100 mW/cm$^2$). The polymerizable derivative polymerizes and a polymer network is formed. A UV-cutoff filter is used during polymerization for preventing damage of the mixtures (e.g. 340 nm cut-filter).

The resulting switching element can be reversibly switched from the clear to the hazy state even at high temperatures.

Switching element 1 exhibits the following characteristics

TABLE 2

| Ex. no. | Mixture | $H_{ini}$ | $H_{max}$ | $H_{res}$ | $T_0$ $V$/$T_{100}$ $V$ | ΔT |
|---|---|---|---|---|---|---|
| 1 | M1 | 0.6% | 73.1% | 0.6% | 81.0/74.6% | 6.4% |

Explanations: $H_{ini}$: Initial haze, $H_{max}$: Maximum operating haze; $H_{res}$: Resudual haze after driving (5-100 V); $T_0$ $V$: Transmittance at 0 V operating voltage; $T_{100}$ $V$: Transmission at 100 V operating voltage; ΔT: Total transmittance difference between 0 V and 100 V.

By using additives like the compound of the formula I-1 in combination with RM-1, no alignment layer is required anymore for the switching layer and other analogue switching layer technologies based on the homeotropic orientation.

In analogy the following device examples are made and measured:

TABLE 3

| Ex. no. | Mixture | $H_{ini}$ | $H_{max}$ | $H_{res}$ | $T_0$ $V$/$T_{100}$ $V$ | ΔT |
|---|---|---|---|---|---|---|
| 3 | M3 | 0.5% | 73.8% | 0.6% | 81.1/73.7% | 7.3% |
| 4 | M4 | 0.5% | 92.3% | — | — | — |
| 5 | M5 | 0.5% | 90.4% | 0.8% | 81.8/75.2% | 6.5% |
| 6 | M6 | 0.4% | 90.8% | 0.6% | 81.9/73.7% | 8.3% |

Explanations: $H_{ini}$: Initial haze, $H_{max}$: Maximum operating haze; $H_{res}$: Resudual haze after driving (5-100 V); $T_0$ $V$: Total transmittance at 0 V operating voltage; $T_{100}$ $V$: Total transmittance at 100 V operating voltage; ΔT: Total transmittance difference between 0 V and 100 V.

Measurement of the Switching Curve

The switching operation of a device is analysed by obtaining a graph haze versus voltage. FIG. 1 depicts the switching curve of device example 5 containing mixture M5 (3% additive I-1). The graph indicates low initial haze, switching operation between about 20 to 50 V and a high level of maximum haze at higher voltages. The switching operation is highly reversible.

The invention claimed is:

1. A liquid-crystalline medium, which comprises
a liquid-crystalline low-molecular-weight component,
10% by weight or more of a polymer component, which comprises a polymerisable or polymerised compound and
a self-alignment additive for vertical alignment of the liquid crystalline medium.

2. The liquid-crystalline medium according to claim 1, wherein the medium comprises, as self-alignment additive for vertical alignment, one or more self-alignment additives of formula I:

$$R^1\text{-}[A^3\text{-}Z^3]_m\text{-}[A^2]_k[Z^2]_n\text{-}A^1\text{-}R^a \quad \text{I}$$

in which
k denotes 0 or 1,
m denotes 0, 1, 2, 3, 4, 5 or 6, preferably 0, 1, 2 or 3,
n denotes 0 or 1,
$R^a$ denotes an anchor group of the formula

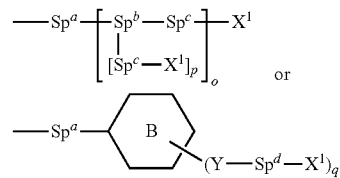

p denotes 1 or 2,
q denotes 2 or 3,
B denotes a substituted or unsubstituted ring system or condensed ring system,
Y independently of one another,
  denotes —O—, —S—, —C(O)—, —C(O)O—, —OC(O)—, —NR$^{11}$— or a single bond,
o denotes 0 or 1,
$X^1$, independently of one another, denotes H, alkyl, fluoroalkyl, OH, NH$_2$, NHR$^{11}$, NR$^{11}_2$, OR$^{11}$, C(O)OH, —CHO,
  where at least one group $X^1$ denotes a radical selected from —OH, —NH$_2$, NHR$^{11}$, C(O)OH and —CHO,
$R^{11}$ denotes alkyl having 1 to 12 C atoms,
Sp$^a$, Sp$^c$, Sp$^d$ each, independently of one another, denote a spacer group or a single bond,
Sp$^b$ denotes a tri- or tetravalent group,
$A^1$, $A^2$, $A^3$ each, independently of one another, denote an aromatic, heteroaromatic, alicyclic or heterocyclic group, which may also contain fused rings, and which may also be mono- or polysubstituted by a group L,
$Z^2$ denotes —O—, —S—, —CO—, —CO—O—, —OCO—, —O—CO—O—, —OCH$_2$—, —CH$_2$O—, —SCH$_2$—, —CH$_2$S—, —CF$_2$O—, —OCF$_2$—, —CF$_2$S—, —SCF$_2$—, —(CH$_2$)$_{n1}$—, —CF$_2$CH$_2$—, —CH$_2$CF$_2$—, —(CF$_2$)$_{n1}$—, —CH=CH—, —CF=CF—, —C≡C—, —CH=CH—COO—, —OCO—CH=CH—, —(CR$^0$R$^{00}$)$_{n1}$—,
$Z^3$ in each case, independently of one another, denotes a single bond, —O—, —S—, —CO—, —CO—O—, —OCO—, —O—CO—O—, —OCH$_2$—, —CH$_2$O—, —SCH$_2$—, —CH$_2$S—, —CF$_2$O—, —OCF$_2$—, —CF$_2$S—, —SCF$_2$—, —(CH$_2$)$_{n1}$—, —CF$_2$CH$_2$—, —CH$_2$CF$_2$—, —(CF$_2$)$_{n1}$—, —CH=CH—, —CF=CF—, —C≡C—, —CH=CH—COO—, —OCO—CH=CH—, —(CR$^0$R$^{00}$)$_{n1}$—,
n1 denotes 1, 2, 3 or 4,
L in each case, independently of one another, denotes H, F, Cl, Br, I, —CN, —NO$_2$, —NCO, —NCS, —OCN, —SCN, —C(=O)N(R$^0$)$_2$, —C(=O)R$^0$, optionally substituted silyl, optionally substituted aryl or cycloalkyl having 3 to 20 C atoms, or straight-chain or branched alkyl, alkoxy, alkylcarbonyl, alkoxycarbonyl, alkylcarbonyloxy or alkoxycarbonyloxy having 1 to 25 C atoms, in which, in addition, one or more H atoms may be replaced by F or Cl, or -Sp-P
Sp denotes a spacer group or a single bond,
P is a polymerizable group,
$R^0$ in each case, independently of one another, denotes alkyl having 1 to 12 C atoms,
$R^{00}$ in each case, independently of one another, denotes H or alkyl having 1 to 12 C atoms,
and
$R^1$ independently of one another, denotes H, halogen, straight-chain, branched or cyclic alkyl having 1 to 25 C atoms, in which, in addition, one or more non-adjacent CH$_2$ groups may be replaced by —O—, —S—, —CO—, —CO—O—, —O—CO—, —O—CO—O—, —CH=CH— or —C≡C— in such a way that 0 and/or S atoms are not linked directly to one another and in which, in addition, one or more H atoms may be replaced by F or Cl.

3. The liquid-crystalline medium according to claim 1, wherein the liquid crystalline low-molecular-weight component comprises one or more compounds selected from the group of the compounds of the formulae CY, PY, T, FI and B

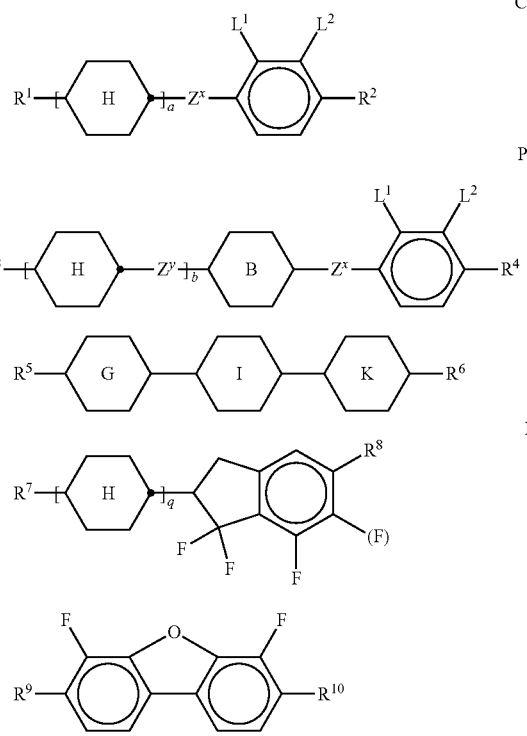

wherein
a denotes 0, 1 or 2,
b denotes 0 or 1,
q denotes 1 or 2,

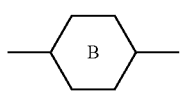

denotes

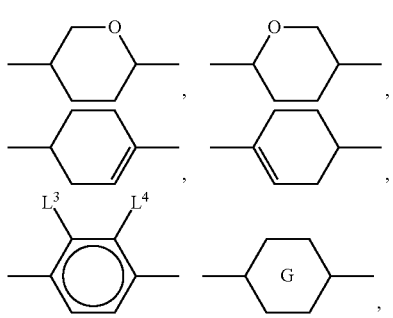

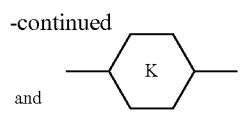

each, independently of one another, denote

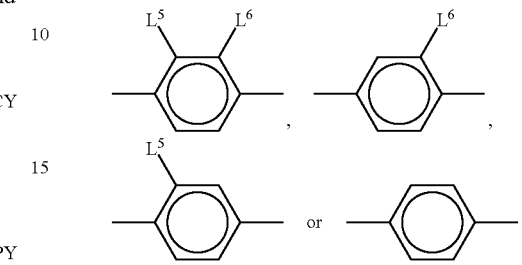

in which $L^5$ denotes F or Cl, preferably F, and $L^6$ denotes F, Cl, OCF$_3$, CF$_3$, CH$_3$, CH$_2$F or CHF$_2$,
wherein formula T comprises at least one, preferably two groups $L^5$ or $L^6$,
$R^1$, $R^2$, $R^3$, $R^4$, $R^5$, $R^6$, $R^7$, $R^8$, $R^9$ and $R^{10}$
each, independently of one another, denote alkyl having 1 to 12 C atoms, where, in addition, one or two non-adjacent CH$_2$ groups may be replaced by —O—, —CH=CH—, —CO—, —OCO— or —COO— in such a way that O atoms are not linked directly to one another,
$Z^x$ and $Z^y$
each, independently of one another,
denote —CH$_2$CH$_2$—, —CH=CH—, —C≡C—, —CF$_2$O—, —OCF$_2$—, —CH$_2$O—, —OCH$_2$—, —CO—O—, —O—CO—, —C$_2$F$_4$—, —CF=CF—, —CH=CH—CH$_2$O— or a single bond,
$L^1$, $L^2$ each, independently of one another, denote F, Cl, OCF$_3$, CF$_3$, CH$_3$, CH$_2$F, CHF$_2$, and
$L^3$, $L^4$ each, independently of one another, denote H, F, Cl, OCF$_3$, CF$_3$, CH$_3$, CH$_2$F, CHF$_2$.

4. Process for the preparation of a liquid-crystalline medium according to claim 1, comprising mixing at least one self-aligning additive with at least two liquid-crystalline low-molecular-weight compounds, and with at least one polymerisable compound and optionally one or more additional additives.

5. An electro-optical display which comprises a liquid-crystalline medium according to claim 1.

6. A window element which comprises a liquid-crystalline medium according to claim 1.

7. The liquid-crystalline medium of claim 1, wherein the liquid-crystalline medium comprises nematically arranged molecules.

8. The liquid-crystalline medium of claim 1, wherein the polymer component comprises a polymeric network which comprises reactive mesogens or reactive mesogens in polymerized form or both.

9. The liquid-crystalline medium of claim 8, wherein the reactive mesogens contain at least one group selected from acrylate, methacrylate, vinyl ether and epoxide.

10. The liquid-crystalline medium of claim 1, wherein the liquid-crystalline medium has a clearing point of >90° C.

11. The liquid-crystalline medium of claim 1, wherein the liquid-crystalline medium has a dielectric anisotropy of $\Delta\varepsilon < 1.5$.

* * * * *